(12) United States Patent
Ikeda et al.

(10) Patent No.: US 8,086,331 B2
(45) Date of Patent: Dec. 27, 2011

(54) REPRODUCTION APPARATUS, PROGRAM AND REPRODUCTION METHOD

(75) Inventors: Wataru Ikeda, Osaka (JP); Tomoyuki Okada, Nara (JP); Hiroshi Yahata, Osaka (JP)

(73) Assignee: Panasonic Corporation, Osaka (JP)

( * ) Notice: Subject to any disclaimer, the term of this patent is extended or adjusted under 35 U.S.C. 154(b) by 1275 days.

(21) Appl. No.: 10/587,868

(22) PCT Filed: Feb. 1, 2006

(86) PCT No.: PCT/JP2006/001665
§ 371 (c)(1),
(2), (4) Date: Apr. 30, 2007

(87) PCT Pub. No.: WO2006/082850
PCT Pub. Date: Aug. 10, 2006

(65) Prior Publication Data
US 2007/0263985 A1 Nov. 15, 2007

(30) Foreign Application Priority Data
Feb. 1, 2005 (JP) .................... 2005-024757

(51) Int. Cl.
*G06F 17/00* (2006.01)
*H04R 5/00* (2006.01)
*H04N 7/00* (2011.01)
*G11B 3/74* (2006.01)

(52) U.S. Cl. ............... 700/94; 381/19; 348/485; 369/89

(58) Field of Classification Search ............ 700/94; 348/462, 465, 481, 483, 485; 381/1, 17–20, 381/80, 81; 369/86, 89
See application file for complete search history.

(56) References Cited

U.S. PATENT DOCUMENTS
5,333,276 A * 7/1994 Solari .................. 712/220
(Continued)

FOREIGN PATENT DOCUMENTS
CN 1204112 1/1999
(Continued)

OTHER PUBLICATIONS

Fielder et al., "Introduction to Dolby Digital Plus, an Enhancement to the Dolby Digital Coding System", Oct. 28-31, 2004, AES Convention Paper 6196 presented at the 117th AES Convention, pp. 1-29.*

(Continued)

*Primary Examiner* — Davetta W Goins
*Assistant Examiner* — Daniel Sellers
(74) *Attorney, Agent, or Firm* — Panasonic Patent Center; Dhiren Odedra; Kerry Culpepper

(57) ABSTRACT

The Procedure executing unit 42 makes a judgment on which among three conditions are satisfied by each of a plurality of audio streams. The BD-ROM reproduction apparatus selects an audio stream to be reproduced in accordance with each combination of conditions that are satisfied by each audio stream. One of the conditions is that a channel attribute of an audio stream is surround and the reproduction apparatus is capable to output surround audio. If the audio stream to be reproduced conforms to an encoding method such as DTS-HD or DD/DD+ whose audio frames are composed of basic data and extended data, the judgment on whether the surround output is available is made by judging whether or not the reproduction apparatus has a capability to process the extended data.

12 Claims, 46 Drawing Sheets

U.S. PATENT DOCUMENTS

| | | | |
|---|---|---|---|
| 6,038,369 A | 3/2000 | Imai | |
| 6,215,737 B1* | 4/2001 | Thagard et al. | 369/4 |
| 7,881,589 B2* | 2/2011 | Ikeda et al. | 386/263 |
| 2002/0027845 A1 | 3/2002 | Sogabe et al. | |
| 2002/0143975 A1 | 10/2002 | Kimura et al. | |
| 2004/0057452 A1 | 3/2004 | Tsuneshige et al. | |
| 2004/0128402 A1* | 7/2004 | Weaver et al. | 710/1 |
| 2004/0190726 A1* | 9/2004 | Imadate | 381/11 |
| 2004/0221069 A1 | 11/2004 | Utsunomiya et al. | |
| 2004/0223622 A1* | 11/2004 | Lindemann et al. | 381/79 |
| 2005/0074127 A1* | 4/2005 | Herre et al. | 381/20 |
| 2006/0013077 A1* | 1/2006 | Mesarovic et al. | 369/30.01 |
| 2006/0291806 A1 | 12/2006 | Ikeda et al. | |
| 2007/0036517 A1 | 2/2007 | Ikeda et al. | |
| 2007/0160350 A1 | 7/2007 | Ikeda et al. | |
| 2007/0263985 A1 | 11/2007 | Ikeda et al. | |
| 2008/0131085 A1* | 6/2008 | Ikeda et al. | 386/99 |
| 2008/0131094 A1 | 6/2008 | Ikeda et al. | |

FOREIGN PATENT DOCUMENTS

| | | |
|---|---|---|
| EP | 0 777 227 | 6/1997 |
| EP | 0 883 125 | 12/1998 |
| EP | 0 952 578 | 10/1999 |
| EP | 0 967 603 | 12/1999 |
| EP | 1 638 327 | 3/2006 |
| EP | 1 713 075 | 10/2006 |
| EP | 1 921 622 | 5/2008 |
| JP | 6-338061 | 12/1994 |
| JP | 7-296519 | 11/1995 |
| JP | 8-22281 | 1/1996 |
| JP | 10-83623 | 3/1998 |
| JP | 11-31362 | 2/1999 |
| JP | 11-185389 | 7/1999 |
| JP | 2000-11546 | 1/2000 |
| JP | 2000-137634 | 5/2000 |
| JP | 2000-228656 | 8/2000 |
| JP | 2001-86143 | 3/2001 |
| JP | 2001-312853 | 11/2001 |
| JP | 2002-190156 | 7/2002 |
| JP | 2002-208983 | 7/2002 |
| JP | 2002-520760 | 7/2002 |
| JP | 2002-297496 | 10/2002 |
| JP | 2003-264791 | 9/2003 |
| JP | 2003-345393 | 12/2003 |
| JP | 2004-112586 | 4/2004 |
| WO | 00/02357 | 1/2000 |
| WO | 01/78071 | 10/2001 |
| WO | 2004/023841 | 3/2004 |
| WO | 2004/114658 | 12/2004 |
| WO | 2006/082850 | 8/2006 |

OTHER PUBLICATIONS

Thomson, Kristin, "DTD Unveils DTS-HD Brand for High Definition Media Formats", Nov. 1, 2004, Digital Theater Systems, Inc. Press Release, pp. 1-3.*

"Special New Products (AV Review)", Ongen Publishing Co. Ltd., Dec. 25, 2004, vol. 21, No. 12, pp. 38-53.

"Shouhin Kenkyuu, Ischioshi Ichioshi Products, A&V Village", Cosmo Village Ltd., Jan. 1, 2005, pp. 83-97.

Extended European Search Report for the corresponding European Patent Application No 06712808.2, dated Oct. 5, 2009.

* cited by examiner

FIG. 12

STN_table

| |
|---|
| number_of_video_stream_entries |
| number_of_audio_stream_entries |
| number_of_PG_stream_entries |
| number_of_IG_stream_entries |
| entry-attribute |
| entry-attribute |
| entry-attribute |
| entry-attribute |
| entry-attribute |
| ⋮ |
| entry-attribute |
| entry-attribute |
| entry-attribute |
| entry-attribute |
| entry-attribute |
| ⋮ |
| entry-attribute |
| entry-attribute |
| entry-attribute |

Video stream permitted to be reproduced by PlayItem

Primary audio streams permitted to be reproduced by PlayItem

PG streams permitted to be reproduced by PlayItem

IG streams permitted to be reproduced by PlayItem

Status and Transition for PSR1

FIG. 19A

Presentation Capability (PSR 15) = LPCM ○ DD/DD+ ○ DTS-HD ×
Language setting (PSR 16) = Japanese
Surround Capability (PSR 15) = Yes

FIG. 19B

| | | | |
|---|---|---|---|
| Audio Stream 1 | DD/DD+ | 2ch | English |
| Audio Stream 2 | DD/DD+ | 5.1ch | English |
| Audio Stream 3 | DTS-HD | 5.1ch | English |
| Audio Stream 4 | DD/DD+ | 2ch | Japanese |
| Audio Stream 5 | DD/DD+ | 5.1ch | Japanese |
| Audio Stream 6 | DTS-HD | 5.1ch | Japanese |

FIG. 19C

| | Codec | Channel | Language | Check Presentation capability (a) | Check language (b) | Check surround Capability (c) | Priority |
|---|---|---|---|---|---|---|---|
| Audio Stream 1 | DD/DD+ | 2ch | English | ○ | × | × | 4 |
| Audio Stream 2 | DD/DD+ | 5.1ch | English | ○ | × | ○ | 3 |
| Audio Stream 3 | DTS-HD | 5.1ch | English | × | — | — | — |
| Audio Stream 4 | DD/DD+ | 2ch | Japanese | ○ | ○ | × | 2 |
| Audio Stream 5 | DD/DD+ | 5.1ch | Japanese | ○ | ○ | ○ | 1 |
| Audio Stream 6 | DTS-HD | 5.1ch | Japanese | × | — | — | — |

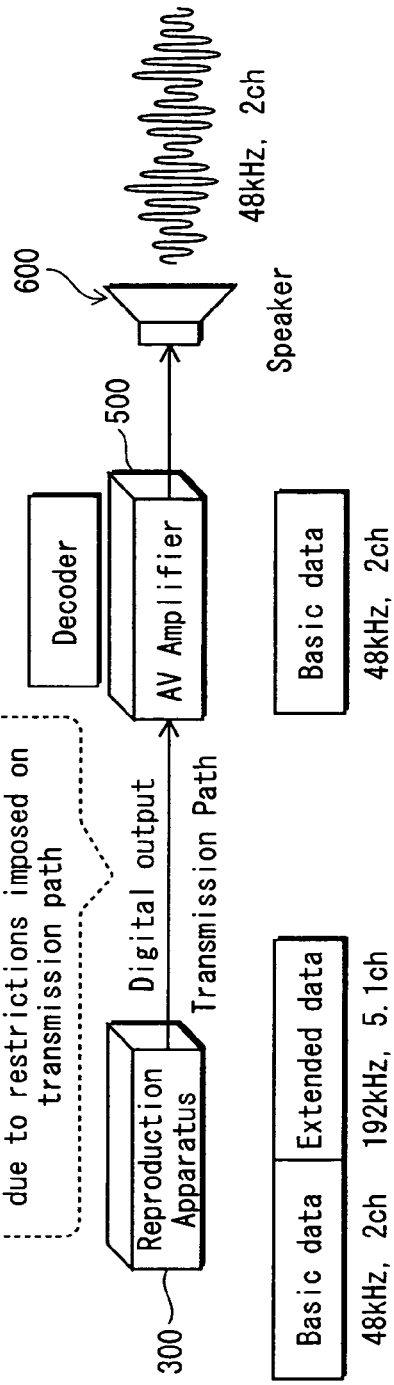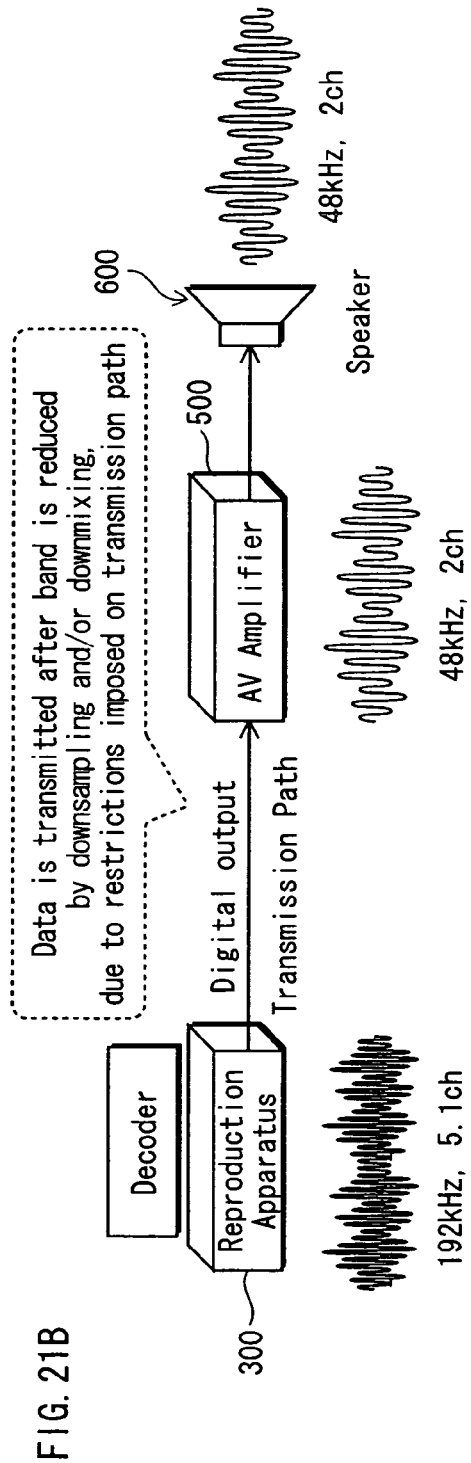

FIG. 22

| Transmission Path / Stream | S/PDIF | HDMI | Analog |
|---|---|---|---|
| LPCM | Up to 48kHz/16bit/2ch | Up to 192kHz/24bit/8ch | Depend on player |
| DTS | Output capable | Output as LPCM (output capable: note 1) | |
| DTS-HD | Only core substream (corresponding to DTS) | Output as LPCM (output capable: note 1) | |
| DD (AC-3) | Output capable | Output as LPCM (output capable: note 1) | |
| DD/DD+ | Only DD portion | Output as LPCM (output capable: note 1) | |
| DD/MLP | Only DD portion | Output as LPCM (output capable: note 1) | |

Note 1: It can be transmitted in the form of compressed data after HDMI standard is extended in future

FIG. 23A

PSR15

| | Decoding Capability | Transmission Path Capability | Speaker Construction |
|---|---|---|---|
| CODEC = LPCM | Parameter 1 | Parameter 2 | Parameter 3 |

FIG. 23B

| | Definition Column | Note Column |
|---|---|---|
| Decoding Capability: | Either 48/96kHz or 48/96/192kHz, as decoding capability for LPCM | Values of kHz, number of bits, and number of channels up to which LPCM can be decoded |
| Transmission Path Capability: | Whether transmission with three or more channels (surround) is capable | Values of kHz, number of bits, and number of channels up to which LPCM can be transmitted |
| Speaker Construction: | Whether surround output is capable | Whether surround output is capable |

FIG. 24A

PSR15

| | Decoding Capability | Transmission Path Capability | Speaker Construction |
|---|---|---|---|
| CODEC = DTS-HD | Parameter 1 | Parameter 2 | Parameter 3 |

FIG. 24B

| | Definition Column | Note Column |
|---|---|---|
| Decoding Capability : | Whether only DTS and Core Substream of DTS-HD can be decoded or Extension Substream can also be decoded | • Whether DTS audio can be decoded<br>• Whether Core Substream of DTS-HD can be decoded<br>• Whether Extension Substream of DTS-HD can be decoded<br>• Whether Lossless data can be decoded |
| Transmission Path Capability : | Whether Extension substream can be transmitted | Whether Extension substream can be transmitted |
| Speaker Construction : | Whether surround output is capable | Whether surround output is capable |

FIG. 25A

PSR15

| Decoding Capability | Transmission Path Capability | Speaker Construction |
|---|---|---|
| Parameter 1 | Parameter 2 | Parameter 3 |

CODEC = DD/DD+

FIG. 25B

| | Definition Column | Note Column |
|---|---|---|
| Decoding Capability: | Whether only DD and DD portion of DD/DD+ can be decoded or DD+ portion can also be decoded | • Whether DD (AC-3) can be decoded<br>• Whether DD portion of DD/DD+ can be decoded<br>• Whether DD+ portion of DD/DD+ can be decoded |
| Transmission Path Capability: | Whether DD+ portion (Substream) of DD/DD+ can be transmitted | Whether DD+ portion (Substream) of DD/DD+ can be transmitted |
| Speaker Construction: | Whether surround output is capable | Whether surround output is capable |

FIG. 26A

PSR15

| Decoding Capability | Transmission Path Capability | Speaker Construction |
|---|---|---|
| Parameter 1 | Parameter 2 | Parameter 3 |

CODEC = DD/MLP

FIG. 26B

| | Definition Column | Note Column |
|---|---|---|
| Decoding Capability: | Whether only DD and DD portion of DD/MLP can be decoded or MLP portion can also be decoded | • Whether DD (AC-3) can be decoded<br>• Whether DD portion of DD/MLP can be decoded<br>• Whether MLP portion of DD/MLP can be decoded |
| Transmission Path Capability: | Whether MLP portion (Substream) of DD/MLP can be transmitted | Whether MLP portion (Substream) of DD/MLP can be transmitted |
| Speaker Construction: | Whether surround output is capable | Whether surround output is capable |

FIG. 27A

PSR15

| | Decoding Capability | Transmission Path Capability | Speaker Construction |
|---|---|---|---|
| CODEC = DD/DD+ | Parameter 1a | Parameter 2 | Parameter 3 |
| CODEC = DD/MLP | Parameter 1b | | |

FIG. 27B

| | Definition Column | Note Column |
|---|---|---|
| Decoding Capability: | Whether only DD and DD portion of DD/DD+ or DD/MLP can be decoded or DD+ or MLP portion can also be decoded | • Whether DD (AC-3) can be decoded<br>• Whether DD portion of DD/DD+ or DD/MLP can be decoded<br>• Whether DD+ portion of DD/DD+ can be decoded<br>• Whether MLP portion of DD/MLP can be decoded |
| Transmission Path Capability: | Whether DD+ or MLP portion (Substream) of DD/DD+ or DD/MLP can be transmitted | Whether DD+ or MLP portion (Substream) of DD/DD+ or DD/MLP can be transmitted |
| Speaker Construction: | Whether surround output is capable | Whether surround output is capable |

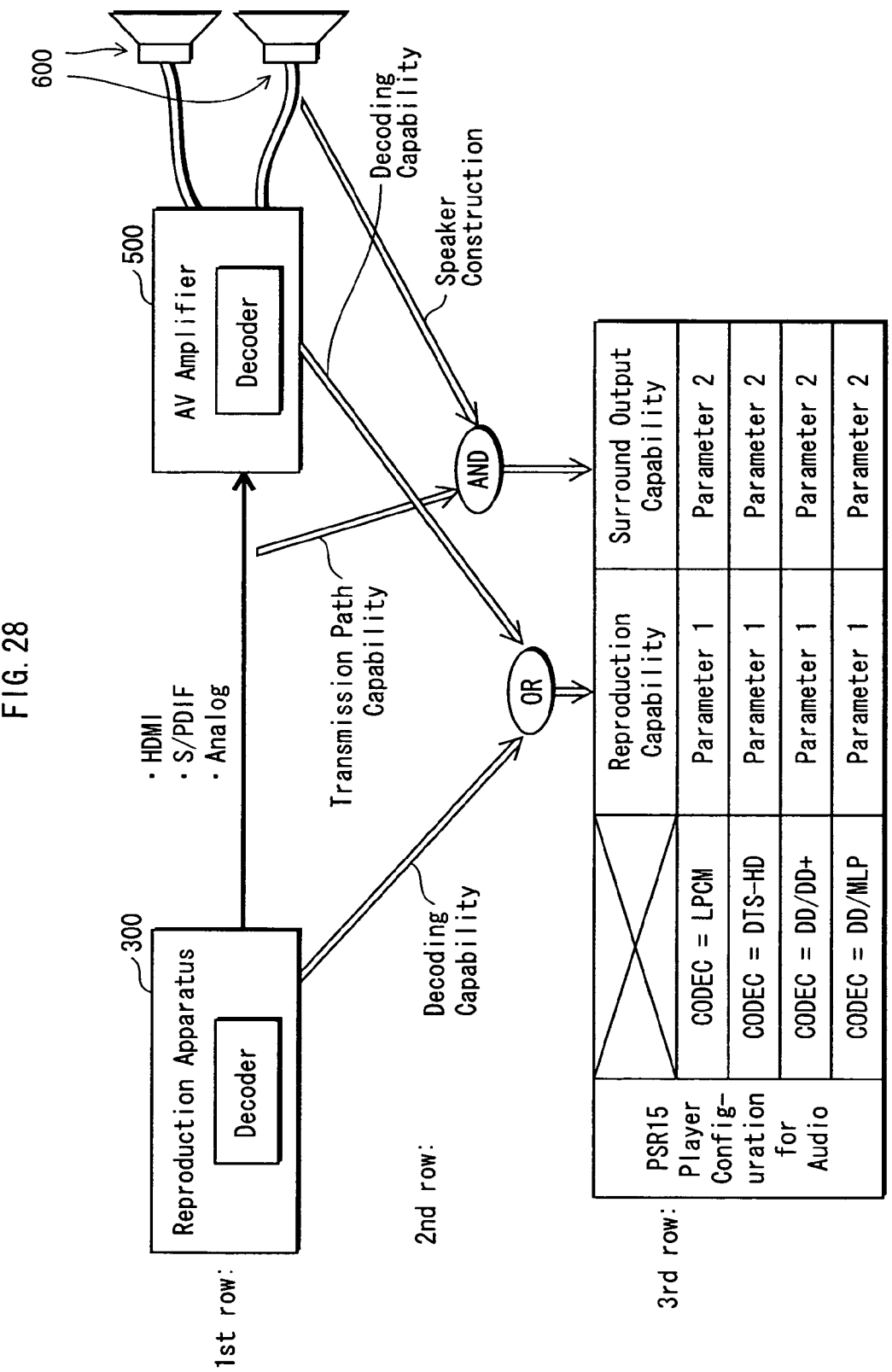

FIG. 29A

PSR15

| Reproduction Capability<br>= Decoding Capability | Surround Output Capability<br>= Speaker Construction AND<br>Transmission Path Capability |
|---|---|
| Parameter 1 | Parameter 2 |

CODEC = LPCM

FIG. 29B

| | | Transmission Path Capability | |
|---|---|---|---|
| | | Transmission capable with only 2 channels | Transmission capable with up to 8 channels |
| Speaker Construction | Two or less | Only stereo output | Only stereo output |
| | Three or more, or virtual surround can be achieved | Only stereo output | Surround output capable |

Values to be set in Parameter 2

FIG. 31A

PSR15

| CODEC = LPCM | Reproduction Capability<br>= Decoding Capability AND<br>Transmission Path Capability | Surround Output Capability<br>= Speaker Construction AND<br>Transmission Path Capability |
|---|---|---|
| | Parameter 1 | Parameter 2 |

FIG. 31B

Values to be set in Parameter 1

| | | Transmission Path Capability | |
|---|---|---|---|
| | | Transmission capable at 48kHz | Transmission capable at 192kHz |
| Decoding Capability | Decoding for 48kHz/96kHz is capable | 48kHz LPCM is transmitted as it is, 96kHz LPCM is subjected to downsampling before transmission → reproduction of 48kHz/96kHz LPCM capable | Reproduction of 48kHz/96kHz LPCM capable |
| | Decoding for 192kHz is also capable | 48kHz LPCM is transmitted as it is, 96kHz/192kHz LPCM is subjected to downsampling before transmission → reproduction capable | Reproduction capable |

FIG. 33A

PSR15

| Reproduction Capability = Decoding Capability AND Transmission Path Capability | Surround Output Capability = Speaker Construction |
|---|---|
| Parameter 1 | Parameter 2 |

CODEC = DTS
CODEC = DTS-HD

FIG. 33B

| | | Transmission Path Capability | |
|---|---|---|---|
| | | Transmission of DTS Stream and Core Substream capable | Transmission of Extension Substream also capable |
| Decoding Capability | Decoding incapable | Reproduction incapable | Reproduction incapable |
| | Decoding of DTS and Core Substream of DTS-HD capable | Reproduction of DTS and Core Substream of DTS-HD capable | Reproduction of DTS and Core Substream of DTS-HD capable |
| | Decoding of Extension Substream of DTS-HD also capable | Reproduction of DTS and Core Substream of DTS-HD capable | Reproduction of DTS and DTS-HD capable |

Values to be set in Parameter 1

FIG. 34A

PSR15

| | Reproduction Capability = Decoding Capability AND Transmission Path Capability | Surround Output Capability = Speaker Construction |
|---|---|---|
| CODEC = DD (AC-3) CODEC = DD/DD+ | Parameter 1 | Parameter 2 |

FIG. 34B

| | | Transmission Path Capability | |
|---|---|---|---|
| | | Transmission of DD and DD portion of DD/DD+ capable | Transmission of DD+ portion of DD/DD+ also capable |
| Decoding Capability | Decoding incapable | Reproduction incapable | Reproduction incapable |
| | Decoding of DD and DD portion of DD/DD+ capable | Reproduction of DD and DD portion of DD/DD+ capable | Reproduction of DD and DD portion of DD/DD+ capable |
| | Decoding of DD+ portion of DD/DD+ also capable | Reproduction of DD and DD portion of DD/DD+ capable | Reproduction of DD and DD/DD+ capable |

Values to be set in Parameter 1

FIG. 35A

PSR15

| | Reproduction Capability = Decoding Capability AND Transmission Path Capability | Surround Output Capability = Speaker Construction |
|---|---|---|
| CODEC = DD (AC-3) | Parameter 1 | Parameter 2 |
| CODEC = DD/MLP | | |

FIG. 35B

Values to be set in Parameter 1

| | | Transmission Path Capability | | |
|---|---|---|---|---|
| | | Transmission of DD and DD portion of DD/MLP capable | Transmission of DD and DD portion of DD/MLP capable | Transmission of MLP portion of DD/MLP also capable |
| Decoding Capability | Decoding incapable | Reproduction incapable | Reproduction incapable | Reproduction incapable |
| | Decoding of DD and DD portion of DD/MLP capable | Reproduction of DD and DD portion of DD/MLP capable | Reproduction of DD and DD portion of DD/MLP capable | Reproduction of DD and DD portion of DD/MLP capable |
| | Decoding of MLP portion of DD/MLP also capable | Reproduction of DD and DD portion of DD/MLP capable | Reproduction of DD and DD portion of DD/MLP capable | Reproduction of DD and DD/MLP capable |

FIG. 43

PSR15:Player Capability for Audio

| b31 | b30 | b29 | b28 | b27 | b26 | b25 | b24 |
|---|---|---|---|---|---|---|---|
| reserved | | | | | | | |

| b23 | b22 | b21 | b20 | b19 | b18 | b17 | b16 |
|---|---|---|---|---|---|---|---|
| reserved | | | | | | | |

| b15 | b14 | b13 | b12 | b11 | b10 | b9 | b8 |
|---|---|---|---|---|---|---|---|
| DD/MLP | | | | DTS-HD capability | | | |
| MLP audio | | DD(AC-3) | | Extension Substream | | Core Substream | |

| b7 | b6 | b5 | b4 | b3 | b2 | b1 | b0 |
|---|---|---|---|---|---|---|---|
| DD/DD+ capability | | | | LPCM capability | | | |
| Dependent substream | | Independent substream | | | | | |

LPCM capability ··· 0001b:Stereo capable for 48/96kHz
0010b:Surround capable for 48/96kHz
0101b:Stereo capable for all sampling frequency
0110b:Surround capable for all sampling frequency Note: A second left bit specifies capability of decoding for 192kHz LPCM.

DD/DD+ capability

| Independent substream (Dolby Digital) | ··· | 01b:Stereo capable |
| | | 10b:Surround capable |
| Dependent substream | ··· | 00b:incapable |
| | | 01b:Stereo capable |
| | | 10b:Surround capable |

DTS-HD capability

| Core substream | ··· | 01b:Stereo capable |
| | | 10b:Surround capable |
| Extension substream | ··· | 00b:incapable |
| | | 01b:Stereo capable |
| | | 10b:Surround capable |

DD/MLP capability

| DD(AC-3) | ··· | 01b:Stereo capable |
| | | 10b:Surround capable |
| MLP audio | ··· | 00b:incapable |
| | | 01b:Stereo capable |
| | | 10b:Surround capable |

REPRODUCTION APPARATUS, PROGRAM AND REPRODUCTION METHOD

TECHNICAL FIELD

The present invention relates to a technical field including a technology for automatically selecting surround audio.

BACKGROUND ART

With the technology for automatically selecting surround audio, it is possible for an audio stream with the surround attribute to be selected automatically among a plurality of audio streams that can be reproduced in synchronization with a video stream and are registered with the management table in a recording medium. Motion pictures produced in recent years have a tendency to give importance to the acoustic effects, providing surround audio as well as stereo for reproduction. In these circumstances, there is a demand for the technology for automatically selecting surround audio when there is a surround audio stream and the reproduction apparatus supports the reproduction thereof. The following document discloses a technology for selecting an audio stream.
Document 1: Japanese Laid-Open Patent Application No. 2000-228656

DISCLOSURE OF THE INVENTION

The Problems the Invention is Going to Solve

For the technology for automatically selecting surround audio to be achieved, the audio stream to be reproduced needs to have surround attribute, and the reproduction apparatus side needs to be capable to decode a surround audio stream.

In recent years, however, various audio encoding methods have been provided, including those such as DTS-HD (Digital Theater System-High Definition) and DD/DD+ (Dolby Digital/Dolby Digital+) whose audio frames, which constitute the audio streams, are composed of basic data and extended data, where the basic data is provided to maintain the backward compatibility. When an audio stream conforming to such an encoding method with the basic data and extended data is reproduced, there are two cases: (i) only the basic data is decoded; and (ii) the extended data is decoded. Even if the number of channels for surround, such as 5.1 ch or 7.1 ch, is written in the audio stream management table, the audio stream can be reproduced with the specified number of channels only when the extended data of the audio frames is decoded. Merely decoding the basic data may not enable the audio stream to be reproduced with the specified number of channels.

When there are two audio streams the first one of which conforms to an encoding method for surround audio reproduction, and the second one of which conforms to another encoding method for which decoding of only the basic data for the backward compatibility is available, a conventional reproduction apparatus may select the second audio stream if the management table includes only description of the second audio stream, without description of the first audio stream. Such a disadvantageous election often occurs when a person in charge of authoring assigns, in the management table, a higher priority to the second audio stream than the first audio stream. When this happens, the user has to view the motion picture with the stereo audio even if the recording medium provides an audio stream conforming to an encoding method for surround audio reproduction.

The above-described problem would not occur if the reproduction apparatus has specifications to decode the extended data for all the encoding methods. However, since various audio encoding methods have been provided in recent years, it would increase the cost of the reproduction apparatus if the reproduction apparatus was made to have specifications to decode, for all the encoding methods, the extended data to output surround audio.

It is accordingly an object of the present invention to provide a reproduction apparatus that selects an audio stream for surround output even if the management table of the recording medium includes description of an audio stream which conforms to an encoding method for which decoding of only the basic data for the backward compatibility is available.

Means to Solve the Problems

The above-described object of the present invention is fulfilled by a reproduction apparatus comprising: a selecting unit operable to make a judgment on which among a plurality of predetermined conditions are satisfied by each of a plurality of audio streams, and to select an audio stream to be reproduced among the plurality of audio streams, in accordance with each combination of predetermined conditions satisfied by each audio stream; and a reproducing unit operable to reproduce the selected audio stream, wherein one of the plurality of predetermined conditions is that a channel attribute of an audio stream is surround and a surround output is available, and if an audio frame of a target audio stream is composed of basic data and extended data, the selecting unit judges whether or not the predetermined condition is satisfied by detecting whether or not a channel attribute of the extended data is surround and the extended data is capable to be processed.

Effects of the Invention

With the above-described construction, with respect to an audio stream conforming to an encoding method whose audio frames, which constitute the audio streams, are composed of basic data and extended data, it is judged whether or not the predetermined condition for selecting an audio stream is satisfied by detecting whether or not the extended data is capable to be processed. As a result of this, audio streams, which conform to encoding methods whose extended data is not capable to be processed, are not selected to be reproduced. With this construction, an audio stream to be reproduced is selected from audio streams for which the extended data can be processed. This increases the possibility of performing the surround reproduction when the recording medium side provides an encoding method for which surround reproduction is available, and the reproduction apparatus side has a capability to perform the surround output.

Only by improving the procedure for judging whether or not the surround output is capable as the present invention discloses, it becomes possible to select a surround audio stream which includes audio frames composed of the basic data and the extended data.

BRIEF DESCRIPTION OF THE DRAWING

FIG. 12 shows the internal structure of the STN_table.

FIGS. 19A to 19C show specific examples of audio stream selections in the "Procedure when playback condition is changed".

FIGS. 21A and 21B show adverse effects caused by the restrictions imposed by the standards on the transmission path between the reproduction apparatus 300 and the AV amplifier 500.

FIG. 22 shows, in the format of a table, how can the LPCM, DTS-HD, AC-3, DD/DD+, and DD/MLP used in the BD-ROM be output for each of the analog, S/PDIF, and HDMI outputs that are broadly used as the output method of the digital AV reproduction apparatus 300.

FIG. 23A shows parameters for the LPCM.

FIG. 23B shows, in the format of a table, the parameters 1 to 3 and the definitions of them.

FIG. 24A shows parameters for the DTS-HD.

FIG. 24B shows, in the format of a table, the parameters 1 to 3 and the definitions of them.

FIG. 25A shows parameters for the DD/DD+.

FIG. 25B shows, in the format of a table, the parameters 1 to 3 and the definitions of them.

FIG. 26A shows parameters for the DD/MLP.

FIG. 26B shows parameters 1 to 3 and the definitions of them.

FIG. 27A shows parameters for the DD/DD+ and DD/MLP.

FIG. 27B shows, in the format of a table, the parameters 1a, 1b, 2, and 3 and the definitions of them.

FIG. 28 shows a setting of parameters 1-2 for LPCM.

FIG. 29A shows the reproduction capability (parameter 1), which is referred to for the judgment on the condition (a), and the surround output capability (parameter 2) which is referred to for the judgment on the condition (c).

FIG. 29B shows how parameter 2 is set from the combination of the transmission path capability and the speaker construction.

FIG. 31A shows an example of defining the capabilities for the LPCM, from the reproduction capability (parameter 1), which is referred to for the judgment on the condition (a), and the surround output capability (parameter 2) which is referred to for the judgment on the condition (c).

FIG. 31B shows how parameter 1 is set from the combination of the decoding capability and the transmission path capability.

FIG. 33A shows an example of defining the capabilities, from the reproduction capability (parameter 1), which is referred to for the judgment on the condition (a), and the surround output capability (parameter 2) which is referred to for the judgment on the condition (c).

FIG. 33B shows how parameter 1 is set from the combination of the decoding capability and the transmission path capability.

FIG. 34A shows an example of defining the capabilities for the DD (AC-3) and DD/DD+, from the reproduction capability (parameter 1), which is referred to for the judgment on the condition (a), and the surround output capability (parameter 2) which is referred to for the judgment on the condition (c).

FIG. 34B shows how parameter 1 is set.

FIG. 35A shows an example of defining the capabilities for the DD (AC-3) and DD/MLP, from the reproduction capability (parameter 1), which is referred to for the judgment on the condition (a), and the surround output capability (parameter 2) which is referred to for the judgment on the condition (c).

FIG. 35B shows how parameter 1 is set.

FIG. 43 shows the internal structure of PSR15 in the PSR set 23.

DESCRIPTION OF CHARACTERS

Figure 1:
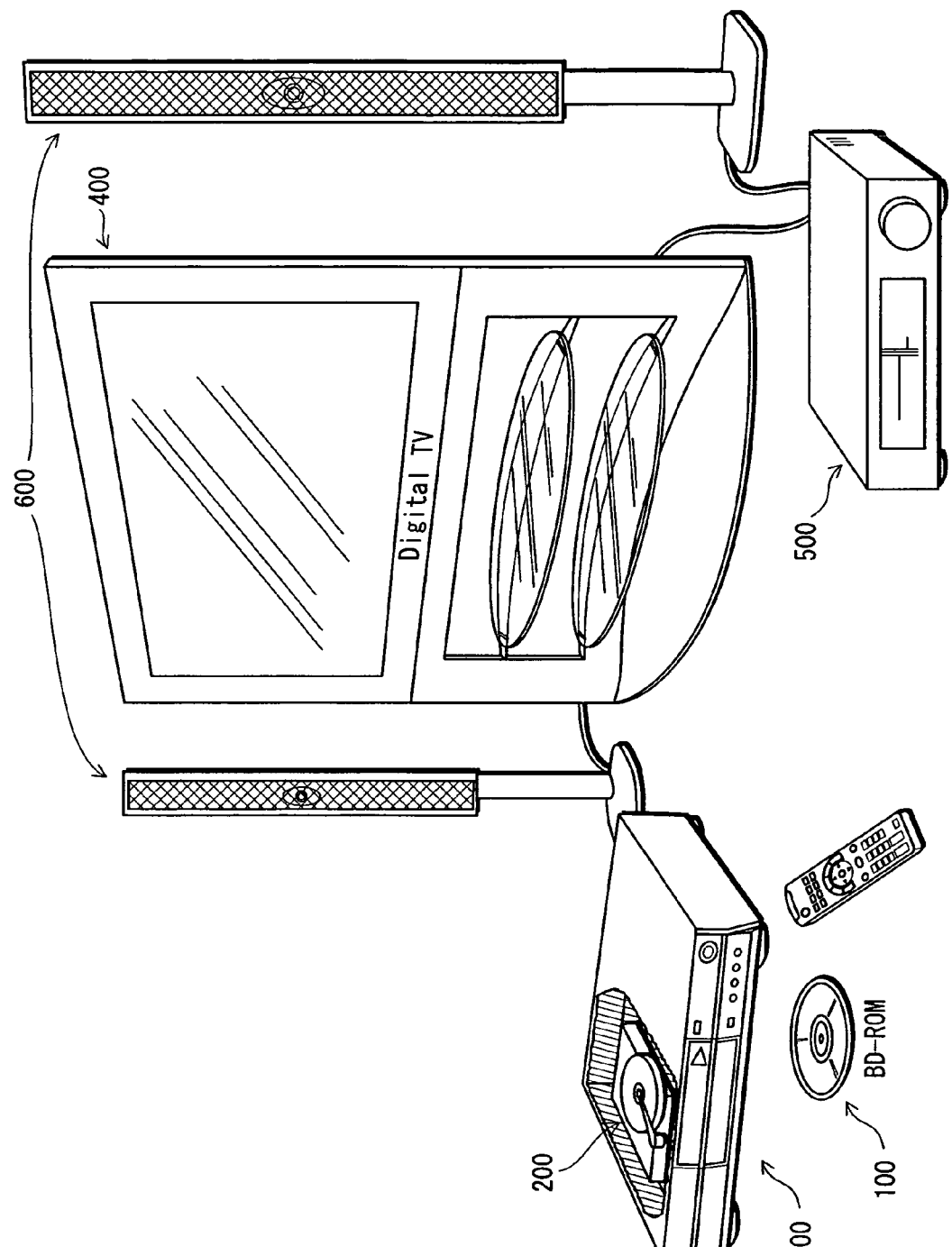
FIG. 1 shows a use of the reproduction apparatus of the present invention.

100 BD-ROM
200 local storage
300 reproduction apparatus
400 television
500 AV amplifier
600 speakers
1 BD-ROM drive
2 read buffer
3 demultiplexer
4 video decoder
5 video plane
6 buffer
7 audio decoder
10 switch
11 Interactive Graphics decoder
12 Interactive Graphics plane
13 Presentation Graphics decoder
14 Presentation Graphics plane
17 combining unit
18 STC generating unit
19 ATC generating unit
21 memory
22 controller
23 PSR set
24 conversion unit
25 communication unit
26 operation receiving unit
27 HDMI transmission/reception unit
41 PlayList processing unit
42 Procedure executing unit
43 PSR setting unit

BEST MODE FOR CARRYING OUT THE INVENTION

First Embodiment

The following describes an embodiment of the reproduction apparatus of the present invention. First, the use of the reproduction apparatus of the present invention will be described. FIG. 1 shows a use of the reproduction apparatus of the present invention. In FIG. 1, the reproduction apparatus of the present invention is a reproduction apparatus 300. The reproduction apparatus 300 is used in a home theater system that includes a television 400, an AV amplifier 500, and speakers 600.

The BD-ROM 100, the local storage 200, and the reproduction apparatus 300 will now be described.

The BD-ROM 100 is a recording medium in which a motion picture is recorded.

The local storage 200 is a hard disk or a SD memory card, where the hard disk is embedded in the reproduction apparatus, and is used for storing a content that is distributed from a server of a motion picture distributor.

The reproduction apparatus 300 is a digital home electric appliance supported for networks, and has a function to reproduce a content of the BD-ROM 100. The reproduction apparatus 300 is also able to combine a content, which is downloaded from the server of the motion picture distributor via a network, with the content recorded on the BD-ROM 100 to expand/update the content of the BD-ROM 100. With a technology called "virtual file system", it is possible to combine a content recorded on the BD-ROM 100 with a content recorded on the local storage 200 and treat the data, which is not recorded on the BD-ROM 100, as if it is recorded on the BD-ROM 100.

The television 400, AV amplifier 500, and speakers 600 are devices that receive outputs for reproduction from the reproduction apparatus 300. Such devices that receive outputs for reproduction are referred to as "receivers". Up to now, the use of the reproduction apparatus of the present invention has been described.

Figure 2:
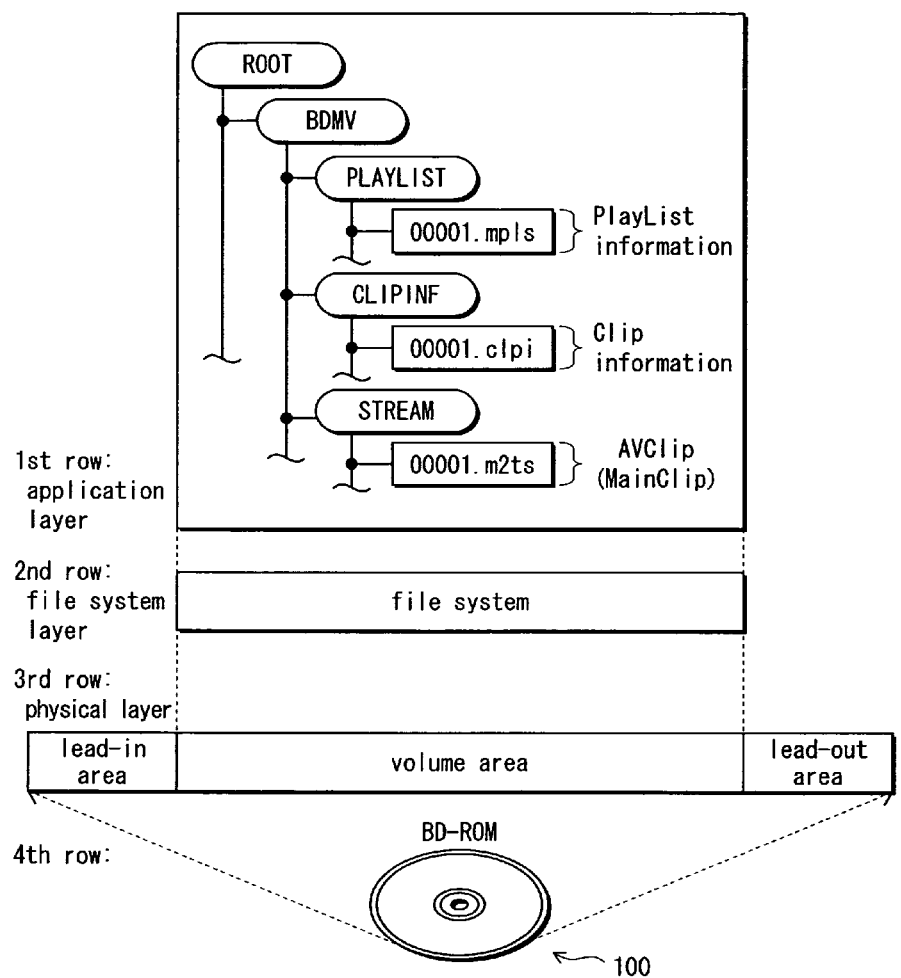
FIG. 2 shows the internal structure of the BD-ROM.

From now on, the internal structure of the BD-ROM 100 will be described. FIG. 2 shows a file/directory structure of the BD-ROM. In FIG. 2, file/directory structure of the BD-ROM includes a BDMV directory under a root directory.

<BD-ROM Outline>

FIG. 2 shows an internal structure of the BD-ROM. The fourth row of FIG. 2 shows the BD-ROM. The third row shows tracks on the BD-ROM. FIG. 2 shows the tracks in the state where they are horizontally extended though they are in reality formed spirally in order from the inner circumference to the outer circumference. The tracks include a lead-in area, a volume area, and a lead-out area. The volume area of FIG. 2 has a layer model that includes a physical layer, a file system layer, and an application layer. The $1^{st}$ row of FIG. 2 shows an application layer format (application format) of the BD-ROM represented by a directory structure. In the $1^{st}$ row of FIG. 2, the BD-ROM includes a BDMV directory under a root directory.

Under the BDMV directory, there are three subdirectories: PLAYLIST directory, CLIPINF directory, and STREAM directory.

The PLAYLIST directory includes a file to which an extension "mpls" is attached ("00001.mpls").

The CLIPINF directory includes a file to which an extension "clpi" is attached ("00001.clpi").

The STREAM directory includes a file to which an extension "m2ts" is attached ("00001.m2ts").

It is understood from the above-described directory structure that a plurality of different types of files are stored in the BD-ROM.

<BD-ROM Structure 1: AVClip>

Figure 3:
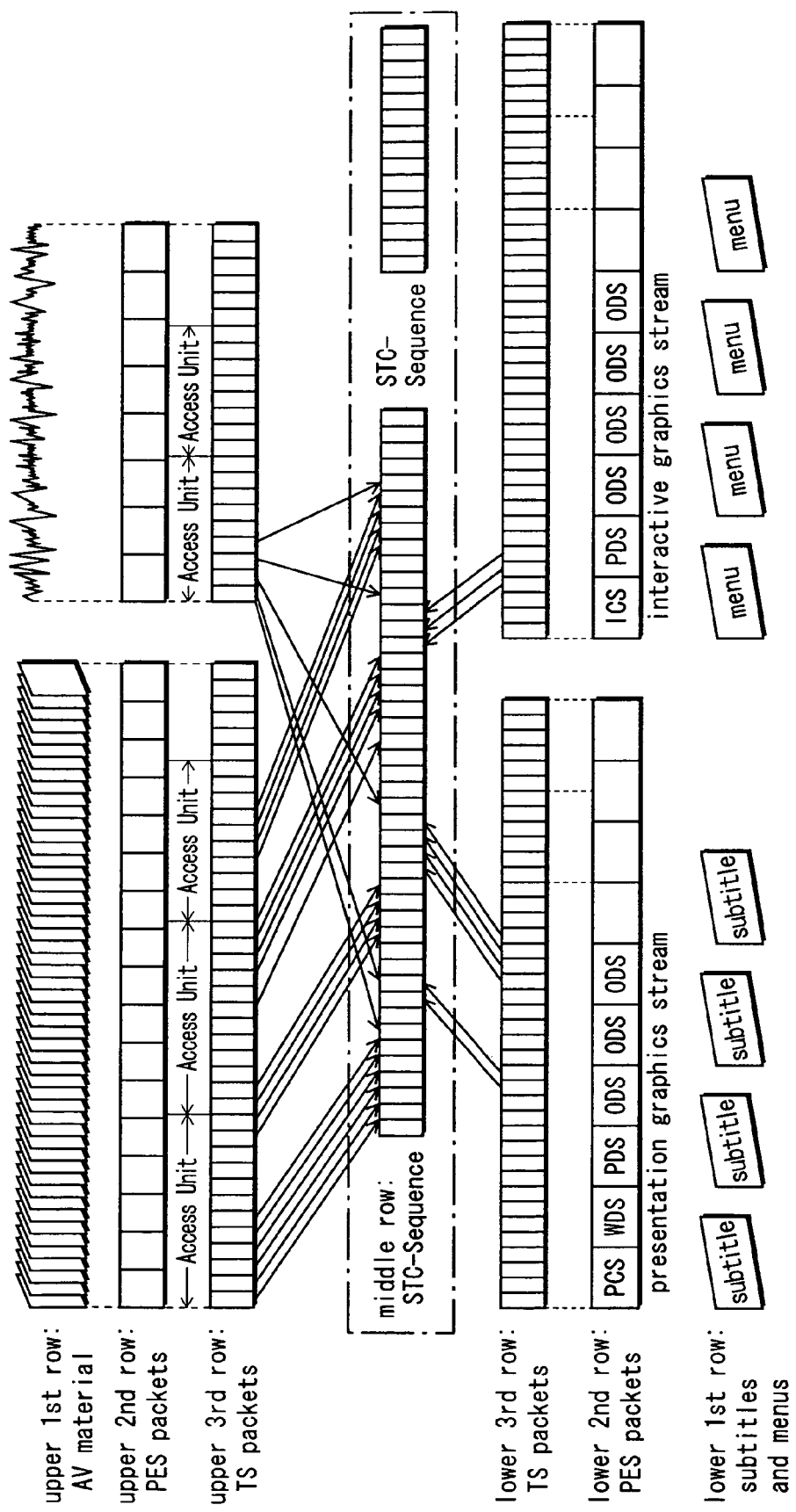
FIG. 3 shows the structure of the file to which the extension "m2ts" is attached.

Firstly, files with the extension "m2ts" will be explained. FIG. 3 shows the structure of the file to which the extension "m2ts" is attached. The file to which the extension "m2ts" is attached ("00001.m2ts") stores an AVClip. The AVClip is a digital stream in the MPEG2-Transport Stream format. The digital stream is generated by converting the digitized video and audio (upper $1^{st}$ row) into an elementary stream composed of PES packets (upper $2^{nd}$ row), and converting the elementary stream into TS packets (upper $3^{rd}$ row), and similarly, converting the Presentation Graphics (PG) stream for the subtitles or the like and the Interactive Graphics (IG) stream for the interactive purposes (lower $1^{st}$ row, lower 2nd row) into the TS packets ($3^{rd}$ row), and then finally multiplexing these TS packets.

The PG stream is an elementary stream for achieving a subtitle that accompanies the reproduced video images. The IG stream is an elementary stream for achieving a GUI that accompanies the reproduced video images.

Here, PES packets constituting the AVClip constitute one or more "STC_Sequences". The "STC_Sequence" is a sequence of PES packets whose System Time Clock (STC) values, which are referred to by PTS and DTS, do not include a system time-base discontinuity. Since each STC_Sequence is required not to include a system time-base discontinuity, one STC_Sequence starts with a PES packet that includes a PCR (Program Clock Reference) and is immediately after a system time-base discontinuity and ends with a PES packet that is immediately before the next system time-base discontinuity.

Figure 4:
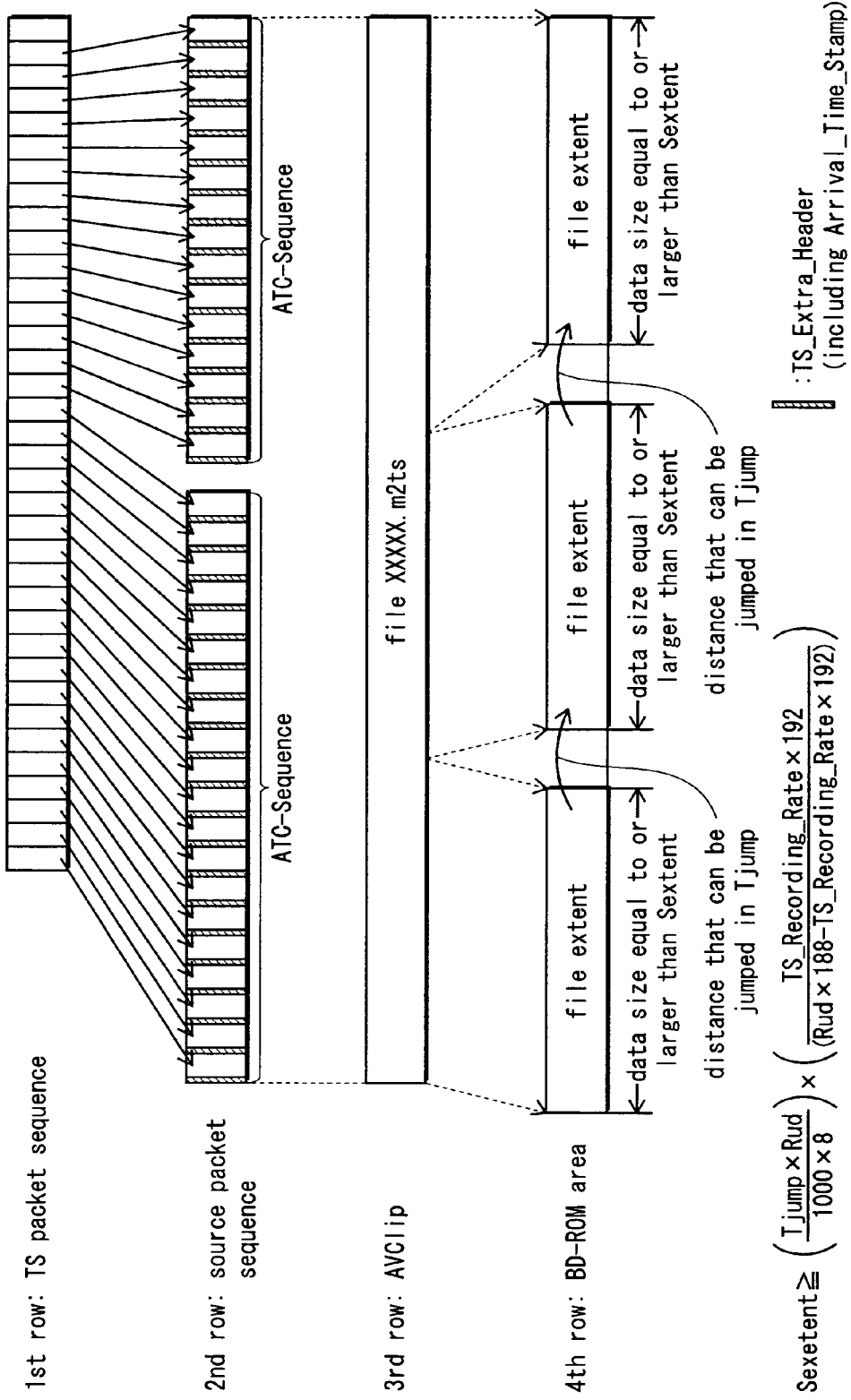
FIG. 4 shows what processes the TS packets constituting the AVClip are subjected to before they are written to the BD-ROM.

Next, how the AVClip having the above-described construction is written to the BD-ROM will be explained. FIG. 4 shows what processes the TS packets constituting the AVClip are subjected to before they are written to the BD-ROM. The $1^{st}$ row of FIG. 4 shows the TS packets constituting the AVClip.

As shown in the $2^{nd}$ row of FIG. 4, a 4-byte TS_extra_header (shaded portions in the drawing) is attached to each 188-byte TS packet constituting the AVClip to generate each 192-byte Source packet. The TS_extra_header includes Arrival_Time_Stamp.

The AVClip shown in the $3^{rd}$ row includes one or more "ATC_Sequences" each of which is a sequence of Source packets. The "ATC_Sequence" is a sequence of Source packets, where Arrival_Time_Clocks referred to by the Arrival_Time_Stamps included in the ATC_Sequence do not include "arrival time-base discontinuity". In other words, the "ATC_Sequence" is a sequence of Source packets, where Arrival_Time_Clocks referred to by the Arrival_Time_Stamps included in the ATC_Sequence are continuous.

Such ATC_Sequences constitute the AVClip, and is recorded on the BD-ROM with a file name "xxxxx.m2ts".

The AVClip is, as is the case with the normal computer files, divided into one or more file extents, which are then recorded in areas on the BD-ROM. The $4^{th}$ row shows how the AVClip is recorded on the BD-ROM. In the $4^{th}$ row, each file extent constituting the file has a data length that is equal to or larger than a predetermined length called Sextent.

Sextent is the minimum data length of each file extent, where an AVClip is divided into a plurality of file extents to be recorded.

It is presumed here that the time required for the optical pickup to jump to a location on the BD-ROM is obtained by the following equation:

$$Tjump=Taccess+Toverhead$$

The "Taccess" is a time (ms) that corresponds to a jump distance, and is obtained as follows.
Taccess is:
179 ms when the number of logical blocks as the jump distance is 0-5000;
210 ms when the number of logical blocks as the jump distance is 5001-10,000;
270 ms when the number of logical blocks as the jump distance is 10,001-20,000;
990 ms when the jump distance is a half stroke; and
1220 ms when the jump distance is a full stroke.

The TS packets read out from the BD-ROM are stored in a buffer called the read buffer, and then output to the decoder. The "Toverhead" is obtained by the following equation when the input to the read buffer is performed with a bit rate called the Rud and the number of sectors in the ECC block is represented by Secc:

$$Toverhead \leq (2 \times Secc \times 8)/Rud = 20 msec$$

TS packets read out from the BD-ROM are stored in the read buffer in the state of Source packets, and then supplied to the decoder at a transfer rate called "TS_Recording_rate".

To keep the transfer rate of the TS_Recording_rate while the TS packets are supplied to the decoder, it is necessary that during Tjump, the TS packets are continuously output from the read buffer to the decoder. Here, Source packets, not TS packets, are output from the read buffer. As a result, when the ratio of the TS packet to the Source packet in size is 192/188, it is necessary that during Tjump, the Source packets are continuously output from the read buffer at a transfer rate of "192/188×TS_Recording_rate".

Accordingly, the amount of occupied buffer capacity of the read buffer that does not cause an underflow is represented by the following equation:

$$Boccupied \geq (Tjump/1000 \times 8) \times ((192/188) \times TS\_Recording\_rate).$$

The input rate to the read buffer is represented by Rud, and the output rate from the read buffer is represented by TS_Recording_rate×(192/188). Therefore, the occupation rate of the read buffer is obtained by performing "(input rate)−(output rate)", and thus obtained by "(Rud−TS_Recording_rate)×(192/188)".

The time "Tx" required to occupy the read buffer by "Boccupied" is obtained by the following equation:

$$Tx = Boccupied/(Rud - TS\_Recording\_rate \times (192/188))$$

When reading from the BD-ROM, it is necessary to continue to input TS packets with the bit rate Rud for the time period "Tx". As a result, the minimum data length Sextent per extent when the AVClip is divided into a plurality of file extents to be recorded is obtained by the following equations:

$$Sextent = Rud \times Tx$$

$$= Rud \times Boccupied/(Rud - TS\_Recording\_rate \times (192/188))$$

$$\geq Rud \times (Tjump/1000 \times 8) \times ((192/188) \times TS\_Recording\_rate)/(Rud - TS\_Recording\_rate \times (192/188))$$

$$\geq (Rud \times Tjump/1000 \times 8) \times TS\_Recording\_rate \times 192/(Rud \times 188 - TS\_Recording\_rate \times 192)$$

Hence, $$Sextent \geq (Tjump \times Rud/1000 \times 8) \times (TS\_Recording\_rate \times 192/(Rud \times 188 - TS\_Recording\_rate \times 192))$$

If each file extent constituting the AVClip has the data length that is equal to or larger than Sextent that is calculated as a value that does not cause an underflow of the decoder, even if the file extents constituting the AVClip are located discretely on the BD-ROM, TS packets are continuously supplied to the decoder so that the data is read out continuously during reproduction.

Figure 5:
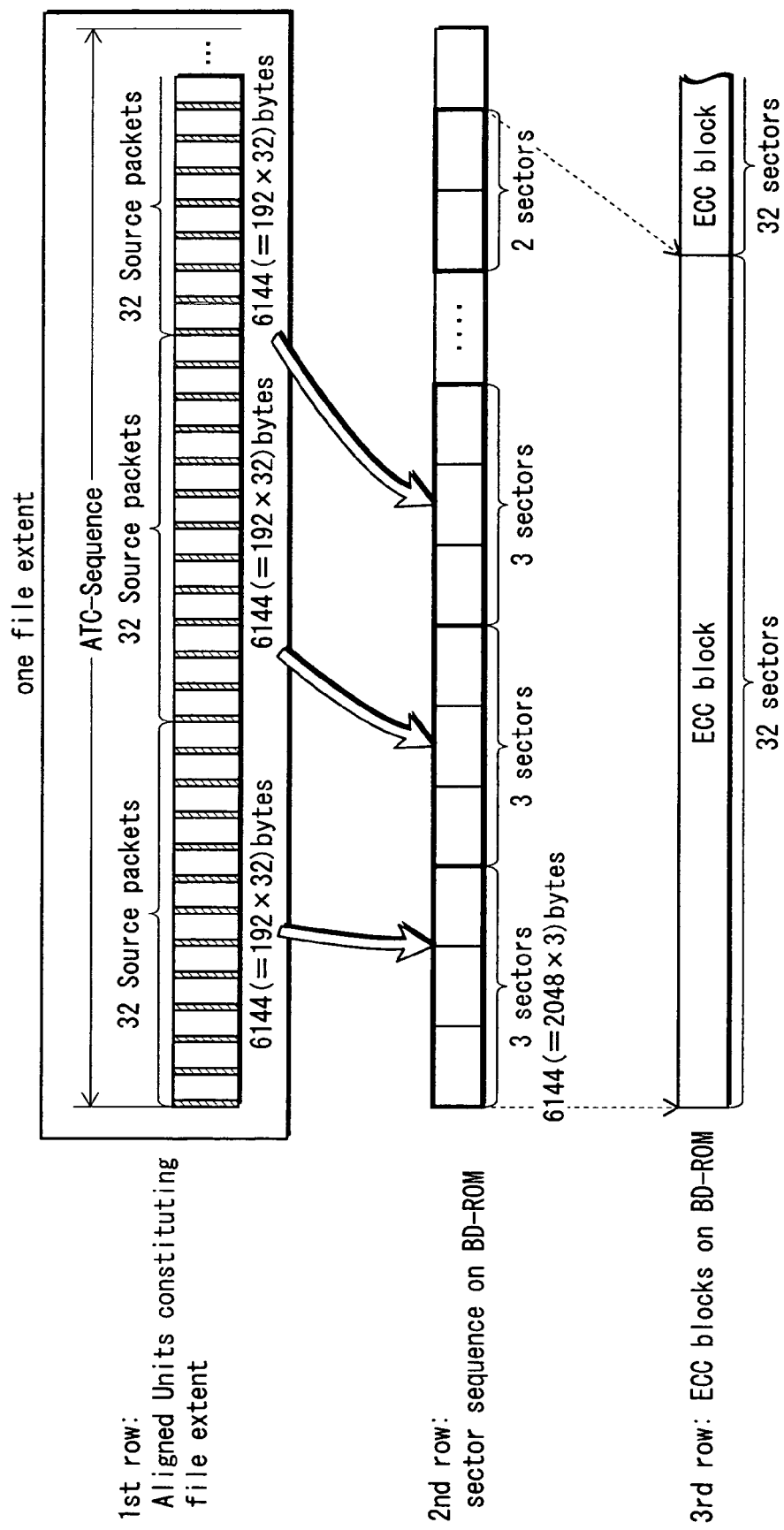
FIG. 5 shows relationships between the physical unit of the BD-ROM and the Source packets constituting one file extent.

FIG. 5 shows relationships between the physical unit of the BD-ROM and the Source packets constituting one file extent. As shown in the $2^{nd}$ row, a plurality of sectors are formed on the BD-ROM. The Source packets constituting the file extent are, as shown in the $1^{st}$ row, divided into groups each of which is composed of 32 Source packets. Each group of Source packets is then written into a set of three consecutive sectors. The group of 32 Source packets is 6144 bytes (=32×192), which is equivalent to the size of three sectors (=2048×3). The 32 Source packets stored in the three sectors is called an "Aligned Unit". Writing to the BD-ROM is performed in units of Aligned Units.

In the $3^{rd}$ row, an error correction code is attached to each block of 32 sectors. The block with the error correction code is referred to as an ECC block. In so far as it accesses the BD-ROM in units of Aligned Units, the reproduction apparatus can obtain 32 complete Source packets. Up to now, writing process of the AVClip to the BD-ROM has been described.

<Types of Audio Streams>

From now on, the audio stream (Primary audio stream) multiplexed in the AVClip will be described.

The Primary audio stream is an audio stream that includes what is called main sound/voice. On the other hand, an audio stream that includes what is called sub-sound/voice is called "Secondary audio stream". When the main sound/voice included in the Primary audio stream is the sound/voice of the motion picture including the background music or the like, and the sub-sound/voice included in the Secondary audio stream is the commentary sound/voice of the director, the sound/voice of the motion picture is output after it is mixed with the commentary sound/voice.

The Secondary audio stream is recorded on only the local storage 200 for reproduction, but is not recorded on the BD-ROM. The Primary audio stream may be recorded on the BD-ROM and/or the local storage 200. The encoding method for the Primary audio stream may be different from the encoding method for the Secondary audio stream.

The BD-ROM standard deals with audio streams having an extended format such as DTS-HD (Digital Theater System-High Definition), DD/DD+ (Dolby Digital/Dolby Digital+), and DD/MLP Dolby Digital/Meridian Lossless Packing). Such an audio stream is multiplexed into an AVClip as the Primary audio stream.

The following describes such audio stream formats. In recent years, new encoding methods having higher compression ratios and higher-quality sounds have appeared on the market one after another. To define the data format of an audio stream that supports such new encoding methods, one can either create a totally new data format or extend a conventional data format.

In the case where a totally new data format of an audio stream is created, the audio stream can be reproduced by a reproduction apparatus 300 if it is put on the market after the data format of the audio stream is defined and has a decoder that supports the defined data format of the audio stream; but cannot be reproduced if it is put on the market before the data format of the audio stream is defined, without a decoder that supports the defined data format of the audio stream. Extended formats were conceived in order to cope with the problem.

Figure 6:
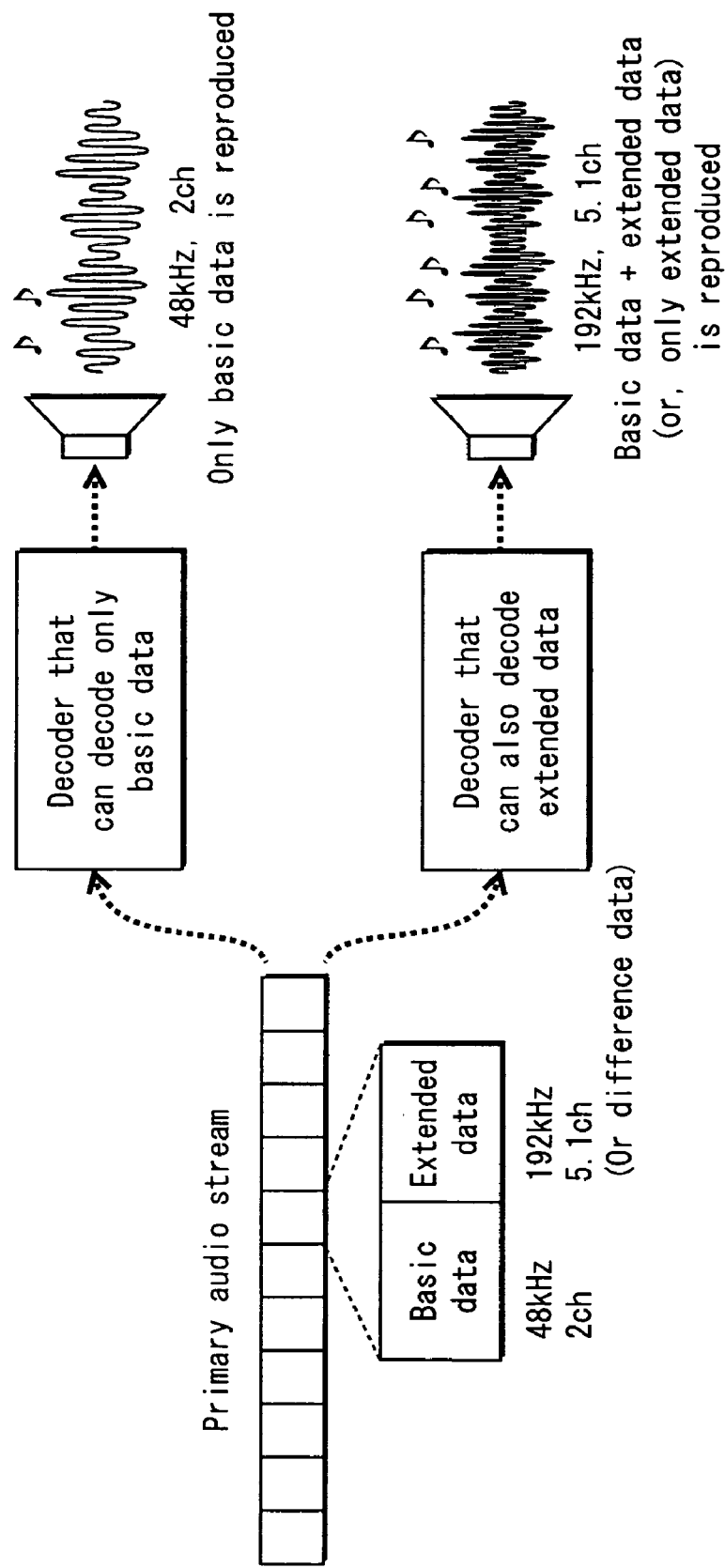
FIG. 6 shows an extended format of an audio stream.

FIG. 6 shows an extended format of an audio stream. As shown in FIG. 6, in the audio stream having an extended format, each audio frame is divided into a portion that conforms to a conventional data format (basic data) and an extended portion (extended data). A conventional decoder mounted in an old reproduction apparatus can only reproduce the basic data, and a decoder mounted in a new reproduction apparatus can reproduce the extended data, as well as the basic data. This construction produces an advantageous effect that it is possible to add an extended portion while maintaining the backward compatibility.

In this example, when the extended data is a difference from the basic data, it is an audio stream of 48 kHz/2 ch if only the basic data is decoded and reproduced; but it is an audio stream of 192 kHz/5.1 ch if the combination of the basic data and the extended data is decoded and reproduced.

Figure 7:
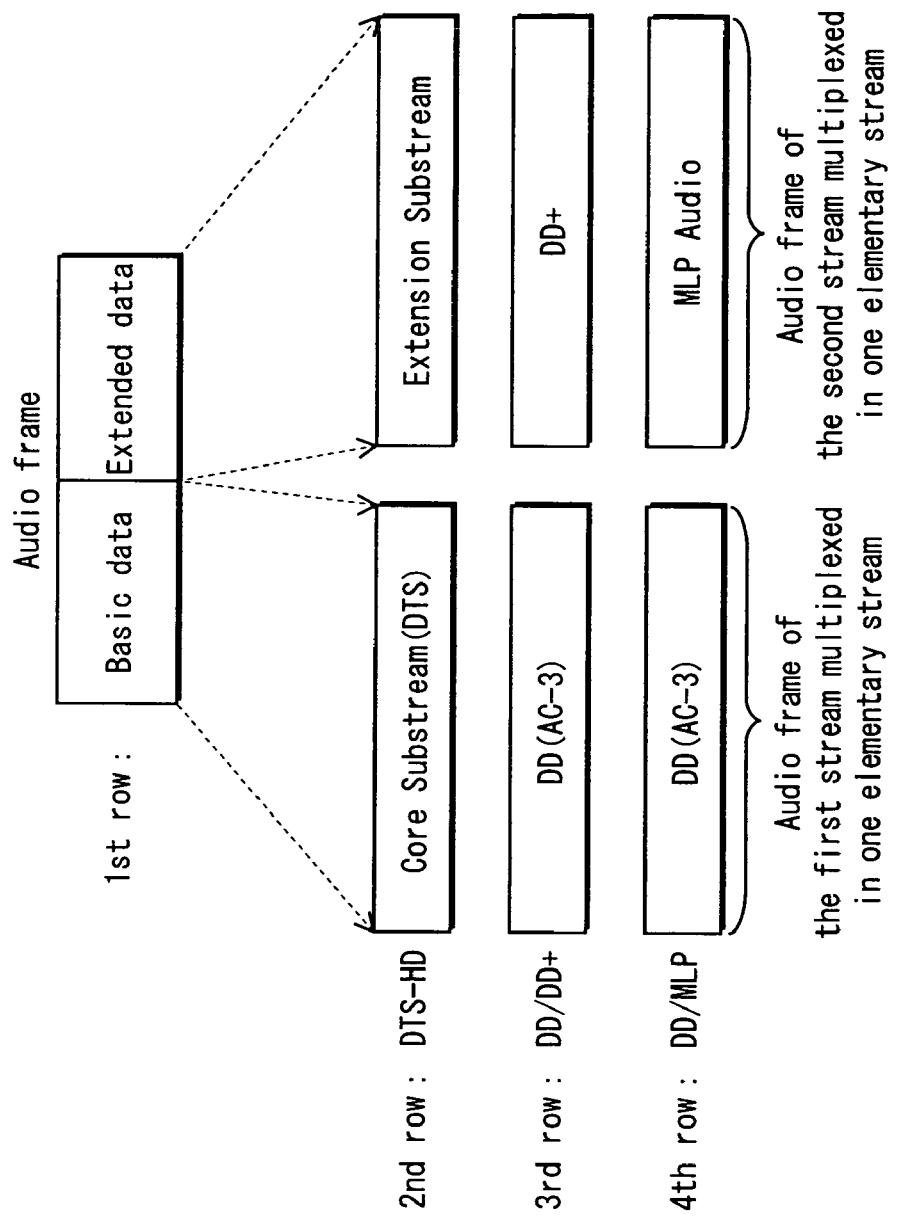
FIG. 7 shows the construction of the audio frame of audio streams such as DTS-HD, DD/DD+, DD/MLP.

From now on, audio frame structures of audio streams having a format such as DTS-HD, DD/DD+, or DD/MLP will be described. The $1^{st}$ row of FIG. 7 shows an audio frame of an audio stream composed of the basic data and the extended data. The $2^{nd}$ to $4^{th}$ rows show audio frames for DTS-HD, DD/DD+, and DD/MLP.

First, DTS-HD audio streams will be described. The DTS-HD audio streams conform to DTS-HD which is a standard extended from DTS. As shown in the $2^{nd}$ row, each audio frame of the DTS-HD audio streams is divided into a Core Substream and an Extension Substream. The Core Substream is equivalent with a DTS audio stream and can be transferred in a band of 1.5 Mbps. It is accordingly possible to transfer the Core Substream with S/PIDF. In contrast, the Extension Substream is an extended portion defined in the DTS-HD, and can only be reproduced by a decoder that supports the DTS-HD.

The Core Substream conforming to the DTS-HD has audio data of 48 kHz/2 ch.

The Extension Substream has audio data of DTS-ES (Digital Theater System-Extended Surround), DTS-96/24, and DTS-HD. The audio data of DTS-ES is 6.1 Ch, which is a result of adding 1 ch to 5.1 ch, and 48 KHz. The audio data of DTS-96/24 is 5.1 Ch and 96 KHz. The audio data of DTS-HD is 192 KHz/6 ch and is lossless.

In the case of DTS-HD, the extended data is a difference from the basic data, and the number of channels of the audio streams including the extended data is never lower than the number of channels of the basic data.

Next, DD/DD+ audio streams will be described. The DD/DD+ audio streams are audio streams that were newly defined for the BD-ROM. As shown in the 3rd row of FIG. 7, each audio frame of DD/DD+ audio streams is composed of Independent Substream (DD (AC-3 (Audio Code Number 3), which is the basic data, and Dependent Substream (DD+) which is the extended data. In the case of the DD/DD+, the extended data may be a difference from the basic data, or may be independent and can be replaced with the basic data. In the latter case, the Dependent SubStream constitutes the audio components for four channels LS, RS, LR, and RR, which can replace the channels LS and RS among the audio components for 5.1 channels L, R, C, LS, RS, and LFE of the Independent SubStream. This enables the reproduction apparatus 300 to achieve the audio reproduction of 7.1 channels L, R, C, LS, RS, LR, RR, and LFE. Further, the Dependent SubStream may constitute the audio components for six channels, enabling the reproduction apparatus to achieve the audio reproduction of 13.1 channels being the result of adding the audio components for the six channels to the above-described 7.1 channels.

Next, DD/MLP audio streams will be described. The DD/MLP audio streams are audio streams that were newly defined for the BD-ROM.

In the DD/MLP, although DD and MLP audio frames are multiplexed in one Primary audio stream, the frequency at which the DD audio frames appear in the reproduction time axis of the Primary audio stream is greatly different from the frequency at which MLP audio frames appear. The construction is different from those of the DD (AC-3) and the DTS-HD in which each audio frame is divided into the basic data and the extended data. In the following explanation, however, it is presumed for the sake of convenience that as shown in the $3^{rd}$ row of FIG. 7, the audio frame containing the stream 1 (one of the two streams multiplexed in the Primary audio stream and conforming to the DD) is treated as the basic data, and the audio frame containing the stream 2 (the other of the two streams multiplexed in the Primary audio stream and conforming to the MLP) is treated as the extended data.

Both DD/DD+ and DD/MLP use DD (AC-3) as the basic data. It is accordingly apparent that if DD portions of an audio stream conforming to one of the two methods can be decoded as the basic data, DD portions of an audio stream conforming to the other of the two methods can also be decoded.

The use of extended data formats enables a reproduction apparatus 300 having a decoder supporting a new data format to reproduce high-quality audio with a larger number of channels, and enables a reproduction apparatus 300 having a decoder supporting an older data format to reproduce portions of audio that conform to the older data format. Compared with the case where a totally new format is created to prevent a reproduction apparatus from reproducing the audio streams conforming to the new format, the construction using the extended data formats maintains the backward compatibility and is thus advantageous for the side of creating the audio streams because it enables a reproduction apparatus 300 having a decoder supporting an older data format, namely a conventional reproduction environment, to be used.

Up to now, the Primary audio stream has been described.

<BD-ROM Structure 2: Clip Information>

Figure 8:
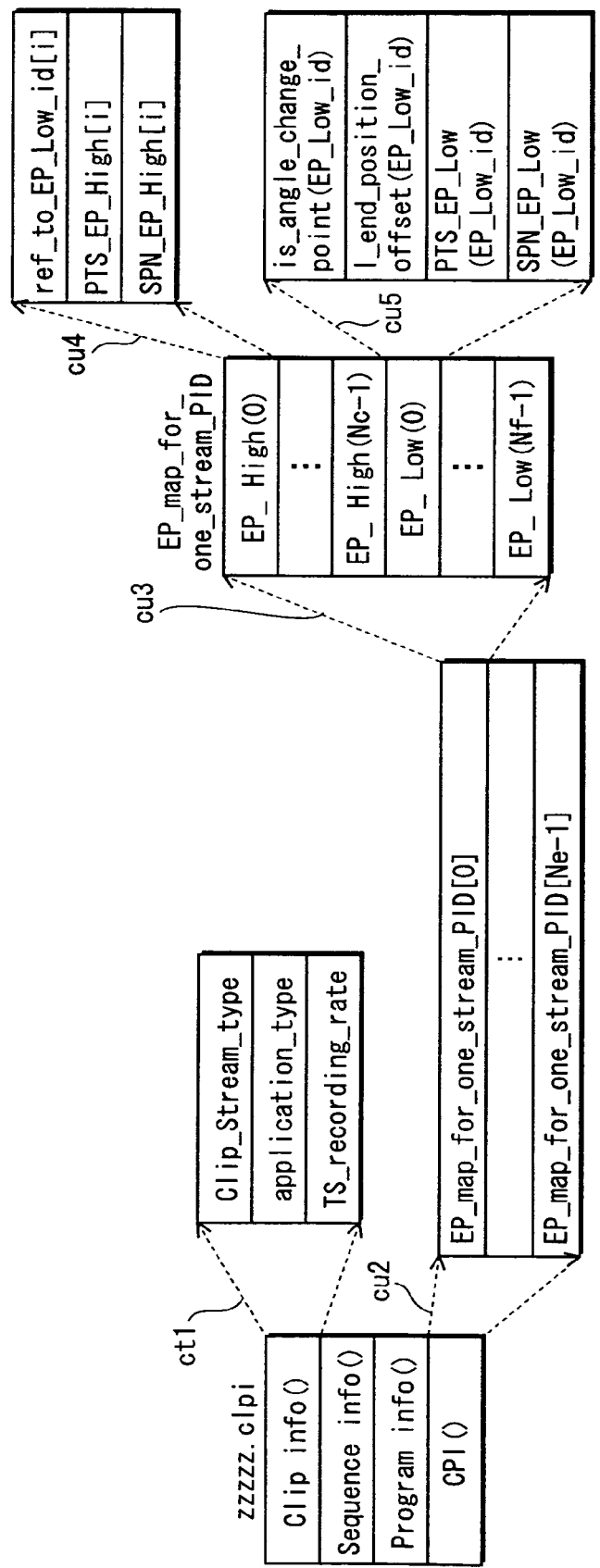
FIG. 8 shows the internal structure of Clip information.

Next, files to which an extension "clpi" is attached will be described. Files (00001.clip, 00002.clip, 00003.clip . . . ) to which an extension "clpi" is attached store Clip information. The Clip information is management information on each AVClip. FIG. 8 shows the internal structure of Clip information. As shown on the left-hand side of the drawing, the Clip information includes:

i) "ClipInfo( )" storing information regarding the AVClip;
ii) "Sequence Info( )" storing information regarding the ATC Sequence and the STC Sequence;
iii) "Program Info( )" storing information regarding the Program Sequence; and
iv) "Characteristic Point Info (CPI( ))".

The Sequence Info is information regarding one or more STC-Sequences and ATC-Sequences contained in the AVClip. The reason that these information are provided is to preliminarily notify the reproduction apparatus of the system time-base discontinuity and the arrival time-base discontinuity. That is to say, if such discontinuity is present, there is a possibility that a PTS and an ATS that have the same value appear in the AVClip. This might be a cause of a defective reproduction. The Sequence Info is provided to indicate from where to where in the transport stream the STCs or the ATCs are sequential.

The Program Info is information that indicates a section (called "Program Sequence") of the program where the contents are constant. Here, "Program" is a group of elementary streams that have in common a time axis for synchronized reproduction. The reason that the Program Info is provided is to preliminarily notify the reproduction apparatus of a point at which the Program contents changes. It should be noted here that the point at which the Program contents changes is, for example, a point at which the PID of the video stream changes, or a point at which the type of the video stream changes from SDTV to HDTV.

From now on, the Characteristic Point Info will be described. The lead line cu2 indicates the close-up of the structure of CPI. As indicated by the lead line cu2, the CPI is composed of the Ne number of EP_map_for_one_stream_PIDs: EP_map_for_one_stream_PID [0] . . . EP_map_for_one_stream_PID [Ne−1]). These EP_map_for_one_stream_PIDs are EP_maps of the elementary streams that belong to the AVClip. The EP_map is information that indicates, in association with an entry time (PTS_EP_start), a packet number (SPN_EP_start) at an entry position where the Access Unit is present in one elementary stream. The lead line cu3 in the drawing indicates the close-up of the internal structure of EP_map_for_one_stream_PID.

It is understood from this that the EP_map_for_one_stream_PID is composed of the Ne number of EP_Highs (EP_High(0) . . . EP_High(Nc−1)) and the Nf number of EP_Lows (EP_Low(0) . . . EP_Low (Nf−1)). Here, the EP_High plays a role of indicating upper bits of the SPN_EP_start and the PTS_EP_start of the Access Unit (Non-IDR I-Picture, IDR-Picture), the EP_Low plays a role of indicating lower bits of the SPN_EP_start and the PTS_EP_start of the Access Unit (Non-IDR I-Picture, IDR-Picture).

The lead line cu4 in the drawing indicates the close-up of the internal structure of EP_High. As indicated by the lead line cu4, the EP_High(i) is composed of: "ref_to_EP_Low_id [i]" that is a reference value to EP_Low; "PTS_EP_High[i]" that indicates upper bits of the PTS of the Access Unit (Non-IDR I-Picture, IDR-Picture); and "SPN_EP_High[i]" that indicates upper bits of the SPN of the Access Unit (Non-IDR I-Picture, IDR-Picture). Here, "i" is an identifier of a given EP_High.

The lead line cu5 in the drawing indicates the close-up of the structure of EP_Low. As indicated by the lead line cu5, the EP_Low(i) is composed of: "is_angle_change_point (EP_Low_id)" that indicates whether or not the corresponding Access Unit is an IDR picture; "I_end_position_offset (EP_Low_id)" that indicates the size of the corresponding Access Unit; "PTS_EP_Low (EP_Low_id)" that indicates lower bits of the PTS of the Access Unit (Non-IDR I-Picture, IDR-Picture); and "SPN_EP_Low (EP_Low_id)" that indicates lower bits of the SPN of the Access Unit (Non-IDR I-Picture, IDR-Picture). Here, "EP_Low_id" is an identifier for identifying a given EP_Low.

<Clip Information Explanation 2: EP_Map>

Figure 9:
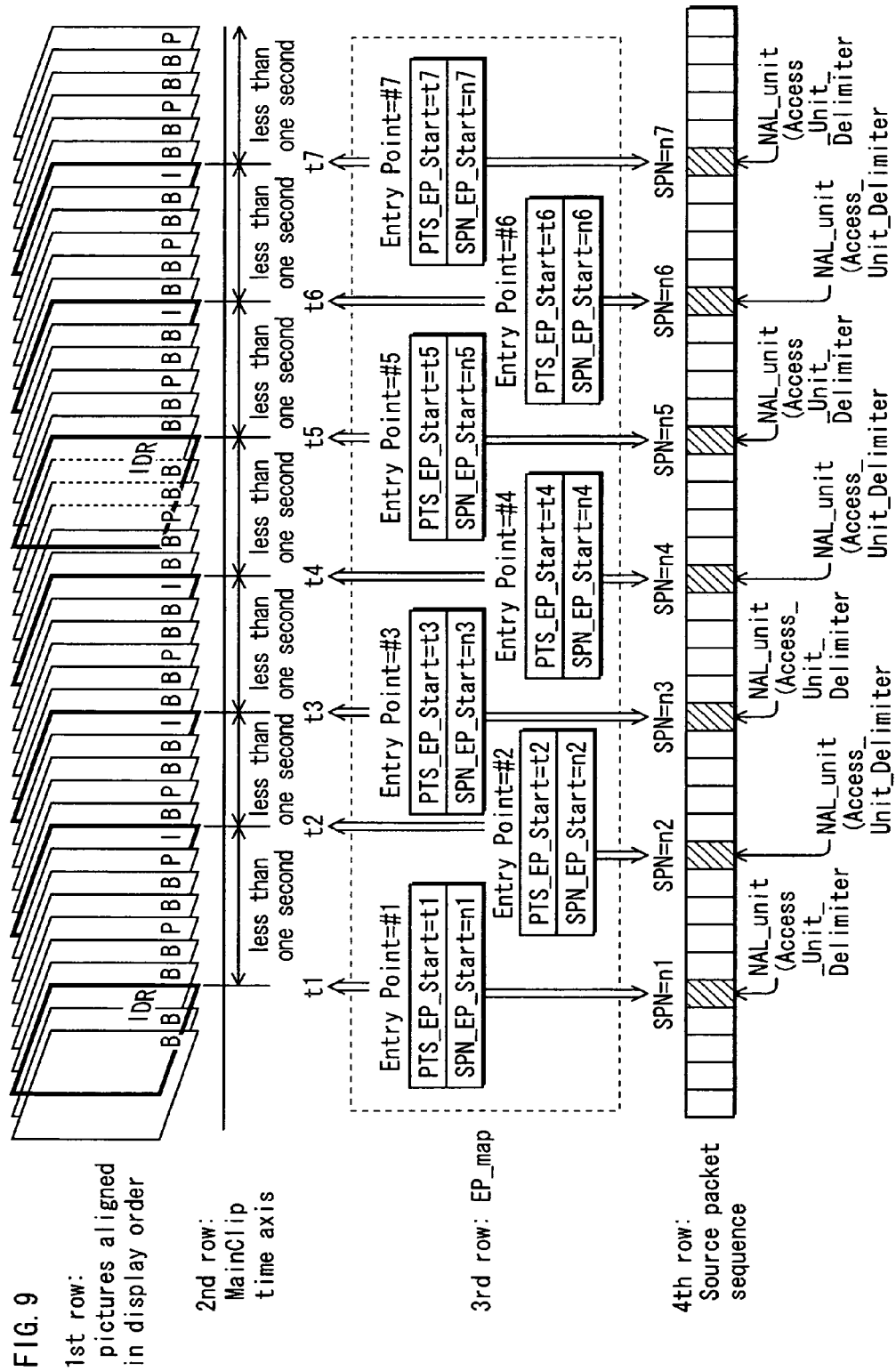
FIG. 9 shows EP_map settings on a video stream of a motion picture.

Here, the EP_map will be explained in a specific example. FIG. 9 shows EP_map settings on a video stream of a motion picture. The $1^{st}$ row shows a plurality of pictures (IDR picture, I-Picture, B-Picture, and P-Picture defined in MPEG4-AVC). The $2^{nd}$ row shows the time axis for the pictures. The $4^{th}$ row indicates a packet sequence, and the $3^{rd}$ row indicates settings of the EP_map.

It is presumed here that in the time axis of the $2^{nd}$ row, an IDR picture or an I-Picture is present at each time point t1 t7. The interval between adjacent ones of the time point t1 . . . t7 is approximately one second. The EP_map used for the motion picture is set to indicate t1 to t7 as the entry times (PTS_EP_start), and indicate entry positions (SPN_EP_start) in association with the entry times.

<PlayList Information>

Next, the PlayList information will be described. A file (00001.mpls) to which extension "mpls" is attached is a file storing the PlayList (PL) information.

Figure 10:
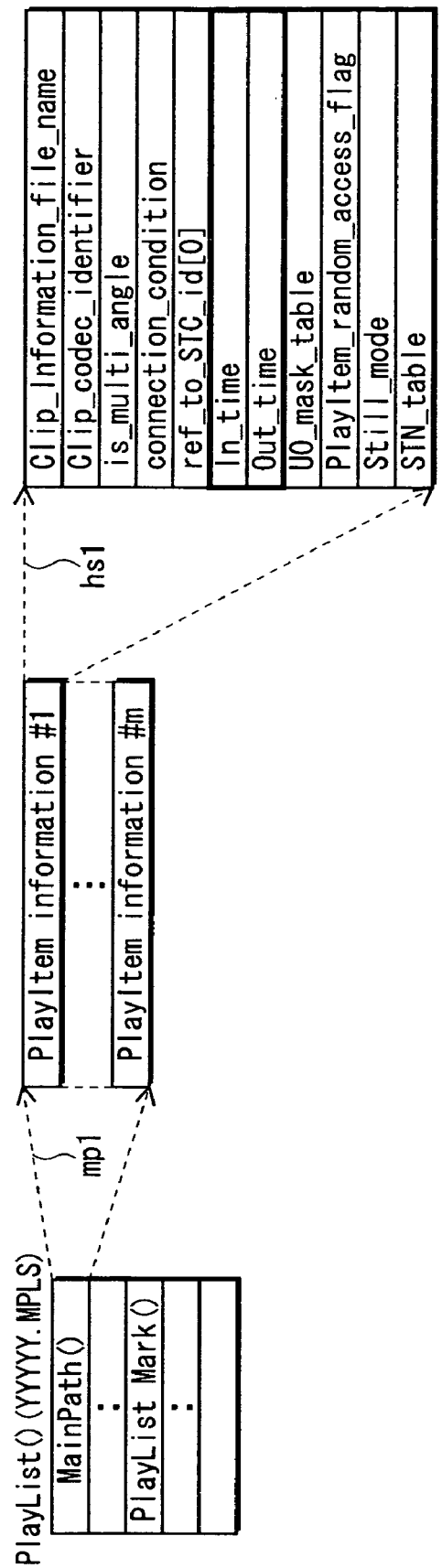
FIG. 10 shows the data structure of the PlayList information.

FIG. 10 shows the data structure of the PlayList information. As indicated by the lead line mp1 in FIG. 10, the PlayList information includes: MainPath information (MainPath( )) that defines MainPath; and PlayListMark information (PlayListMark( )) that defines chapter.

<PlayList Information Explanation 1: MainPath Information>

First, the MainPath will be described. The MainPath is a presentation path that is defined in terms of the video stream as the main image and the audio stream.

As indicated by the arrow mplm the MainPath is defined by a plurality of pieces of PlayItem information: PlayItem information #1 . . . PlayItem information #m. The PlayItem information defines one or more logical reproduction sections that constitute the MainPath. The lead line hs1 in the drawing indicates the close-up of the structure of the PlayItem information. As indicated by the lead line hs1, the PlayItem information is composed of: "Clip_Information_file_name" that indicates the file name of the reproduction section information of the AVClip to which the IN point and the OUT point of the reproduction section belong; "Clip_codec_identifier" that indicates the AVClip encoding method; "is_multi_angle" that indicates whether or not the PlayItem is multi angle; "connection_condition" that indicates whether or not to seamlessly connect the current PlayItem and the preceding PlayItem; "ref_to_STC_id[0]" that indicates uniquely the STC_Sequence targeted by the PlayItem; "In_time" that is time information indicating the start point of the reproduction section; "Out_time" that is time information indicating the end point of the reproduction section; "UO_mask_table" that indicates which user operation should be masked by the PlayItem; "PlayItem_random_access_flag" that indicates whether or not to permit a random access to a mid-point in the PlayItem; "Still_mode" that indicates whether or not to continue a still display of the last picture after the reproduction of the PlayItem ends; and "STN_table". Among these, the time information "In_time" indicating the start point of the reproduction section and the time information "Out_time" indicating the end point of the reproduction section constitute a presentation path. The presentation path information is composed of "In_time" and "Out_time".

Figure 11:
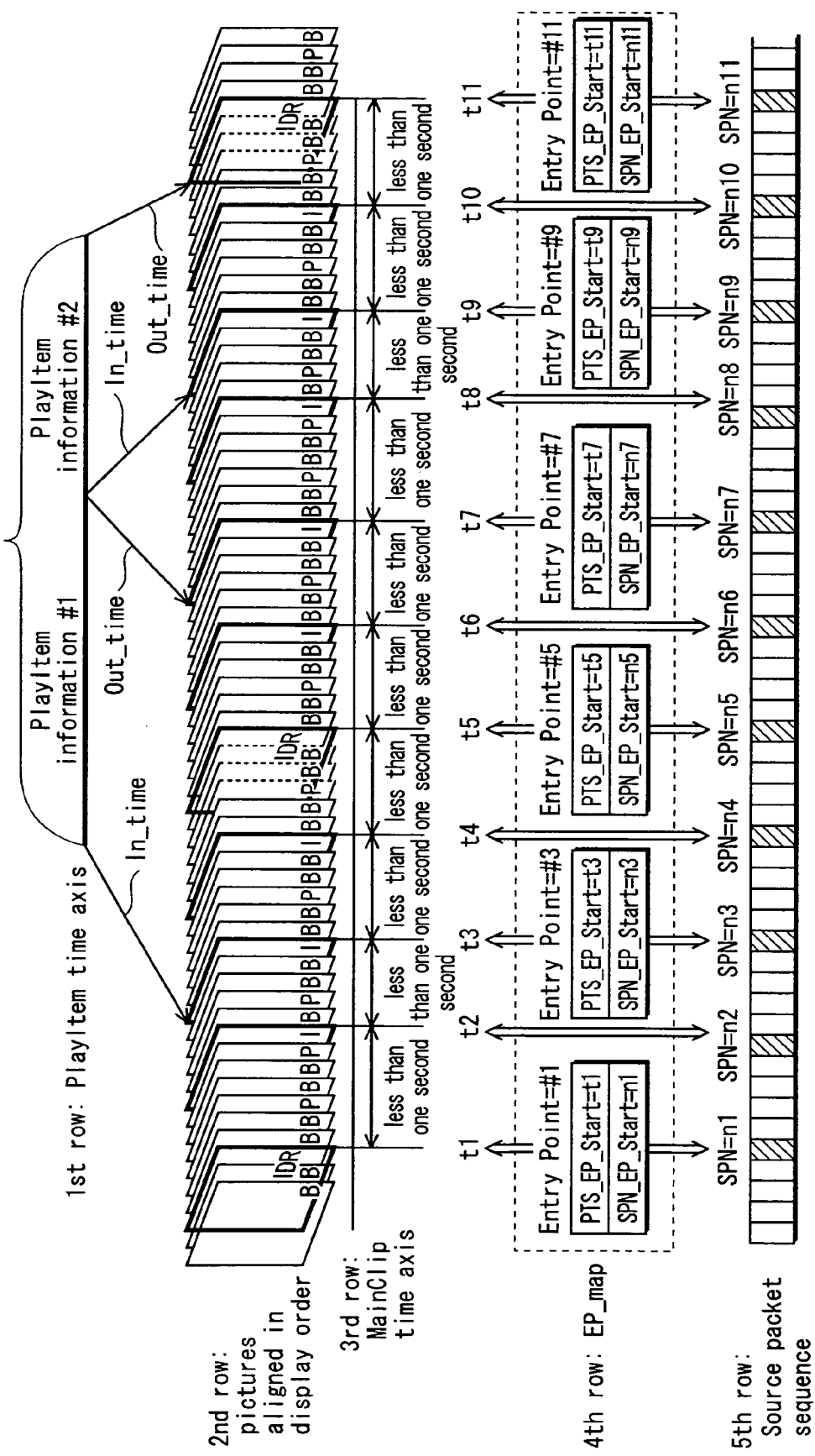
FIG. 11 shows the relationships between the AVClip and the PlayList information.

FIG. 11 shows the relationships between the AVClip and the PlayList information. The $1^{st}$ row shows the time axis held by the PlayList information. The $2^{nd}$ to $5^{th}$ rows show the video stream that is referenced by the EP_map.

The PlayList information includes two pieces of PlayItem information: PlayItem information #1; and PlayItem information #2. Two reproduction sections are defined by "In_time" and "Out_time" included in the PlayItem information #1 and PlayItem information #2. When these reproduction sections are arranged, a time axis that is different from the AVClip time axis is defined. This is the PlayList time axis shown in the $1^{st}$ row. As understood from this, it is possible, by defining the PlayItem information, to define a presentation path that is different from the AVClip.

<STN_table>

What is unique to the PlayList information is the STN_Table.

The STN_table is a table that indicates reproducible streams among a plurality of elementary streams multiplexed in the AVClips specified by the Clip_Information_file_name in the PlayItem information. More specifically, the STN_table is generated by associating entries of a plurality of elementary streams respectively with attributes.

FIG. 12 shows the internal structure of the STN_table. As shown in FIG. 12, the STN_table includes a plurality of pairs (entry-attribute) of a Stream_entry and a Stream_attribute, and shows the number of the pairs (number_of_video_stream_entries, number_of_audio_stream_entries, number_of_PG_stream_entries, number_of_IG_stream_entries).

In the STN_table, as indicated by the sign "{", each entry-attribute pair correspond to any of a video stream, Primary audio stream, Secondary audio stream, PG stream, or IG stream that is permitted to be reproduced by the PlayItem.

The entry-attribute will now be described in detail.

Figure 13A:
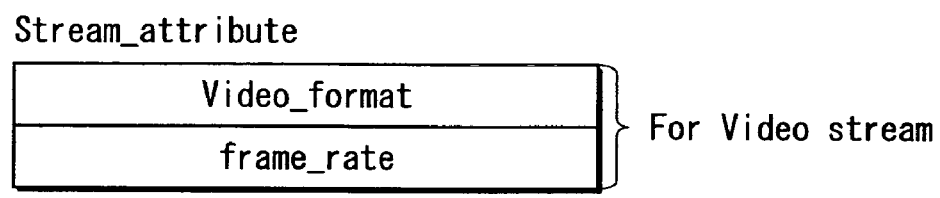
FIG. 13A shows Stream_attribute corresponding to a video stream.

FIG. 13A shows Stream_attribute corresponding to a video stream.

The Stream_attribute for video stream includes; "Video_format" that indicates a video stream display method; "frame_rate" that indicates a display frequency of the video stream; and so on.

Figure 13B:
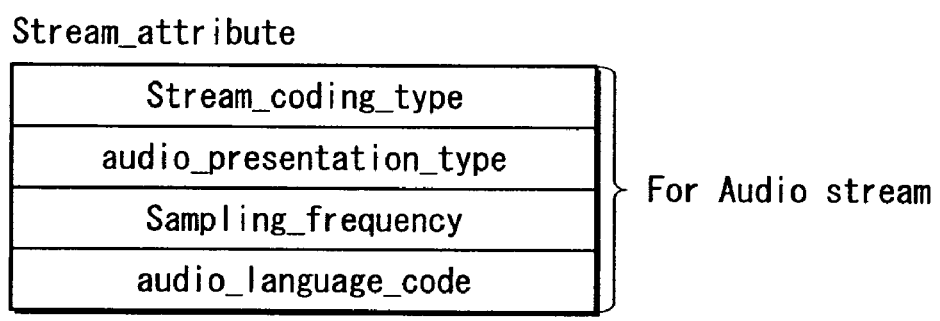
FIG. 13B shows Stream_attributes corresponding to the Primary audio stream.

FIG. 13B shows Stream_attributes corresponding to the Primary audio stream.

The Stream_attributes for the Primary audio streams includes: "stream_coding_type" that indicates the audio stream encoding method; "audio_presentation_type" that indicates the channel construction of the corresponding audio stream; "Sampling_frequency" that indicates the sampling frequency of the corresponding audio stream; and "audio_language code" that indicates the language attribute of the audio stream.

Figure 13C:
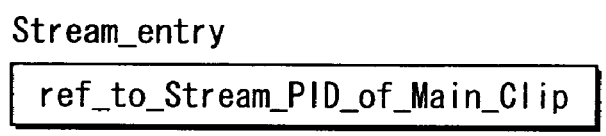
FIG. 13C shows Stream_entry.

FIG. 13C shows Stream_entry. As shown in FIG. 13C, the Stream_entry includes "ref_to_Stream_PID_of_Main_Clip" that indicates a PID used for demultiplexing the video stream.

Up to now, the recording medium has been described. From now on, the reproduction apparatus will be described.

Figure 14:
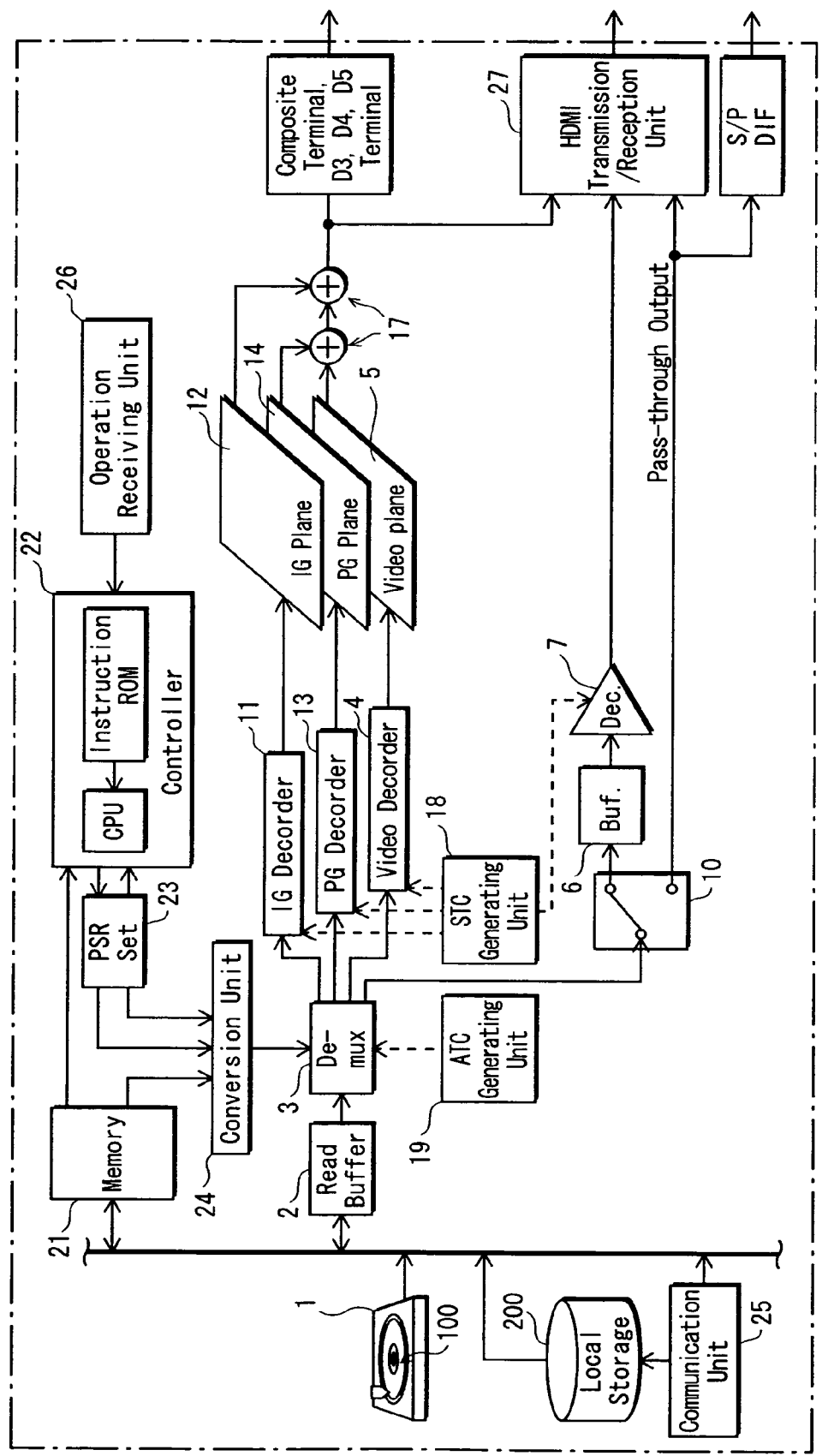
FIG. 14 shows the internal structure of the reproduction apparatus of the present invention.

FIG. 14 shows the internal structure of the reproduction apparatus of the present invention. The reproduction apparatus of the present invention is produced industrially based on the internal structure shown in FIG. 14. The reproduction apparatus of the present invention is mainly composed of two parts: a system LSI; and a drive apparatus, and can be produced industrially by mounting these parts in the cabinet and on the substrate. The system LSI is an integrated circuit in which various processing units, which perform functions of the reproduction apparatus, are included. The reproduction apparatus produced in this way includes: a BD-ROM drive 1, a read buffer 2, a demultiplexer 3, a video decoder 4, a video plane 5, a buffer 6, an audio decoder 7, a switch 10, an Interactive Graphics decoder 11, an Interactive Graphics plane 12, a Presentation Graphics decoder 13, a Presentation Graphics plane 14, a combining unit 17, an STC generating unit 18, an ATC generating unit 19, a local storage 200, a controller 22, a PSR set 23, a conversion unit 24, a communication unit 25, an operation receiving unit 26, an HDMI transmission/reception unit 27, and an S/PDIF 28.

The BD-ROM drive 1 performs the loading/ejection of the BD-ROM, and performs accesses to the BD-ROM.

The read buffer 2 is a FIFO memory in which the TS packets read from the BD-ROM are stored by the First-In-First-Out method.

The demultiplexer 3 outputs TS packets having the PIDs that are notified from the Conversion unit 24, among the TS packets that are read into the read buffer 2 and have PIDs 0x1011, 0x1100-0x111F, 0x1200-0x121F, and 0x1400-141F, to the video decoder 4, the IG decoder 11, and the PG decoder 13.

The video decoder 4 decodes a plurality of PES packets output from the demultiplexer 3 to obtain non-compressed pictures, and writes the obtained pictures to the video plane 5.

The video plane 5 is a plane for storing non-compressed pictures. The "plane" is a memory area in the reproduction apparatus for storing pixel data of one screen. The resolution of the video plane 5 is 1920×1080. The picture data stored in the video plane 5 is composed of a plurality of pieces of pixel data each of which is represented by a 16-bit YUV value.

The buffer 6 stores TS packets output from the demultiplexer 3 by the First-In-First-Out method, and supplies the stored TS packets to the audio decoder 7.

The audio decoder 7 converts the TS packets stored in the buffer 6 into PES packets, decodes the PES packets to obtain non-compressed audio data in the LPCM (Linear pulse code modulation) state, and outputs the obtained audio data. This achieves a digital output for the Primary audio stream.

The switch 10 switches between (a) supplying, to the audio decoder 7, the TS packets of the Primary audio stream demultiplexed by the demultiplexer 3 and (b) not supplying to the audio decoder 7 but outputting them to other devices. This operation of not supplying the TS packets of the Primary audio stream to the audio decoder 7 but outputting them to other devices is called "pass-through output". Also, the Primary audio stream that is transferred by the pass-through output, while having been encoded and compressed, is called "bit stream".

The Interactive Graphics (IG) decoder 11 decodes an IG stream read out from the local storage 200, and writes the obtained non-compressed graphics into the IG plane 12.

The Interactive Graphics (IG) plane 12 is a plane into which the non-compressed graphics obtained by the IG decoder 11 are written.

The Presentation Graphics (PG) decoder 13 decodes a PG stream read out from the local storage 200, and writes the obtained non-compressed graphics into the PG plane 14. The decoding by the PG decoder 13 enables a subtitle to be displayed on the screen.

The Presentation Graphics (PG) plane 14 is a memory having an area of one screen, and stores one screen of non-compressed graphics.

The combining unit 17 combines the data stored in the IG plane 12, the data stored in the PG plane 14, and the data stored in the video plane 5, to obtain a complex image.

The STC generating unit 18 generates a System Time Clock (STC). Also, when the current STC_Sequence switches to a new one, the STC generating unit 18 obtains an STC value (STC2) for a new STC_Sequence by adding an offset value called STC_delta to an STC value (STC1) for the current STC_Sequence so that the STC value (STC1) for the current STC_Sequence is continuous to the STC value (STC2) for the new STC_Sequence.

The STC_delta is expressed as:

$$STC\_delta = PTS1(1stEND) + Tpp - PTS2(2ndSTART),$$

Where "PTS1(1stEND)" indicates the display start time of a picture that is reproduced last in the first STC_Sequence, "Tpp" indicates the display period of the picture, and "PTS2(2ndSTART)" indicates the display start time of a picture that is reproduced first in the second STC_Sequence that follows the first STC_Sequence. The value STC_delta is obtained based on the above expression, the value STC_delta is added to a clock measurement value, and the result is output to each decoder. This enables each decoder to reproduce two streams being the two STC_Sequences continuously. With such a construction, even if two or more STC_Sequences are included in one AVClip, or even if each of two AVClips, which are to be reproduced continuously, includes a different STC_Sequence, it is possible to decode the STC_Sequences in each AVClip seamlessly.

The ATC generating unit 19 generates an Arrival Time Clock (ATC). Also, when the current ATC_Sequence switches to a new one, the ATC generating unit 19 obtains an ATC value (ATC2) for a new ATC_Sequence by adding an offset value called ATC_delta to an ATC value (ATC1) for the current ATC_Sequence so that the ATC value (ATC1) for the current ATC_Sequence is continuous to the ATC value (ATC2) for the new ATC_Sequence. The addition is expressed as: ATC2=ATC1+ATC_delta. The ATC_delta is an offset value being a difference between T1 and T2, where T1 is a time at which the last TS packet of the current transport stream (TS1) that has been read out up to now is input, and T2 is a time at which the first TS packet of the next transport stream (TS2) is input. The ATC_delta is expressed as: ATC_delta≧N1/TS_recording_rate. It should be noted here that the input time T2 means the input time of the first TS packet of TS2 that is projected on the time axis of TS1. The "N1" indicates the number of TS packets that follow the last video PES packet of TS1. In the BD-ROM, the ATC_delta is written in the Clip information. It can be used to calculate the ATC_delta. The above-described calculation enables the ATC value (ATC1) for the current ATC_Sequence to be continuous to the ATC value (ATC2) for the new ATC_Sequence. Adding the ATC_delta to the clock measurement value and outputting the result to the demultiplexer 3 achieves a seamless buffer control.

To achieve the continuousness of the buffering, the following conditions 1) and 2) should be satisfied.

1) To satisfy: STC2 (2ndSTART)>STC2 (1stEND), where "STC2 (1stEND)" means STC1 (1stEND) projected on the time axis of STC2, and is expressed as: STC2 (1stEND)=STC (1stEND)−STC_delta.

2) An extraction of a TS packet from TS1 and an extraction of a TS packet from TS2 are defined by STC1 and STC2 that are projected on the same time axis, and no underflow or overflow of the buffer occurs.

The memory 21 is a memory for storing current PL information and current Clip information. The current PL information is PL information that is currently processed, among a plurality of pieces of PlayList information stored in the BD-ROM. The current Clip information is Clip information that is currently processed, among a plurality of pieces of Clip information stored in the BD-ROM.

The controller 22 achieves a reproduction control of the BD-ROM by performing a PlayList reproduction (that is to say, a reproduction control in accordance with the current PL information).

The PSR set 23 is a register embedded in the reproduction apparatus, and is composed of the 64 number of Player Setting/Status Registers (PSR) and the 4096 number of General Purpose Registers (GPR). Among the values (PSR) set in the Player Setting/Status Registers, PSR4 to PSR8 are used to represent the current reproduction point.

The conversion unit 24 converts the stream numbers of the Primary audio streams and Secondary audio streams into PIDs based on the STN table, and notifies the PIDs as the conversion results to the demultiplexer 3.

The communication unit 25 achieves a communication function in the reading apparatus 300. The communication unit 25 establishes a TCP connection, an FTP connection or the like with a web site. The establishment of such a connection enables a Java™ application to download data from the web site.

The operation receiving unit 26 receives specification of an operation from a user, and notifies User Operation information, which indicates the operation specified by the user, to the controller 22.

The HDMI transmission/reception unit 27 receives, from an apparatus connected via HDMI, information concerning the apparatus, and transmits the digital non-compressed video, which is obtained as a result of decoding by the video decoder 4, to the apparatus via HDMI, together with LPCM audio data.

Up to now, the hardware construction of the reproduction apparatus of the present invention has been explained. From now on, the software construction of the reproduction apparatus of the present invention will be explained.

Figure 15:
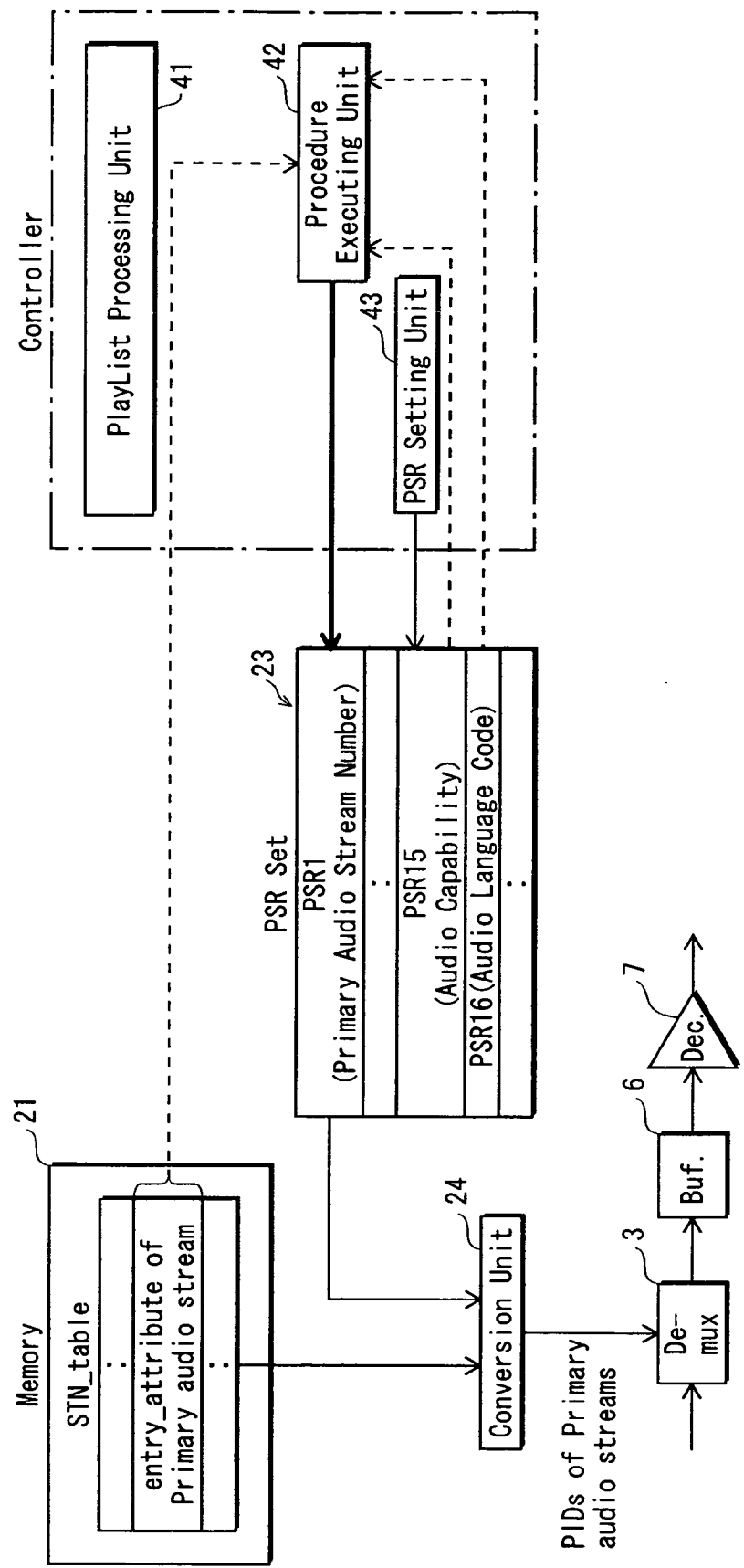
FIG. 15 shows the functions of the controller 22.

The controller 22 shown in FIG. 14 is shown in terms of the functions in FIG. 15. FIG. 15 shows the functions of the reproduction apparatus 300. As shown in FIG. 15, the controller 22 includes a PlayList processing unit 41, a Procedure executing unit 42, and a PSR setting unit 43.

These components perform the processes based on PSR1 of the PSR set 23. The following explains PSR1.

<PSR1>

PSR1 stores a Primary audio stream number, which identifies one of a plurality of Primary audio streams whose entries are written in the STN table of the current Play Item. When the value set in the PSR1 changes, the reproduction apparatus reproduces a Primary audio stream corresponding to the set value after the change. The PSR1 is set to "0xFF" as the initial value, and then may be set to a value ranging from "1" to "32" by the reproduction apparatus. The value "0xFF" is an unspecified value and indicates that there is no Primary audio stream or that a Primary audio stream has not been selected. When the PSR1 is set to a value ranging from "1" to "32", the set value is interpreted as a stream number of a Primary audio stream.

Up to now, the PSR set 23 has been described.

From now on, the PlayList processing unit 41, the Procedure executing unit 42, and the PSR setting unit 43 will be described.

<Functional Construction Detail 1: PlayList Processing Unit 41>

The PlayList processing unit 41 achieves the PL reproduction. The PlayList processing unit 41 reproduces portions of a video stream and a Primary audio stream that correspond to a section from In_time to Out_time of the PlayItem information.

<Functional Construction Detail 2: Procedure Executing Unit 42>

The Procedure executing unit 42, when necessity for changing a piece of PlayItem information to another arises, or when the user instructed, through an operation, to change the stream number, executes a predetermined stream selection procedure, and writes a new stream number into PSR1. The reproduction apparatus reproduces the Primary audio stream according to the stream number written in PSR1. The setting of PSR1 thus enables a Primary audio stream to be selected.

The reason why the stream selection procedure is executed when the PlayItem information is changed is as follows. Since the STN_Table is provided in correspondence with each piece of PlayItem information, it may happen that a Primary audio stream, which is reproducible according to a piece of PlayItem information, cannot be reproduced according to another piece of PlayItem information.

Also, the reason why the stream selection procedure is executed when the user performs an operation to change the stream number is as follows. There may be a case where a stream number, which is to be stored in PSR1 in accordance with the user operation, may is not correct. Accordingly, a recovery is required if an attempt is made to write an invalid stream number.

Figure 16A:
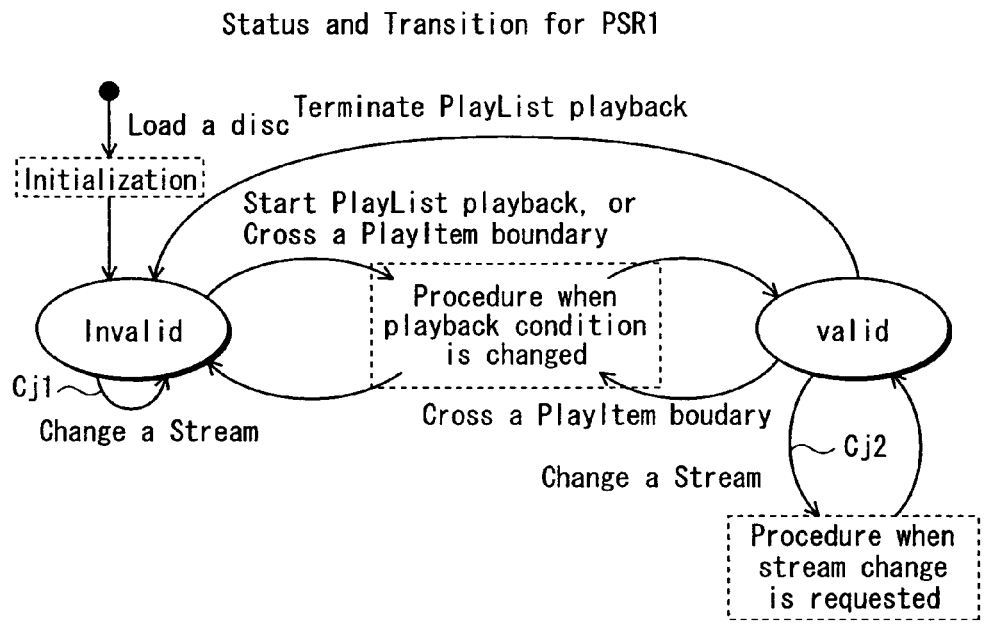
FIG. 16A shows the status transition of the value set in PSR1.

The Procedure executing unit 42 brings PSR1 to change in status as shown in FIG. 16A. FIG. 16A shows the status transition of the value set in PSR1. It should be noted here that in FIG. 16A, the term "valid" means that the value of PSR1 is equal to or smaller than the number of entries written in the STN_table of the Play Item, and is decodable.

The term "invalid" means that (a) the value of PSR1 is "0", (b) the value of PSR1 is larger than the number of entries written in the STN_table of the Play Item, or (c) decoding is not available even if the number of entries written in the STN_table of the Play Item is in the range from "1" to "32".

The frames drawn with dotted lines in FIG. 16A indicate a procedure for determining the value of PSR when the status changes. The procedure for setting a value to PSR is classified into "Procedure when playback condition is changed" and "Procedure when Stream change is requested".

The "Procedure when playback condition is changed" is a procedure to be executed when the reproduction apparatus has changed in the status due to some event that occurred to the apparatus.

The "Procedure when Stream change is requested" is a procedure to be executed when the user requests some changing (in FIG. 16A, "Change a Stream").

The "Procedure when playback condition is changed" and "Procedure when Stream change is requested" are stream selection procedures and will be described in detail with reference to the flowcharts.

The arrows in FIG. 16A symbolically indicate the status transition of PSR.

The notes attached to the arrows indicate events that trigger each status transition. That is to say, FIG. 16A indicates that a status transition of PSR1 occurs if an event such as "Load Disc", "Change a Stream", "Start PlayList playback", "Cross a PlayItem boundary", or "Terminate PlayList playback" occurs. It will be understood by referring to FIG. 16A that the above-mentioned procedures are not performed when a status transition of "Invalid→Invalid" or "Valid→Invalid" occurs. On the other hand, status transitions of "Invalid→Valid" and "Valid→Valid" go through the dotted-line frames. That is to say, the above-mentioned "Procedure when playback condition is changed" or "Procedure when Stream change is requested" is performed when PSR1 is set to be "Valid".

The following describes the events that trigger the status transition.

The event "Load Disc" indicates that the BD-ROM has been loaded in the reproduction apparatus. In such loading, PSR1 is once set to an unspecified value (0xFF). The event "Start PlayList playback" indicates that a reproduction process based on PlayList has been started. When such an event occurs, the "Procedure when playback condition is changed" is executed, and PSR1 is set to be "Valid".

The event "Terminate PlayList playback" indicates that a reproduction process based on PlayList has been terminated. It is understood that when such an event occurs, the "Procedure when playback condition is changed" is not executed, and PSR1 is set to be "Invalid".

The event "ChangeXXX" indicates that the user requested to change XXX (in FIG. 16A, Stream). If this event occurs when PSR1 is "Invalid" (indicated by "cj1" in FIG. 16A), PSR1 is set to a value as requested. Even if the value that is set in this way indicates a valid stream number, the value set in PSR1 is treated as an "Invalid" value. That is to say, in the status transition triggered by the event "ChangeXXX", PSR never changes from Invalid to Valid.

On the other hand, if event "Change a Stream" occurs when PSR1 is "Valid" (indicated by "cj2" in FIG. 16A), the "Procedure when Stream change is requested" is executed, and PSR1 is set to a new value. Here, the value set when the "Procedure when Stream change is requested" is executed may not be a value desired by the user. This is because the "Procedure when Stream change is requested" has a function to exclude an invalid value. If the event "Change stream" occurs when PSR1 is "Valid", PSR1 never changes from Valid to Invalid. This is because the "Procedure when Stream change is requested" assures that PSR1 does not become "Invalid".

The event "Cross a PlayItem boundary" indicates that a Play Item boundary has been passed. Here, the Play Item boundary is a boundary between two successive Play Items, namely a position between the end of a preceding Play Item and the start of a succeeding Play Item, among the two successive Play Items. If the event "Cross a PlayItem boundary" occurs when PSR1 is "Valid", the "Procedure when playback condition is changed" is executed. After the execution of the "Procedure when playback condition is changed", the status of PSR1 either returns to "Valid" or transits to "Invalid". Since the STN_table is provided in correspondence with each Play Item, if a Play Item changes, a reproducible elementary stream also changes. The status transition is aimed to set PSR1 to a most appropriate value for each Play Item by executing the "Procedure when playback condition is changed" each time a Play Item starts to be reproduced.

Figure 16B:
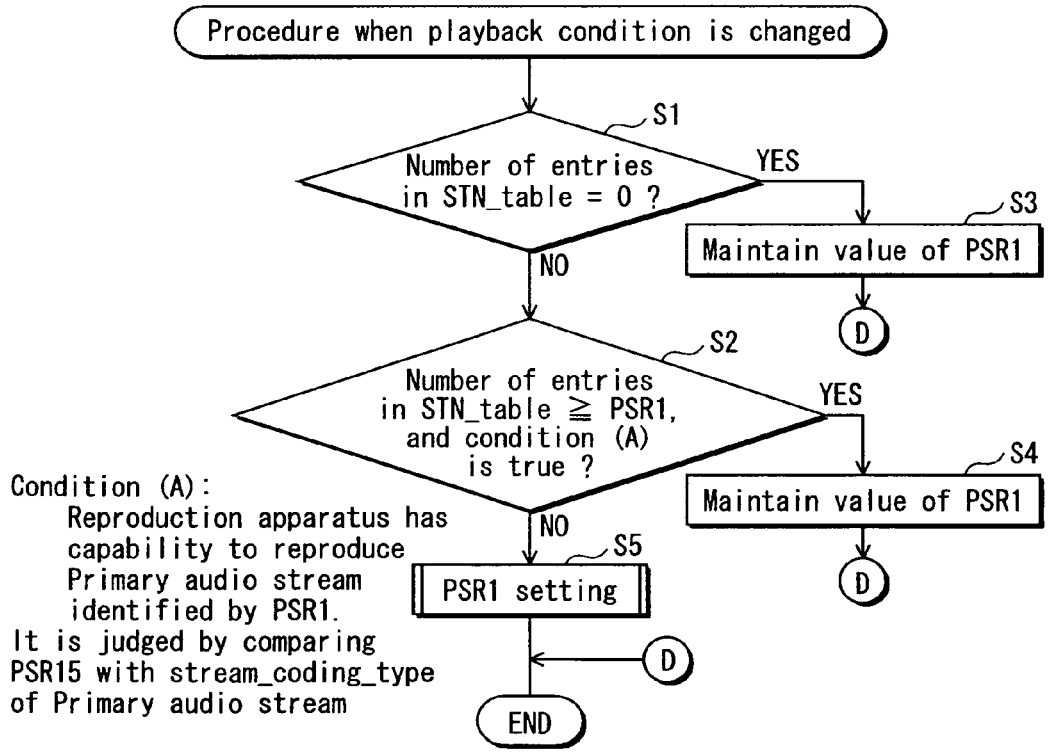
FIG. 16B is a flowchart of the "Procedure when playback condition is changed" in PSR1.

In the above-described status transition, the "Procedure when playback condition is changed" is executed as shown in FIG. 16B. FIG. 16B is a flowchart of the "Procedure when playback condition is changed". The procedure sets a value in PSR1 by performing two judgment steps, S1 and S2.

In step S1, it is judged whether the number of entries in STN_table is "0". If it is judged that the number of entries in STN_table is "0", the value of PSR1 is maintained (step S3).

In step S2, which is executed if it is judged in step S1 that the number of entries in STN_table is not "0", it is judged whether the number of entries in STN_table is equal to or larger than PSR1, and condition (A) is true. Here, the condition (A) is that the reproduction apparatus has capability to reproduce a Primary audio stream identified by PSR1. If the judgment result of step S2 is positive, the value of PSR1 is maintained (step S4). If either the value of PSR1 is larger than the number of entries in STN_table or the condition (A) is not satisfied, a process is performed to set PSR1 (step S5).

Figure 17:
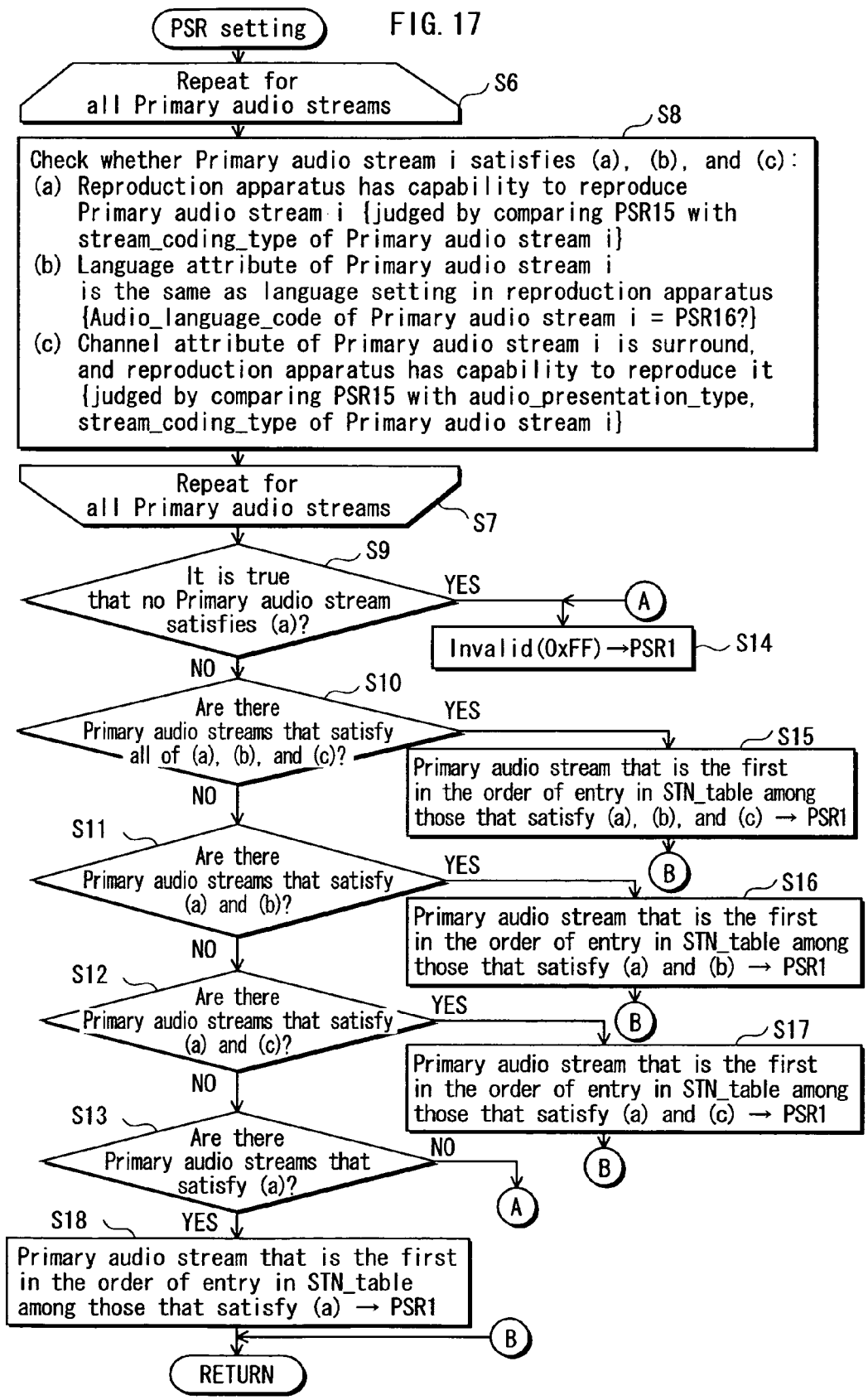
FIG. 17 is a flowchart showing the detailed procedure of step S5.

FIG. 17 is a flowchart showing the detailed procedure of step S5.

In this flowchart, steps S6 and S7 constitute a loop in which step S8 is repeatedly performed for all Primary audio streams. In this loop, the process-target Primary audio stream is referred to as Primary audio stream i. In step S8, it is checked whether Primary audio stream i satisfies conditions (a), (b), and (c).

The condition (a) is that the reproduction apparatus has capability to reproduce Primary audio stream i, and whether the condition is satisfied is judged by comparing PSR15 with stream_coding_type of Primary audio stream i.

The condition (b) is that the language attribute of Primary audio stream i is the same as the language setting in the reproduction apparatus, and whether the condition is satisfied is judged by checking whether audio_language_code of Primary audio stream i written in STN_table is equal to the value set in PSR.

The condition (c) is that the channel attribute of Primary audio stream i is surround, and the reproduction apparatus has capability to reproduce it, and whether the condition is satisfied is judged by comparing PSR15 with audio_presentation_type, stream_coding_type of Primary audio stream i.

Based on the pattern of (i) which conditions, among the plurality of conditions, are satisfied by Primary audio stream i and (ii) how many conditions are satisfied, this flowchart assigns priorities to the Primary audio streams.

After the process is repeatedly performed for all Primary audio streams, steps S9 to S13 are performed. In step S9, it is judged whether it is true that no Primary audio stream satisfies condition (a). If it is judged that it is true, an unspecified value (0xFF) is set to PSR1 (step S14).

In step S10, it is judged whether there are Primary audio streams that satisfy all of conditions (a), (b), and (c). If it is judged positively, the stream numbers of such Primary audio streams that satisfy all of conditions (a), (b), and (c) are set in PSR1.

Here, if there are a plurality of Primary audio streams that satisfy all of conditions (a), (b), and (c), it is necessary to determine one among them that is set in PSR1. In step S15, it is determined based on the order of entry in the STN_table. That is to say, in step S15, if there are a plurality of Primary audio streams that are the same in the codec, language attribute, and channel attribute, the STN_table is referred to and a Primary audio stream that is the first in the order of entry in the STN_table is selected.

It is therefore possible for the person in charge of authoring to control the priority levels of streams to be reproduced, by changing the order of entry in the STN_table.

If there is no Primary audio stream that satisfies all of conditions (a), (b), and (c), the control goes to step S11 in which it is judged whether there are Primary audio streams that satisfy conditions (a) and (b). If it is judged that there are Primary audio streams that satisfy conditions (a) and (b), a Primary audio stream among these that is the first in the order of entry in the STN_table is set in PSR1 (step S16).

If there is no Primary audio stream that satisfies all of conditions (a), (b), and (c) and there is no Primary audio stream that satisfies conditions (a) and (b), the control goes to step S12 in which it is judged whether there are Primary audio streams that satisfy conditions (a) and (c). If it is judged that there are Primary audio streams that satisfy conditions (a) and (c), a Primary audio stream among these that is the first in the order of entry in the STN_table is set in PSR1 (step S17).

If there is no Primary audio stream that satisfies all of conditions (a), (b), and (c), there is no Primary audio stream that satisfies conditions (a) and (b), and there is no Primary audio stream that satisfies conditions (a) and (c), the control goes to step S13 in which it is judged whether there are Primary audio streams that satisfy condition (a). If it is judged that there are Primary audio streams that satisfy condition (a), a Primary audio stream among these that is the first in the order of entry in the STN_table is set in PSR1 (step S18).

Figure 18:
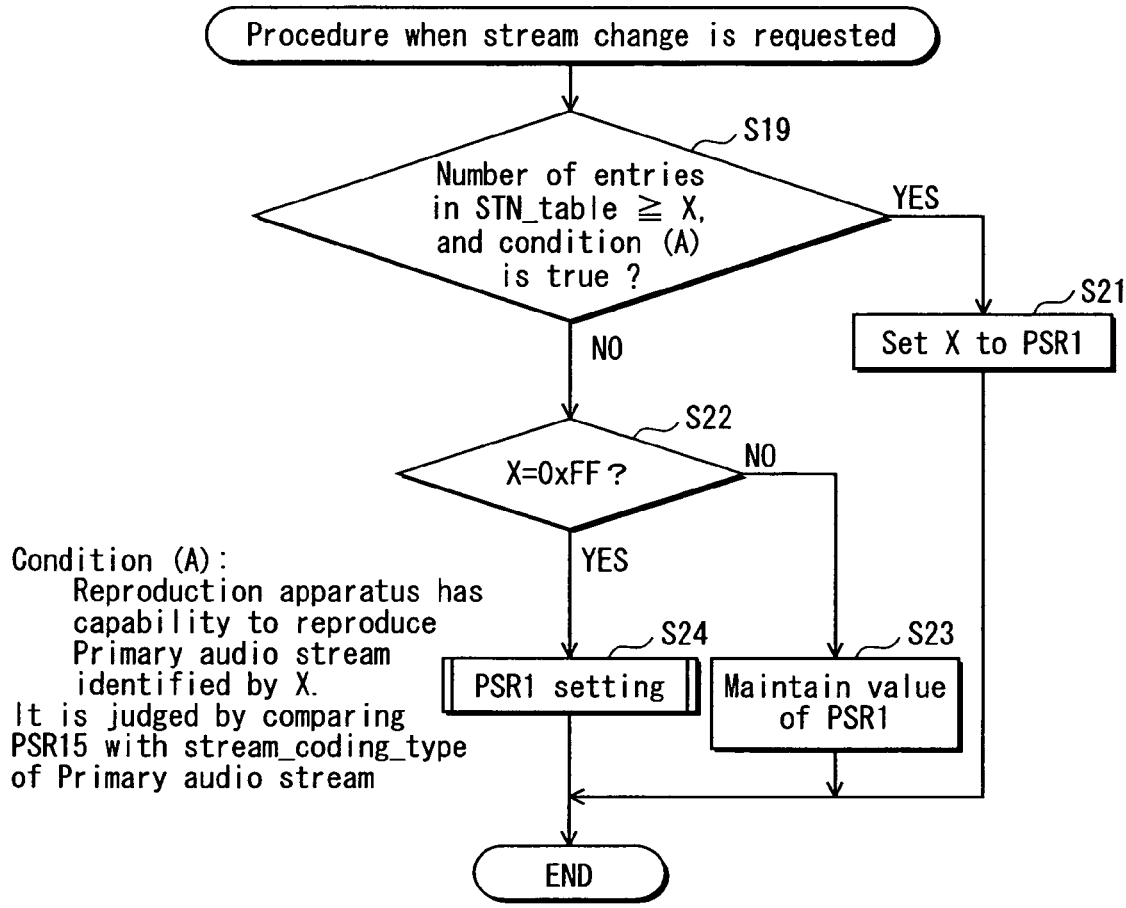
FIG. 18 is a flowchart showing the procedure for setting PSR1 when stream change is requested.

Up to now, the "Procedure when playback condition is changed" has been explained. From now on, the "Procedure when Stream change is requested" will be explained. FIG. 18 is a flowchart showing the procedure for setting PSR1 when stream change is requested. The flowchart of FIG. 18 differs from the flowchart of FIG. 16B in that in some places X is used in place of PSR1. The "X" is a value determined based on the User Operation information output from the operation receiving unit 26 or a button command output from the PG decoder 13.

In step S19 of the flowchart, it is judged whether the number of entries in STN_table is equal to or larger than X, and condition (A) is true. Here, the condition (A) is that the reproduction apparatus has capability to reproduce a Primary audio stream identified by PSR1. It is judged by comparing PSR15 with stream_coding_type of the Primary audio stream. If the judgment result of step S19 is positive, X is set to PSR1 (step S21).

If either X is larger than the number of entries in STN_table or the condition (A) is not satisfied, it is judged whether X is 0xFF. Here, if X is not 0xFF, it is considered that the number of the Primary audio stream that the user intends to select is invalid, and the value X, which is determined based on the user operation, is disregarded and the value set in PSR1 is maintained (step S23).

If X is 0xFF, PSR1 is set (step S24). The processing procedure of step S24 is the same as the procedure shown in FIG. 17 (Among the steps shown in FIG. 17, the judgment in step S9 is not required in the "Procedure when Stream change is requested". This is because in the "Procedure when Stream change is requested", if there is no Primary audio stream that satisfies conditions (a), (b), and (c), X, which is set by the user, is not set to PSR1, and the value set in PSR1 is maintained)

<Specific Example of PSR1 Setting>

Here, the procedure of the flowchart will be explained using a specific example.

In the specific example, it is presumed that the reproduction apparatus has been set as shown in FIG. 19A, and that it does not have the capability of decoding DTS-HD audio streams, but has the capability of decoding LPCM and DD/DD+ audio streams, and that the language has been set to Japanese.

It is further presumed that a BD-ROM, on which the audio streams shown in FIG. 19B and the STN_table are recorded, is loaded into the reproduction apparatus with the above-described settings. The STN_table includes entries of the six audio streams, as shown in FIG. 19C.

When the STN_table shown in FIG. 19C is the target of the processing, in step S8 of FIG. 17, it is checked for each Primary audio stream whether the Primary audio stream satisfies the conditions (a), (b), and (c). Audio stream 1 in the STN_table satisfies only condition (a). Audio stream 2 in the STN_table satisfies conditions (a) and (c).

After all the audio streams whose entries are included in the STN_table are checked in the step as described above, it is found that audio stream 5 satisfies all the conditions (a), (b), and (c), that audio stream 4 satisfies conditions (a) and (b), that audio stream 2 satisfies conditions (a) and (c), and that audio stream 1 satisfies only condition (a). The other audio streams do not satisfy condition (a), and are not subjected to the succeeding processes.

After the checking on the conditions for each audio stream, the highest priority is assigned to audio stream 5 that satisfies all the conditions (a), (b), and (c). Accordingly, audio stream 5 having the highest priority is selected and reproduced together with the corresponding video stream.

As described above, an audio stream that satisfies all the conditions (a), (b), and (c) is selected.

The judgment on whether the conditions (a) and (c) are satisfied is made based on PSR15. The following describes PSR15.

The DTS-HD and the DD/DD+ each include the basic data and the extended data. The basic data and the extended data are decoded separately. With respect to an entry of an audio stream in the STN_table, even if "5.1 ch" or "7.1 ch", which are the numbers of channels corresponding to the surround reproduction, is written in the "audio_presentation_type", and "96 kHz" or "192 kHz" is written in the "sampling_frequency", the reproduction with the number of channels and the sampling frequency is available only after the extended data of the audio frame is decoded, and may not be available if merely the basic data for the backward compatibility is decoded.

Accordingly, if an entry of an audio frame, which conforms to an encoding method that allows only the basic data for the backward compatibility to be decoded, is written in the STN_table, the audio frame conforming to such an encoding method should not be selected by the Procedure executing unit 42. For this purpose, in the present embodiment, the contents of PSR15 are defined in detail so that the judgment on whether the conditions (a) and (c) are satisfied can be made strictly, with respect to the encoding methods that have the audio frame structure composed of the basic data and the extended data.

More specifically, PSR15 represents the processing capability of each encoding method using three parameters (parameters 1, 2, and 3), as follows.

Decoding capability (parameter 1) which is represented by:

the decoding capability of the decoder mounted in the reproduction apparatus 300 when the reproduction apparatus 300 decodes; or the decoding capability of the receiver when bit streams are transmitted.

Transmission path capability (parameter 2) which is represented by:

the transmission capability of the connected audio output.

Speaker construction (parameter 3) which is represented by:

the possibility of the surround reproduction.

Figure 20:
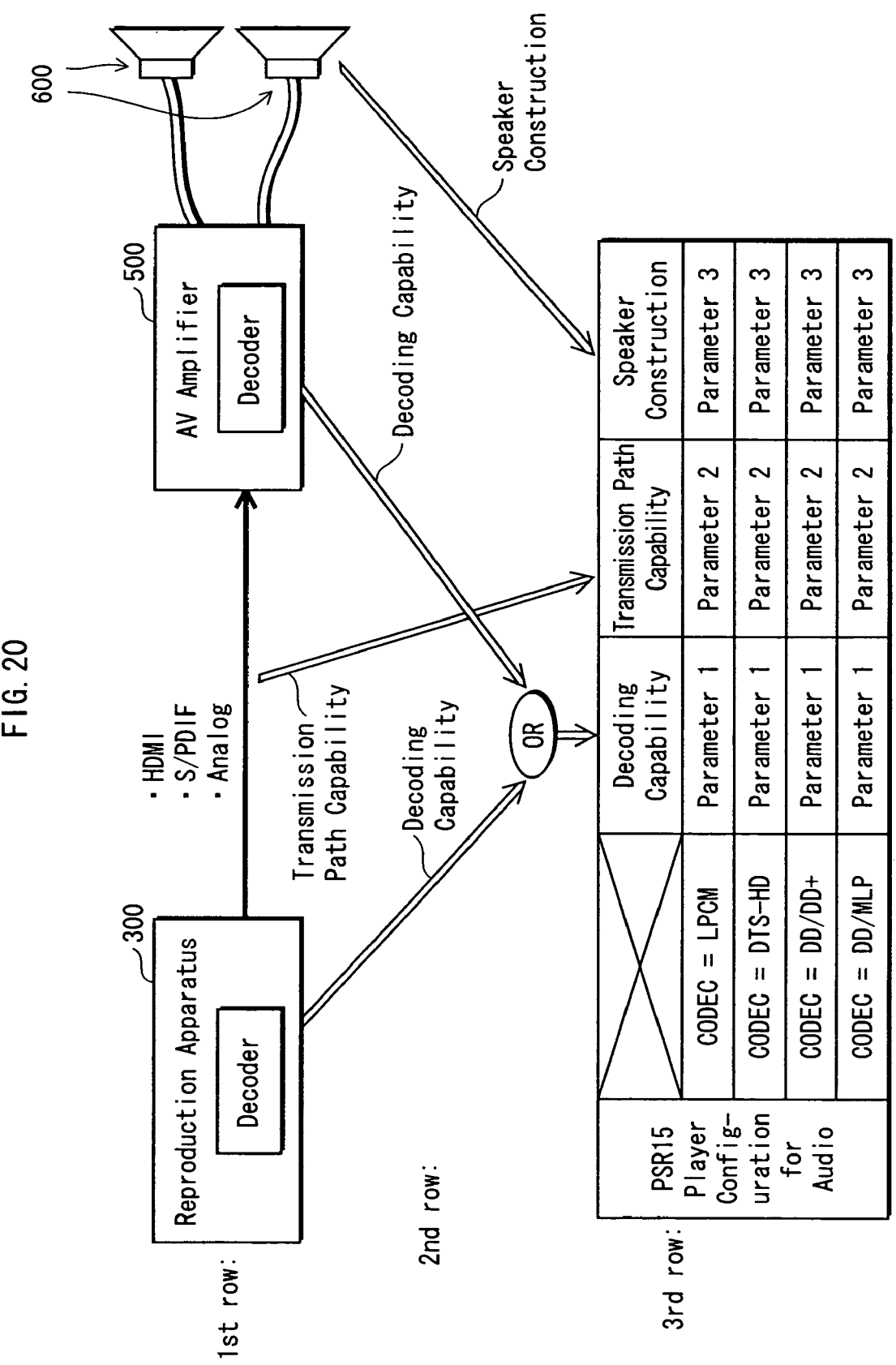
FIG. 20 shows how parameters 1 to 3 are determined.

FIG. 20 shows how parameters 1 to 3 are determined. The $1^{st}$ row of FIG. 20 indicates the reproduction apparatus 300, the AV amplifier 500, and the speakers 600. The $3^{rd}$ row indicates parameters 1 to 3 that are determined for each encoding method (CODEC=LPCM, DTS-HD, DD/DD+, DD/MLP). The $2^{nd}$ row between the $1^{st}$ row and the $3^{rd}$ row indicates the characteristics of the reproduction apparatus 300, the AV amplifier 500, and the speakers 600 that determine parameters 1 to 3 in the $3^{rd}$ row.

As shown in FIG. 20, parameter 1 is determined from a logical addition of the characteristics of the decoder of the reproduction apparatus 300 and the decoder of the AV amplifier 500; parameter 2 is determined from the characteristics of the transmission path between the reproduction apparatus 300 and the AV amplifier 500; and parameter 3 is determined from the characteristics of the speakers 600. In the case of a system that is composed of the reproduction apparatus 300 and the AV amplifier 500, the judgment on whether the conditions (a) and (c) are satisfied may not be made strictly enough if the capability of only the reproduction apparatus is checked. Therefore, PSR15 stores the three parameters to strictly judge whether the conditions (a) and (c) are satisfied.

<Decoding Capability>

Parameter 1 indicating the decoding capability indicates either the decoding capability of the reproduction apparatus or the decoding capability of the receiver. When an analog output or a digital output as LPCM is to be performed after the reproduction apparatus 300 performs the decoding, parameter 1 indicates the decoding capability of the reproduction apparatus.

When the reproduction apparatus 300 performs the passthrough output, parameter 1 indicates the decoding capability of the receiver.

With regards to HDMI, only LPCM can be transmitted at present. However, it is highly possible that HDMI is extended so that DTS-HD, DD/DD+, or DD/MLP is transmitted in the form of the bit stream. After such an extension, LPCM can be transmitted. Whether parameter 1 indicates the decoding capability of the reproduction apparatus or the receiver depends on whether the reproduction apparatus 300 performs the decoding and transmits the data as LPCM or the reproduction apparatus 300 does not perform the decoding and transmits the data as a bit stream. In the case of HDMI, the reproduction apparatus 300 and the receiver perform a communication before they connect to each other, and during this communication, the decoding capability of the receiver can be notified to the reproduction apparatus 300. It is therefore possible to dynamically change parameter 1 depending on the connection destination.

In the case of S/PDIF, the user is required to set the decoding capability of the connection destination in the reproduction apparatus 300 beforehand. Although an automatic determination is not available, only an appropriate setting is required as an initial setting since the connection among the reproduction apparatus 300, the amplifier and the speaker does not change with each reproduction.

Up to now, the setting of the decoding capability has been explained.

<Transmission Capability>

The reason why the transmission capability is defined as parameter 2 in PSR is as follows.

The following will discuss each case of the analog output and the digital output.

1) Analog Output

When the reproduction apparatus 300 decodes audio streams and outputs them as analog data, the following are concerned: (1) the decoding capability of how many channels the decoder loaded in the reproduction apparatus 300 can decode; (2) the capability of how many channels the reproduction apparatus 300 can use for analog output in the internal circuit; or (3) whether the reproduction apparatus 300 can perform stereo output or surround output, which depends on the construction of output terminals.

2) Digital Output

The format of the transmission path on which the digital output is to be transmitted defines the capability of the digital output transmission. In the above-described S/PDIF, the LPCM data, which is non-compressed digital audio data, can be output up to 16 bits, 2 channels, and 48 kHz of audio per sample. In the case of compressed audio data, in the DTS, only DTS audio streams or the Core Substreams of DTS-HD audio streams can be output. Similarly, in the DD/DD+ or in the DD/MLP, only the DD (AC-3) or the DD portions can be output onto the transmission path defined by the S/PDIF. These limitations are mainly the limitations of the standards defined to restrict the transmission speed on the transmission path.

FIGS. 21A and 21B show adverse effects caused by the restrictions imposed by the standards on the transmission path between the reproduction apparatus 300 and the AV amplifier 500. Suppose the reproduction apparatus 300 attempts to output a compressed digital audio stream without decoding it, where the audio stream is composed of basic data (48 kHz, 2 ch) and extended data (192 kHz, 5.1 ch). In this case, however, if, as shown in FIG. 21A, the transmission path is allowed to transmit only the basic data due to the restrictions imposed thereon, the receiver cannot receive the extended data even if the decoder of the receiver has the capability to reproduce the extended data (192 kHz, 5.1 ch), and the speaker outputs only the audio stream of the basic data as the finally output data. This will be explained taking the case of DTS-HD audio stream as an example. When the reproduction apparatus 300, which has the capability to decode the Extension Substream being the extended data of the DTS-HD audio stream, attempts to output the S/PDIF compressed digital audio stream without decoding it, the transmission path is allowed to transmit only the Core Substream due to the restrictions imposed thereon by the standard, and therefore even if the receiver (the amplifier in the drawing) has the capability to decode the DTS-HD audio stream, the receiver cannot receive the Extension Substream, and the speaker outputs only the audio data contained in the Core Substream, as the finally output data.

There is another case in which, as shown in FIG. 21B, even if the decoder of the reproduction apparatus 300 can fully decode the audio data of 192 kHz and 5.1 ch, the transmission path cannot transmit as broad data as that due to the restrictions, and it is required to reduce the band of the stream by performing downsampling and/or downmixing. This will be explained taking the case of LPCM as an example. Even if the reproduction apparatus 300 can fully decode a high-sound-quality LPCM audio stream of 192 kHz, 24-bit, and 6 channels, downsampling and downmixing are required to reduce them to 48 kHz, 16-bit, and 2 channels and to reduce the number of bits per sample to 16 bits, in order to output the data via the S/PDIF. In this case, the high-sound-quality data with the large number of channels cannot be transmitted to the receiver.

FIG. 22 shows, in the format of a table, how can the LPCM, DTS-HD, AC-3, DD/DD+, and DD/MLP used in the BD-ROM be output for each of the analog, S/PDIF, and HDMI outputs that are broadly used as the output method of the digital AV reproduction apparatus 300.

With the S/PDIF, the LPCM can be transmitted up to 192 kHz/16 bit/2 ch, and the DTS-HD can be transmitted, the DD (AC-3) can be transmitted, and only DD portions can be transmitted with respect to the DD/DD+ and the DD/MLP.

With the HDMI, the LPCM can be transmitted up to 192 kHz/24 bit/8 ch, and the DTS-HD can be transmitted after it is decompressed to the LPCM, and similarly the DD (AC-3), DD/DD+, and DD/MLP can be transmitted after they are decompressed to the LPCM. It is highly possible that the HDMI is extended in future so that the DTS-HD, DD/DD+, and DD/MLP can be transmitted in the form of bit streams (in the form of compressed data).

With the analog output, the output capability depends on the construction of the internal circuit of the reproduction apparatus 300 or the construction of the terminals that connect to the speakers.

As described above, the capability of the transmission path defines the quality of the transmitted and reproduced audio stream, thus being contained in PSR15 as a parameter.

<Speaker Construction>

The speaker construction is contained in the PSR as a parameter for the following reasons. The surround audio that has been decoded and transmitted successfully can only be output as a stereo output if there are only two speakers. The result is the same as the result of the case whether the decoder can decode up to two channels or the case where the transmission path can transmit only up to two channels. As understood from this, the speaker construction is one of the elements that affect the Primary audio stream selection procedure.

In the following description, the speaker construction is either stereo or surround. The reason is that at present, many regular displays are connected with only two speakers for stereo output, and in a home theater system, it is only required to judge whether or not the speaker construction includes "5.1 ch" or the like.

Up to now, the three parameters have been described. From now on, it will be explained how these three parameters are defined in each encoding method.

FIG. 23A shows parameters for the LPCM. As shown in FIG. 23A, the parameters for the LPCM are parameter 1 indicating the decoding capability, parameter 2 indicating the transmission path capability, and parameter 3 indicating the speaker construction.

FIG. 23B shows, in the format of a table, the parameters 1 to 3 and the definitions of them. The table includes the definition column and the note column. The note column indicates the definition that was originally intended for each of the parameters 1-3 corresponding to each encoding method. The definition column indicates the definition that was actually made taking into consideration the loading into the BD-ROM reproduction apparatus.

The parameter 1 for the LPCM indicates "either 48/96 kHz or 48/96/192 kHz, as decoding capability for LPCM". The reason for this is as follows. The parameter was originally intended to indicate the values of kHz, the number of bits, and the number of channels up to which the LPCM can be decoded (see the note column). In the case of the LPCM, decoding itself is simple, but the amount of audio data, which has not been compressed, is large, and a large capacity of memory or a broad band may be required to process it. There is accordingly a possibility that a low-price reproduction apparatus may not process the high-bit-rate LPCM. For these reasons, the parameter indicates the maximum bit rate at which the processing is possible, using the units (kHz, the number of bits, and the number of channels) that have meaning as the audio.

In the BD-ROM, the LPCM of 48/96/192 kHz is used. However, it is indispensable to decode 48/96 kHz and there is no need to indicate whether it can be decoded. It is therefore only necessary to determine whether or not the reproduction apparatus 300 itself has enough band and memory capacity to decode the LPCM of 192 kHz. This is the reason why the parameter 1 is set as described above.

The parameter 2 for the LPCM indicates whether transmission with up to two channels or three or more channels is capable. The reason for this is as follows. The parameter was originally intended to indicate the values of kHz, the number of bits, and the number of channels up to which the LPCM can be transmitted to outside. This is because restrictions are imposed on the digital interface such as S/PDIF with respect to the number of channels or the like, as described earlier. However, in the actuality, the frequency or the number of bits does not affect the transmission. As a result, PSR15 of the BD-ROM reproduction apparatus is set as described above.

The parameter 3 for the LPCM indicates whether or not the surround output is capable.

Up to now, the three parameters for the LPCM have been described.

The following describes the three parameters for the DTS-HD.

FIG. 24A shows parameters for the DTS-HD. As shown in FIG. 24A, the parameters for the DTS-HD are parameter 1 indicating the decoding capability, parameter 2 indicating the transmission path capability, and parameter 3 indicating the speaker construction.

FIG. 24B shows, in the format of a table, the parameters 1 to 3 and the definitions of them. The table includes the definition column and the note column. The note column indicates the definition that was originally intended for each of the parameters 1-3 corresponding to each encoding method. The definition column indicates the definition that was actually made taking into consideration the loading into the BD-ROM reproduction apparatus.

The parameter 1 for the DTS-HD indicates whether only Core Substream can be decoded or Extension Substream can also be decoded. The reason for this is as follows. The parameter was originally intended to indicate whether DTS audio can be decoded, and in the case of DTS-HD, whether only Core Substream can be decoded or Extension Substream can also be decoded (see the note column). In addition, the parameter was originally intended to indicate whether or not lossless data can be decoded. This is because lossless data requires broad band and may not be decoded even if the Extension Substream can be decoded. However, it is indispensable to decode Core Substream and there is no need to indicate whether it can be decoded, and whenever Extension Substream can be decoded, lossless data can also be decoded. It is therefore only necessary for the parameter 1 for the DTS-HD to indicate the above-described contents. This is the reason why the parameter 1 is set as described above.

The parameter 2 for the DTS-HD indicates, as the capability of the transmission path, whether only Core Substream can be transmitted or Extension Substream can also be transmitted.

The parameter 3 for the DTS-HD indicates whether or not the surround output is possible with the speaker construction.

Up to now, the three parameters for the DTS-HD have been described.

The following describes the three parameters for the DD/DD+.

FIG. 25A shows parameters for the DD/DD+. As shown in FIG. 25A, the parameters for the DD/DD+ are parameter 1 indicating the decoding capability, parameter 2 indicating the transmission path capability, and parameter 3 indicating the speaker construction.

FIG. 25B shows, in the format of a table, the parameters 1 to 3 and the definitions of them. The table includes the definition column and the note column. The note column indicates the definition that was originally intended for each of the parameters 1-3 corresponding to each encoding method. The definition column indicates the definition that was actually made taking into consideration the loading into the BD-ROM reproduction apparatus.

The parameter 1 for the DD/DD+ indicates whether only the DD portion being the basic data can be decoded or the DD+ portion being the extended data can also be decoded. The reason for this is as follows. In the BD-ROM, it is indispensable to decode the DD (AC-3) and there is no need to indicate whether it can be decoded. It is only necessary to indicate whether only the DD portion being the basic data can be decoded or the DD+ portion being the extended data can also be decoded. This is the reason why the parameter 1 is set as described above.

The parameter 2 for the DD/DD+ indicates, as the capability of the transmission path, whether only the DD portion can be transmitted or the DD+ portion can also be transmitted.

The parameter 3 for the DD/DD+ indicates whether or not the surround output is possible with the speaker construction.

Up to now, the DD/DD+ has been explained.

From now on, the three parameters for the DD/MLP will be described.

FIG. 26A shows parameters for the DD/MLP. As shown in FIG. 26A, the parameters for the DD/MLP are parameter 1 indicating the decoding capability, parameter 2 indicating the transmission path capability, and parameter 3 indicating the speaker construction.

FIG. 26B shows, in the format of a table, the parameters 1 to 3 and the definitions of them. The table includes the definition column and the note column. The note column indicates the definition that was originally intended for each of the parameters 1-3 corresponding to each encoding method. The definition column indicates the definition that was actually made taking into consideration the loading into the BD-ROM reproduction apparatus.

The parameter 1 for the DD/MLP indicates whether only the DD portion being the basic data can be decoded or the MLP portion being the extended data can also be decoded. The reason for this is as follows. The parameter was originally intended to indicate whether the DD (AC-3) can be decoded, whether the DD portion of the DD/MLP can be decoded, and whether the MLP portion of the DD/MLP can be decoded (see the note column). In the BD-ROM, it is indispensable to decode the DD (AC-3) and there is no need to indicate whether it can be decoded. This is the reason why the parameter 1 is set as described above.

The parameter 2 for the DD/MLP indicates, as the capability of the transmission path, whether only the DD portion can be transmitted or the MLP portion can also be transmitted.

The parameter 3 for the DD/MLP indicates whether or not the surround output is possible with the speaker construction.

Up to now, the DD/MLP has been explained.

The DD/DD+ stream and the DD/MLP stream are not completely separate from each other, but are correlated to some extent. Accordingly, the definitions of the two streams can be shown in one PSR15, instead of two PSR15, as shown in FIGS. 27A and 27B.

FIG. 27A shows parameters for the DD/DD+ and DD/MLP. As shown in FIG. 27A, the parameters for the DD/DD+ and DD/MLP are parameter 1a indicating the decoding capability the DD/DD+, parameter 1b indicating the decoding capability the DD/MLP, parameter 2 indicating the transmission path capability of the DD/DD+ and the DD/MLP, and parameter 3 indicating the speaker construction of the DD/DD+ and the DD/MLP.

FIG. 27B shows, in the format of a table, the parameters 1a, 1b, 2, and 3 and the definitions of them. The table includes the definition column and the note column. As will be understood from FIG. 27B, the note column shown in FIG. 27B indicates the definition of the parameter 1 that is a combination of the definitions shown in FIGS. 25B and 26B.

The Procedure executing unit 42 checks whether a Primary audio stream, as a target of selection, satisfies conditions (a), (b), and (c) by identifying a set of parameters 1-3, among a plurality of sets of parameters 1-3 stored in the PSR set 23, that corresponds to the encoding method of the selection target Primary audio stream, and checking whether the values set in the identified set of parameters 1-3 are predetermined values.

Up to now, PSR15 has been described. Lastly in the present embodiment, the PSR setting unit 43 will be described.

The PSR setting unit 43 performs the process of setting parameters 1-3 in PSR15. In this setting process, the PSR setting unit 43 displays the setup menu, and via the setup menu, receives the decoding capability of the device connected to the reproduction apparatus 300, the capability of the transmission path between the reproduction apparatus 300 and the device, and the speaker construction in the home theater system that includes the reproduction apparatus 300, and sets the parameters 1-3 in PSR15 according to the received decoding capability, transmission path capability, and the speaker construction. If the reproduction apparatus 300 is connected to a device via the HDMI, the reproduction apparatus 300 may acquire the decoding capability, speaker construction or the like of the connection destination device through data transmission/reception with the HDMI.

As described above, according to the present embodiment, with respect to an audio stream conforming to an encoding method that includes an audio frame composed of the basic data and the extended data, it is judged whether or not the condition (a) is satisfied by judging whether or not the extended data can be processed. With this construction, it is possible to exclude from selection such audio streams that conform to an encoding method whose extended data cannot be processed. This makes it possible to select an audio stream among audio streams whose extended data can be processed, thus increasing the possibility of realizing the surround reproduction when the recording medium side has an encoding method that provides the surround reproduction and the reproduction apparatus side has the surround output capability.

Furthermore, PSR15 strictly defines the materials that are used to judge whether or not the conditions (a) and (c) are satisfied. With this construction, by referring to PSR15, it is possible to judge appropriately whether or not a system, in which, for example, the reproduction apparatus outputs digital data and the receiver side performs decoding, satisfies the conditions (a) and (c). This enables a system including a reproduction apparatus to decode optimum Primary audio streams.

Second Embodiment

To provide detailed information for reproducing audio streams, such as the decoding capability of the decoder of the reproduction apparatus 300, the transmission path capability, and the speaker construction (surround output capability), the information needs to be stored in STR15.

However, if it is only necessary to refer to parameters to select an appropriate audio stream in the Primary audio stream selection procedure described in the first embodiment, the above-described elements can be optimized to provide information conforming to the Primary audio stream selection procedure.

Among the four conditions shown in the first embodiment, condition (a) is indispensable. That is to say, if any sound/voice is not to be output in the last stage in reproduction of an audio stream, the audio stream should not be selected. Whether or not condition (a) is satisfied can be judged by referring to the decoding capability and the transmission path capability.

With respect to condition (c), there is a complex case in which stereo sound is output when only basic data is reproduced, and surround sound is output when basic data and extended data are reproduced. For example, in DTS-HD, Core Substream can store audio data of 48 kHz/2 ch and Extension Substream can store lossless audio data of 192 kHz/6 ch. This is an example of the above-mentioned complex case. That is to say, in the Primary audio stream selection procedure for a reproduction apparatus 300 that can decode only the basic data, a target stream is treated as stereo, while in the Primary audio stream selection procedure for a reproduction apparatus 300 that can decode the extended data as well, a target audio stream is treated as surround. A distinction between these cases needs to be indicated. Accordingly, to judge whether the condition (c) is satisfied, the speaker construction (surround output capability) should be taken into account. Further, in the case of LPCM, the transmission path capability should be taken into account, as well.

The following describes how to optimize the contents of PSR15 for each type of audio stream, in accordance with the Primary audio stream selection procedure.

FIG. 28 shows a setting of parameters 1-2 for LPCM. The $1^{st}$ row in FIG. 28 shows the reproduction apparatus 300, the AV amplifier 500, and the speakers 600. The $3^{rd}$ row shows parameters 1-2 stored in PSR15, having been set for each encoding method. The $2^{nd}$ row between the $1^{st}$ row and the $3^{rd}$ row indicates the characteristics of the reproduction apparatus 300, the AV amplifier 500, and the speakers 600 that determine the parameters 1-2 in the $3^{rd}$ row.

As shown in FIG. 28, parameter 1 is determined from a logical addition of the characteristics of the decoder of the reproduction apparatus 300 and the decoder of the AV amplifier 500; and parameter 2 is determined from a logical multiplication of the characteristics of the transmission path between the reproduction apparatus 300 and the AV amplifier 500 with the characteristics of the speakers 600.

FIGS. 29A and 29B show an example of parameters for LPCM audio streams. As shown in FIG. 29A, PSR15 is composed of reproduction capability (parameter 1) and surround output capability (parameter 2).

In the case of LPCM, audio data that can be processed in the reproduction apparatus 300 is output as a sound/voice, and therefore the reproduction capability is equivalent with the decoding capability.

FIG. 29B shows how parameter 2 is set from the combination of the transmission path capability and the speaker construction. As shown in FIG. 29B, parameter 2 is set to "Surround output capable" only when the transmission path capability is "Transmission capable with up to 8 channels" and the speaker construction is "Three or more, or virtual surround can be achieved". In the other cases, that is to say, when the transmission path capability is "Transmission capable with only 2 channels" or when the speaker construction is "Two or less", parameter 2 is set to surround output incapable. The reasons for such settings are as follows. If there are only two speakers for outputting data finally, even if the transmission path is capable of transmitting data with a plurality of channels, data, which is transmitted with two channels, among data that is transmitted with the plurality of channels is output finally from the speakers. In this case, there is no surround output capability. Also, even if there are a plurality of speakers, the surround output is not capable if the transmission path is capable of transmitting data with only two channels. The S/PDIF, which was generated to transmit CD audio, can transmit two channels of LPCM, and therefore when the S/PDIF is used, the surround output capability is not available. The surround output capability is available in the case where the transmission path can transmit data with a plurality of channels, and the speakers correspond to the surround or achieve a virtual surround. These are the reasons why the parameters 1 and 2 are set as described above.

Figure 30:
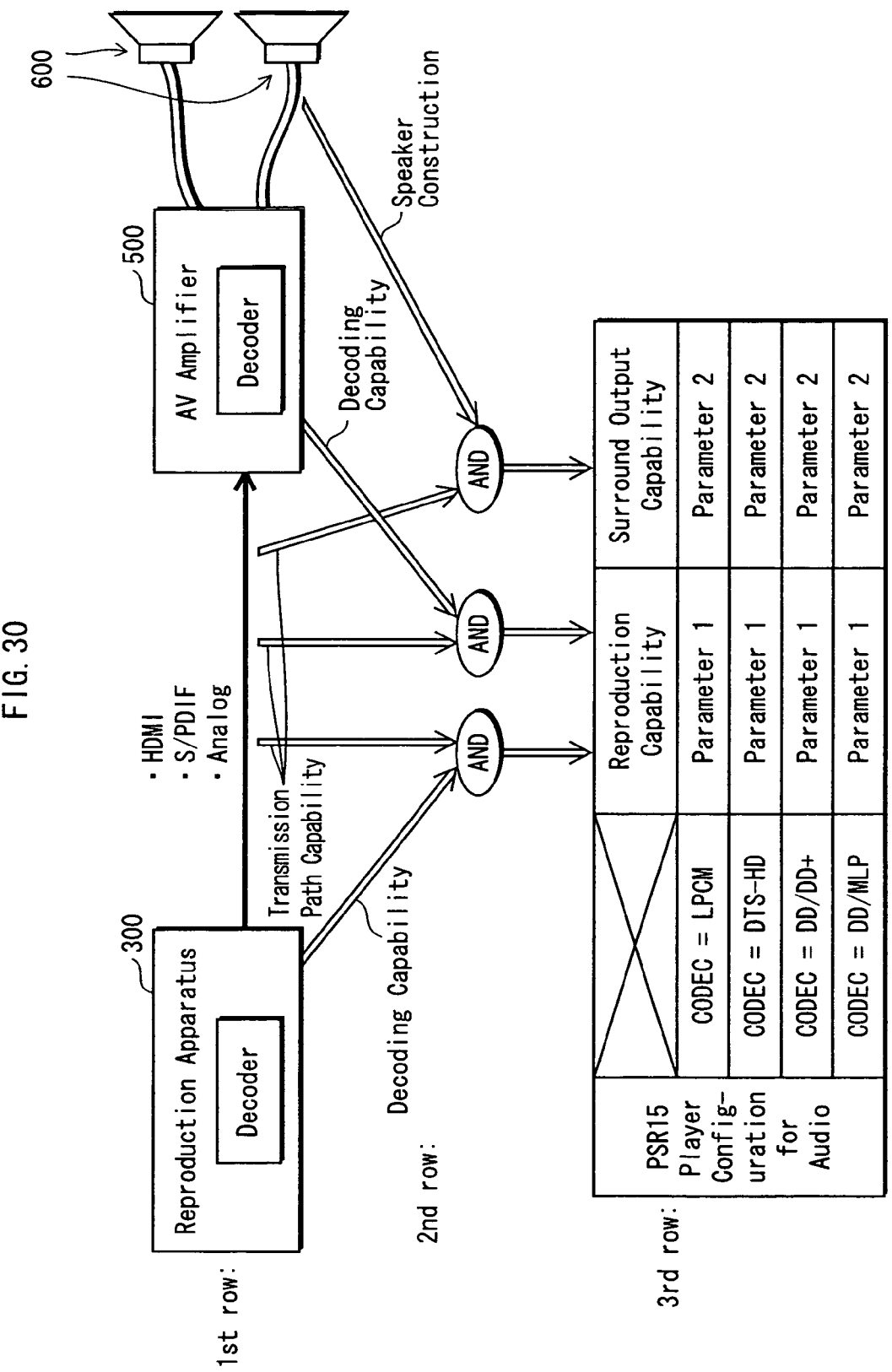
FIG. 30 shows another setting of parameters 1-2 for LPCM.

FIG. 30 shows another setting of parameters 1-2 for LPCM. The $1^{st}$ row in FIG. 30 shows the reproduction apparatus 300, the AV amplifier 500, and the speakers 600. The $3^{rd}$ row shows parameters 1-2 stored in PSR15, having been set for each encoding method. The $2^{nd}$ row between the $1^{st}$ row and the $3^{rd}$ row indicates the characteristics of the reproduction apparatus 300, the AV amplifier 500, and the speakers 600 that determine the parameters 1-2 in the $3^{rd}$ row.

As shown in FIG. 30, parameter 1 is determined from a logical multiplication of the characteristics of the decoder of the reproduction apparatus 300 with the characteristics of the transmission path, or from a logical multiplication of the characteristics of the decoder in the AV amplifier 500 with the characteristics of the transmission path; and parameter 2 is determined from a logical multiplication of the characteristics of the transmission path between the reproduction apparatus 300 and the AV amplifier 500 with the characteristics of the speakers 600.

FIG. 31A shows an example of defining the capabilities for the LPCM, from the reproduction capability (parameter 1), which is referred to for the judgment on the condition (a), and the surround output capability (parameter 2) which is referred to for the judgment on the condition (c).

FIG. 31B shows how parameter 1 is set from the combination of the decoding capability and the transmission path capability. In the example shown in FIG. 31B, the decoding capability is classified into "Decoding for 48 kHz/96 kHz is capable" and "Decoding for 192 kHz is also capable".

In the example shown in FIG. 31B, the transmission path capability is classified into "Transmission capable at 48 kHz with the S/PDIF used as the threshold value" and "Transmission capable at up to 192 kHz".

Even if decoding at up to 96 kHz is capable, if the transmission path supports up to 48 kHz, the LPCM of 96 kHz needs to be downsampled to 48 kHz so as to be transmitted. This reduces the sound quality but allows audio to be output. For this reason, parameter 1 may be set to reproduction capable even for 96 kHz since the LPCM of 96 kHz can be transmitted by downsampling it. Alternatively, parameter 1 may be set to reproduction capable only for 48 kHz and incapable for 96 kHz. In the BD-ROM, parameter 1 is set to reproduction capable even for 96 kHz. The following description therefore presumes that parameter 1 is set to reproduction capable even for 96 kHz.

However, if parameter 1 is set as described above, the reproduction capability is equivalent with the decoding capability, resulting in the same setting as in FIGS. 29A and 29B.

Figure 32:
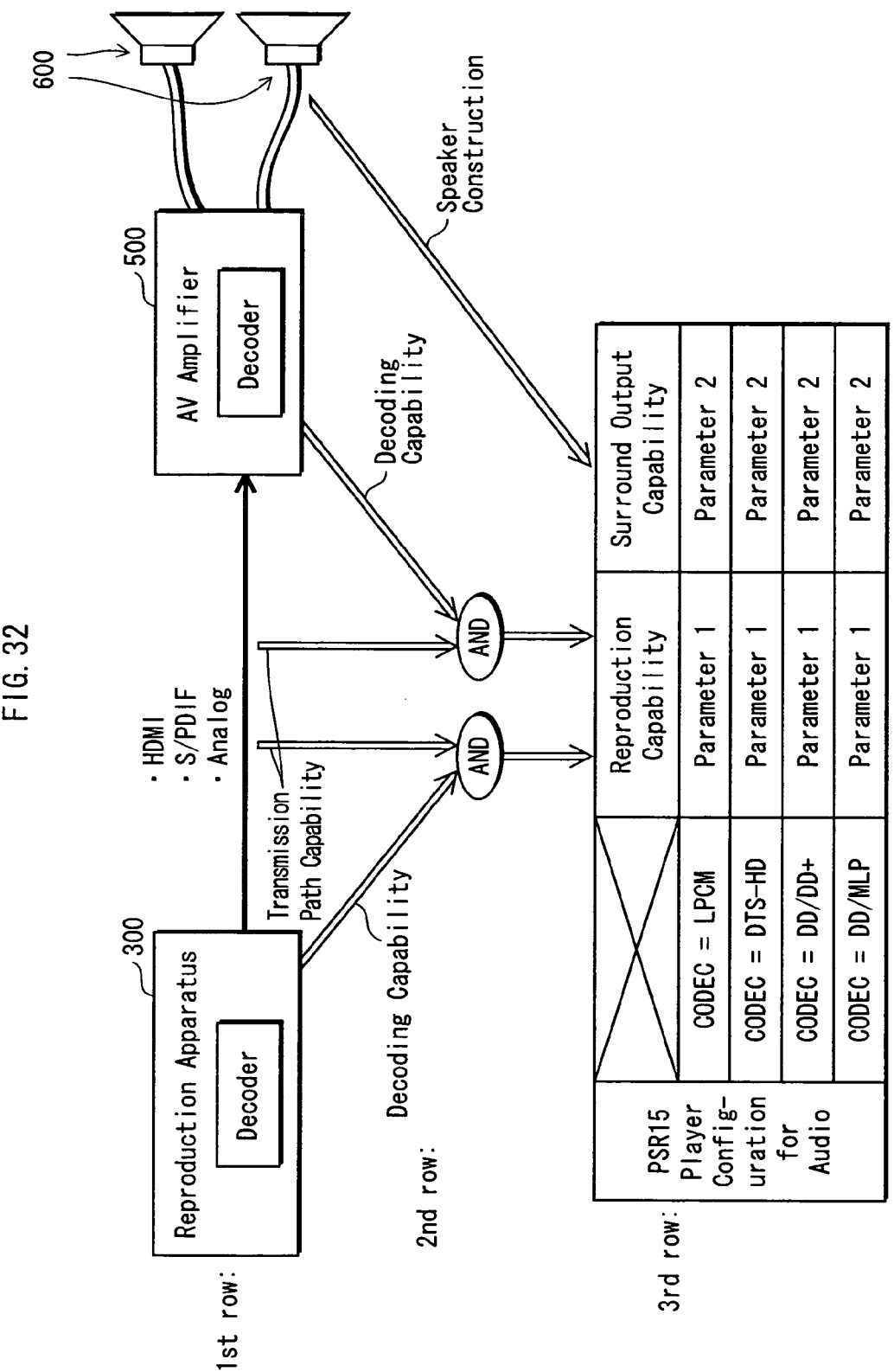
FIG. 32 shows a setting of parameters 1-2 for DTS/DTS-HD, DD/DD+, and DD/MLP.

FIG. 32 shows a setting of parameters 1-2 for DTS/DTS-HD, DD/DD+, and DD/MLP. The $1^{st}$ row in FIG. 32 shows the reproduction apparatus 300, the AV amplifier 500, and the speakers 600. The $3^{rd}$ row shows parameters 1-2 stored in PSR15, having been set for each encoding method. The $2^{nd}$ row between the $1^{st}$ row and the $3^{rd}$ row indicates the characteristics of the reproduction apparatus 300, the AV amplifier 500, and the speakers 600 that determine the parameters 1-2 in the $3^{rd}$ row.

As shown in FIG. 32, parameter 1 is determined from a logical multiplication of the characteristics of the decoder of the reproduction apparatus 300 with the characteristics of the transmission path, or from a logical multiplication of the characteristics of the decoder in the AV amplifier 500 with the characteristics of the transmission path; and parameter 2 is determined from the construction of the speakers 600.

FIG. 33A shows an example of defining the capabilities, from the reproduction capability (parameter 1), which is referred to for the judgment on the condition (a), and the surround output capability (parameter 2) which is referred to for the judgment on the condition (c). As shown in FIG. 33A, parameter 1 representing the reproduction capability is determined from the relationship between the decoding capability and the transmission path capability. The surround output capability is equivalent with the speaker construction.

FIG. 33B shows how parameter 1 is set from the combination of the decoding capability and the transmission path capability. In the example shown in FIG. 33B, the decoding capability is classified into "Decoding for 48 kHz/96 kHz is capable" and "Decoding for 192 kHz is also capable".

In the example shown in FIG. 33B, the transmission path capability is classified into "Decoding of DTS and Core Substream of DTS-HD capable" and "Decoding of Extension Substream of DTS-HD also capable".

The transmission path capability is classified into "Transmission of DTS Stream and Core Substream capable" and "Transmission of Extension Substream also capable".

As shown in FIG. 33B, the decoding capability is indispensable to have the reproduction capability. If the decoder has the capability to decode only the DTS audio stream and the Core Substream of the DTS-HD, even if the transmission path has the capability to transmit the Extension Substream, only the capability to reproduce the DTS audio stream and the Core Substream of the DTS-HD audio stream is provided.

Even if the decoder has the capability to decode the Extension Substream as well, if the transmission path does not have the capability to transmit the Extension Substream, only the capability to reproduce the DTS audio stream and the Core Substream of the DTS-HD audio stream is provided. That is to say, to set parameter 1 to indicate that the reproduction of the DTS-HD audio stream is capable, it is required to have both (i) the capability to decode the Extension Substream of the DTS-HD as well as the DTS audio stream and the Core Substream of the DTS-HD and (ii) the capability to transmit the Extension Substream of the DTS-HD as well as the DTS audio stream and the Core Substream of the DTS-HD.

FIG. 34A shows an example of defining the capabilities for the DD (AC-3) and DD/DD+, from the reproduction capability (parameter 1), which is referred to for the judgment on the condition (a), and the surround output capability (parameter 2) which is referred to for the judgment on the condition (c). As shown in FIG. 34A, parameter 1 representing the reproduction capability is determined from the relationship between the decoding capability and the transmission path capability. The surround output capability is equivalent with the speaker construction.

FIG. 34B shows how parameter 1 is set from the combination of the decoding capability and the transmission path capability. In the example shown in FIG. 34B, the decoding capability is classified into "Decoding incapable", "Decoding of DD and DD portion of DD/DD+ capable", and "Decoding of DD+ portion of DD/DD+ also capable".

In the example shown in FIG. 34B, the transmission path capability is classified into "Transmission of DD and DD portion of DD/DD+ capable" and "Transmission of DD+ portion of DD/DD+ also capable".

If the decoding capability is set to "Decoding incapable", the reproduction capability is not available. If the decoder has the capability to decode only the DD audio stream and the DD portion of the DD/DD+ audio stream, even if the transmission path has the capability to transmit the DD+ portion of the DD/DD+ audio stream as well, only the capability to reproduce the DD and the DD portion of the DD/DD+ audio stream is provided.

Even if the decoder has the capability to decode the DD+ portion of the DD/DD+ audio stream as well as the DD audio stream and the DD portion of the DD/DD+ audio stream, if the transmission path does not have the capability to transmit the DD+ portion of the DD/DD+ audio stream, only the capability to reproduce the DD audio stream and the DD portion of the DD/DD+ audio stream is provided. That is to say, to set parameter 1 to indicate that the reproduction of the DD/DD+ audio stream is capable, it is required to have both (i) the capability to decode the DD+ portion of the DD/DD+ audio stream as well as the DD audio stream and the DD portion of the DD/DD+ audio stream and (ii) the capability to transmit the DD+ portion of the DD/DD+ audio stream as well as the DD audio stream and the DD portion of the DD/DD+ audio stream.

FIG. 35A shows an example of defining the capabilities for the DD (AC-3) and DD/MLP, from the reproduction capability (parameter 1), which is referred to for the judgment on the condition (a), and the surround output capability (parameter 2) which is referred to for the judgment on the condition (c). As shown in FIG. 35A, parameter 1 representing the reproduction capability is determined from the relationship between the decoding capability and the transmission path capability. The surround output capability is equivalent with the speaker construction.

FIG. 35B shows how parameter 1 is set from the combination of the decoding capability and the transmission path capability. In the example shown in FIG. 35B, the decoding capability is classified into "Decoding incapable", "Decoding of DD and DD portion of DD/MLP capable", and "Decoding of DD+ portion of DD/MLP also capable".

In the example shown in FIG. 35B, the transmission path capability is classified into "Transmission of DD and DD portion of DD/MLP capable" and "Transmission of MLP portion of DD/MLP also capable".

If the decoding capability is set to "Decoding incapable", the reproduction capability is not available. If the decoder has the capability to decode only the DD audio stream and the DD portion of the DD/MLP audio stream, even if the transmission path has the capability to transmit the MLP portion of the DD/MLP audio stream as well, only the capability to reproduce the DD and the DD portion of the DD/MLP audio stream is provided.

Even if the decoder has the capability to decode the MLP portion of the DD/MLP audio stream as well as the DD audio stream and the DD portion of the DD/MLP audio stream, if the transmission path does not have the capability to transmit the MLP portion of the DD/MLP audio stream, only the capability to reproduce the DD audio stream and the DD portion of the DD/MLP audio stream is provided. That is to say, to set parameter 1 to indicate that the reproduction of the DD/MLP audio stream is capable, it is required to have both (i) the capability to decode the MLP portion of the DD/MLP audio stream as well as the DD audio stream and the DD portion of the DD/MLP audio stream and (ii) the capability to transmit the MLP portion of the DD/MLP audio stream as well as the DD audio stream and the DD portion of the DD/MLP audio stream.

The use of PSR15 described above enables the Primary audio stream selection procedure to make minuter judgment on the conditions (a) and (c).

Here, the judgment on the condition (a), the reproduction capability, will be described.

If, by comparing the target audio stream with the reproduction capability set in PSR15, it is found that the target audio stream can be output as a sound, it is judged that the condition (a) is satisfied, and if it is found that the target audio stream cannot be output as a sound, it is judged that the condition (a) is not satisfied.

With respect to a Primary audio stream being a selection target, the Procedure executing unit 42 in the present embodiment identifies a parameter group that corresponds to the encoding method of the selection-target Primary audio stream, among parameter groups in the PSR set 23 each of which is composed of parameters 1-2, the parameter groups respectively corresponding to encoding methods. The Procedure executing unit 42 then checks whether values in the identified parameter group are set to predetermined values to judge whether or not the conditions (a) and (c) are satisfied.

Figure 36:
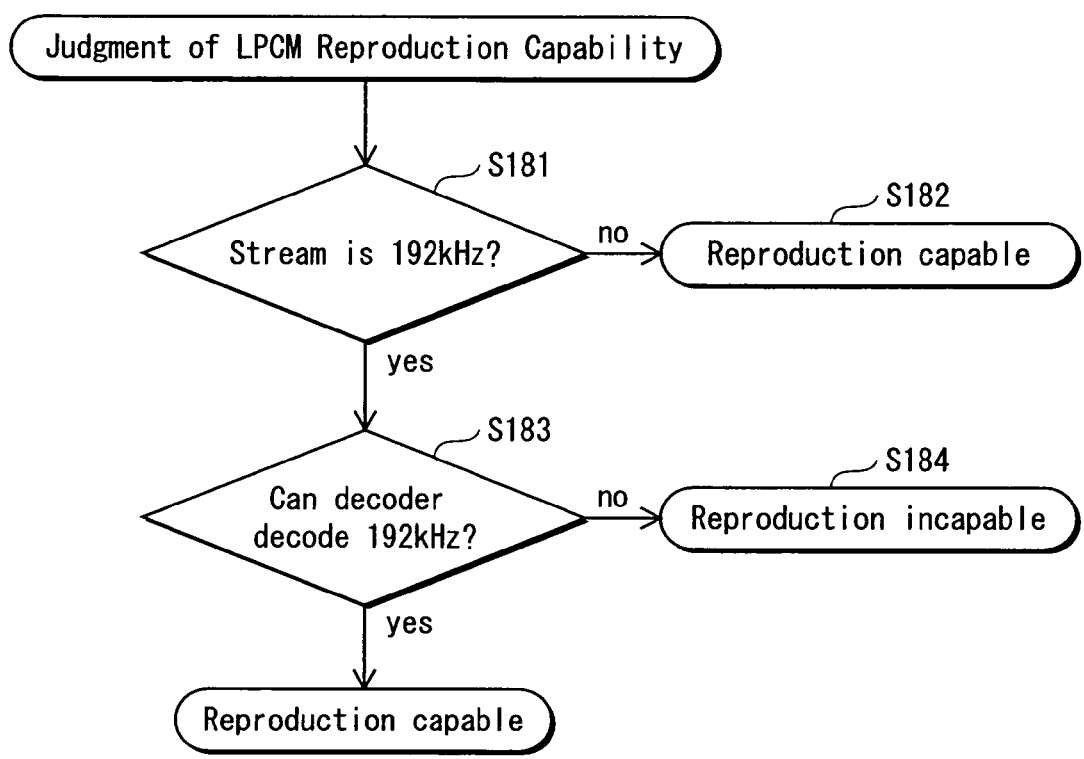
FIG. 36 is a flowchart showing the procedure for judging whether or not the LPCM reproduction is capable.

FIG. 36 is a flowchart showing the procedure for judging whether or not the LPCM reproduction is capable.

In the flowchart of FIG. 36, it is first judged whether or not the frequency of the audio stream is 192 kHz (step S181).

If the judgment result of step S181 is negative, it is judged that the reproduction is capable (step S192).

If the judgment result of step S181 is positive (Yes), it is judged whether or not the decoder can decode 192 kHz (step S183). The reason for performing such judgment is as follows. In the case of the LPCM, the BD-ROM is defined to reproduce LPCM audio streams of 48 kHz and 96 kHz without fail. As a result, if the target audio stream is an LPCM audio stream of 192 kHz, the judgment should be based on whether the reproduction apparatus 300, which is to reproduce the audio stream, has the capability to decode the LPCM of 192 kHz. Accordingly, if the judgment result of step S183 is positive (Yes), it is judged that the reproduction is capable; and if the judgment result of step S183 is negative (No), it is judged that the reproduction is incapable.

The capability of the transmission path also affects the above-described judgments. When an LPCM of 96 kHz/8 ch/24 bits is to be transmitted via a transmission path, such as S/PDIF, that can transmit up to 48 kHz/2 ch/16 bits, the audio quality is reduced before it is sent onto the transmission path, by means of downsampling, downmixing, and reduction in the number of bits per sample. Although the audio quality or the number of channels is decreased, in the BD-ROM, the case is regarded as reproduction capable.

With respect to the DTS and the DD (AC-3), it is defined in the BD-ROM that they should be indispensably reproduced, thus they can be transmitted on the assumed transmission paths, and therefore it is judged that the condition (a) is satisfied.

With respect to the DTS-HD, the Core Substream portion of the target audio stream is always output as sound/voice even if the decoder can decode only the Core Substream or even if the transmission path can transmit only the Core Substream. In the BD-ROM, it is judged that this case satisfies the condition (a)

With respect to the DD/DD+, the DD portion of the target DD/DD+ audio stream is always output as sound/voice even if the decoder can decode only the DD portion of the DD/DD+ or even if the transmission path can transmit only the DD portion of the DD/DD+. In the BD-ROM, it is judged that this case satisfies the condition (a).

With respect to the DD/MLP, the DD portion of the target DD/MLP audio stream is always output as sound/voice even if the decoder can decode only the DD portion of the DD/MLP or even if the transmission path can transmit only the DD portion of the DD/MLP. In the BD-ROM, it is judged that this case satisfies the condition (a).

<Judgment on Surround Output Capability Audio Stream>

The following describes the judgment on the surround output capability, the condition (c).

If, by comparing the target audio stream with the surround output capability set in PSR15, it is found that the target audio stream can be output as a surround sound, it is judged that the condition (c) is satisfied, and if it is found that the target audio stream cannot be output as a surround sound, it is judged that the condition (c) is not satisfied. Also, in the case of a failure, a priority is not assigned to the audio stream.

Figure 37:
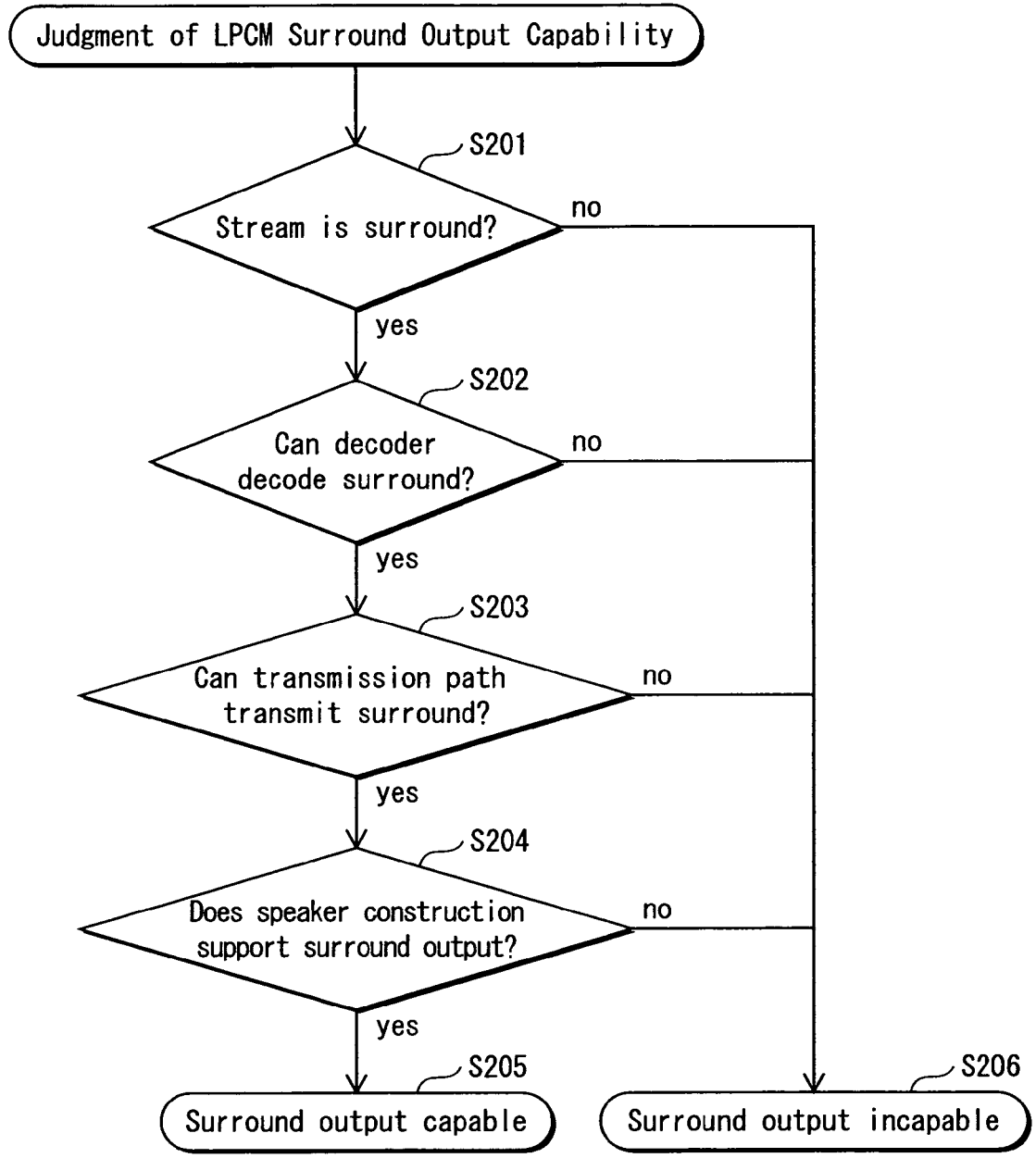
FIG. 37 is a flowchart showing the procedure for judging whether or not the reproduction apparatus has the surround output capability for the LPCM audio stream.

FIG. 37 is a flowchart showing the procedure for judging whether or not the reproduction apparatus has the surround output capability for the LPCM audio stream. In this flowchart, the following judgments are made in sequence: whether or not the audio stream itself is surround (step S201); whether or not the decoder can decode surround sound/voice (step S202); whether or not the transmission path can transmit surround (step S203); and whether or not the speaker construction supports the surround output (step S204). If results of all these judgments are positive (Yes), it is judged that the surround output is capable (step S205). If any results of these judgments are negative (No), it is judged that the surround output is incapable (step S206).

Figure 38:
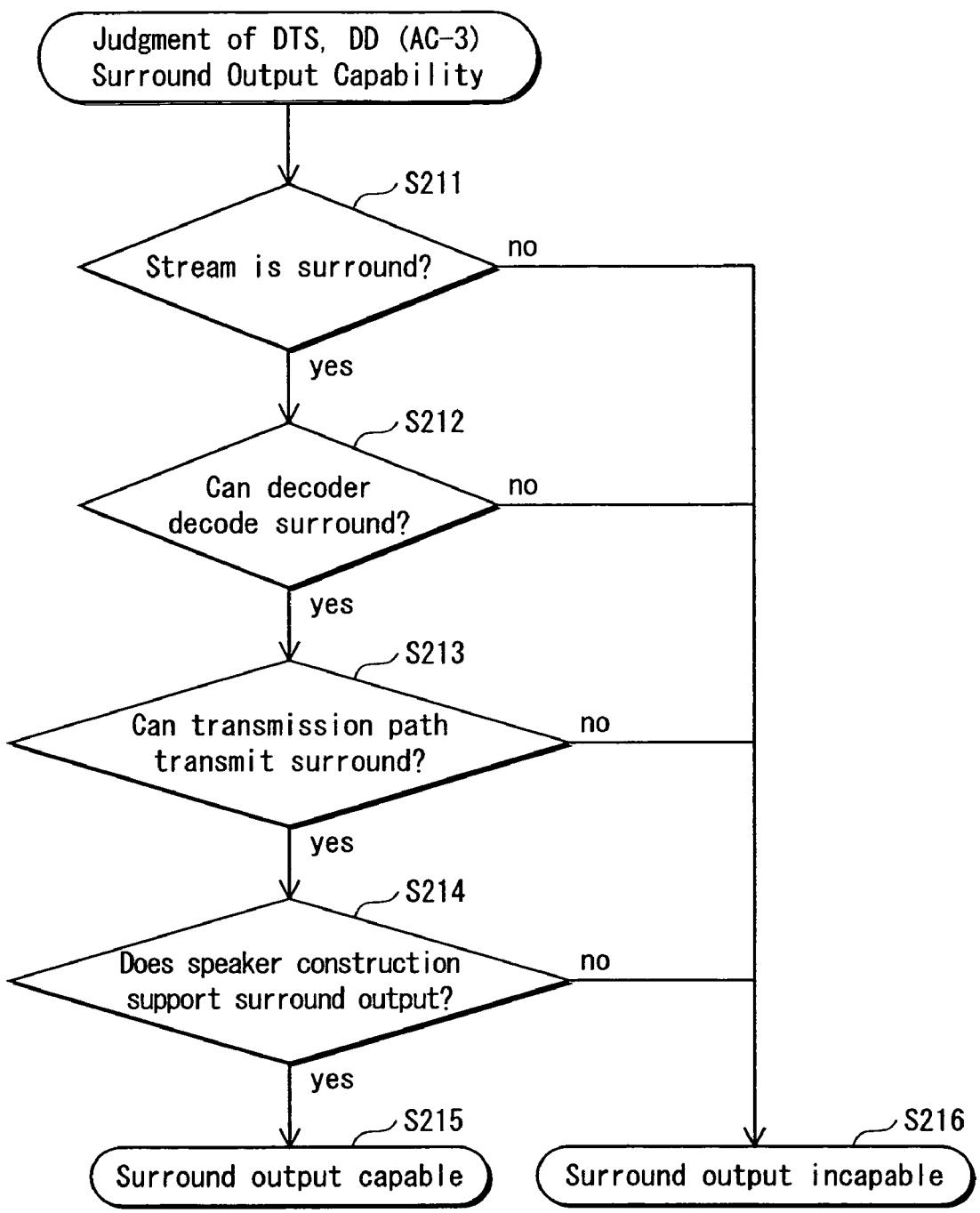
FIG. 38 is a flowchart showing the procedure for judging whether or not the reproduction apparatus has the surround output capability for the DTS or DD (AC-3) audio stream.

FIG. 38 is a flowchart showing the procedure for judging whether or not the reproduction apparatus has the surround output capability for the DTS or DD (AC-3) audio stream. In this flowchart, the following judgments are made in sequence: whether or not the audio stream itself is surround (step S211); whether or not the decoder can decode surround sound/voice (step S212); whether or not the transmission path can transmit surround (step S213); and whether or not the speaker construction supports the surround output (step S214). If results of all these judgments are positive (Yes), it is judged that the surround output is capable (step S215). If any results of these judgments are negative (No), it is judged that the surround output is incapable (step S216).

Figure 39:
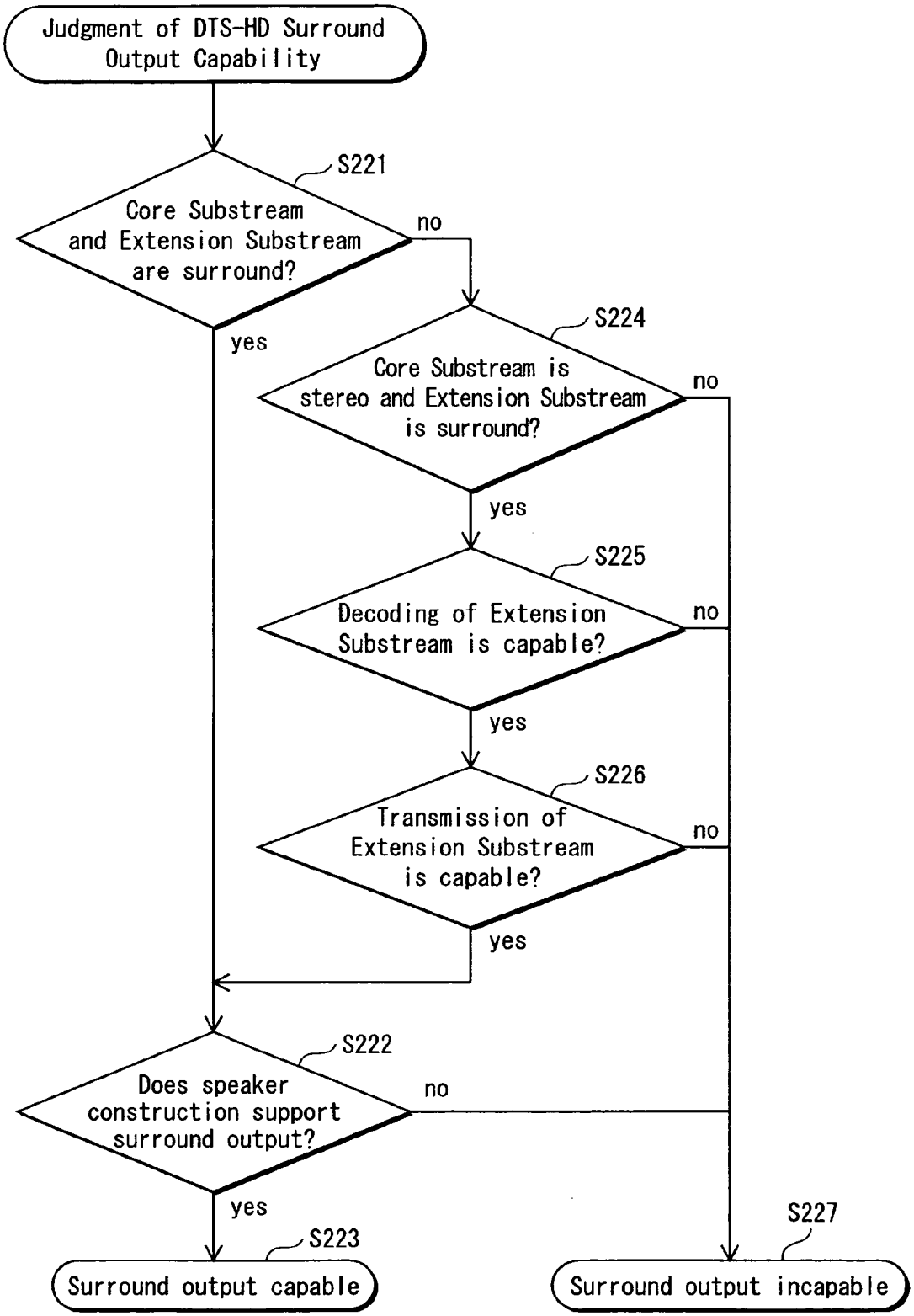
FIG. 39 is a flowchart showing the procedure for judging whether or not the reproduction apparatus has the surround output capability for the DTS-HD.

FIG. 39 is a flowchart showing the procedure for judging whether or not the reproduction apparatus has the surround output capability for the DTS-HD. This flowchart starts with a judgment on whether or not Core Substream and Extension Substream are surround (step S221). If it is judged that both are surround, then it is judged whether or not the speaker construction supports the surround output (step S222). If it is judged that the speaker construction supports the surround output, it is judged that the surround output is capable (step S223).

If the judgment result of step S221 is negative (No), it is judged whether or not it is true that Core Substream is stereo and the combination of Core Substream and Extension Substream is surround (step S224). If the judgment result of step S224 is negative (No), it is judged that the surround output is incapable (step S227). If the judgment result of step S224 is positive (Yes), it is judged whether or not the decoder can decode Extension Substream (step S225). If the judgment result of step S225 is positive (Yes), it is judged whether or not the transmission path can transmit Extension Substream (step S226). If it is judged that the decoder can decode Extension Substream and that the transmission path can transmit Extension Substream, it is judged whether or not the speaker construction supports the surround output (step S222). If it is judged that the speaker construction supports the surround output, it is judged that the surround output is capable (step S223).

If any results of the judgments in steps S224-S226 are negative (No), it is judged that the surround output is incapable.

Figure 40:
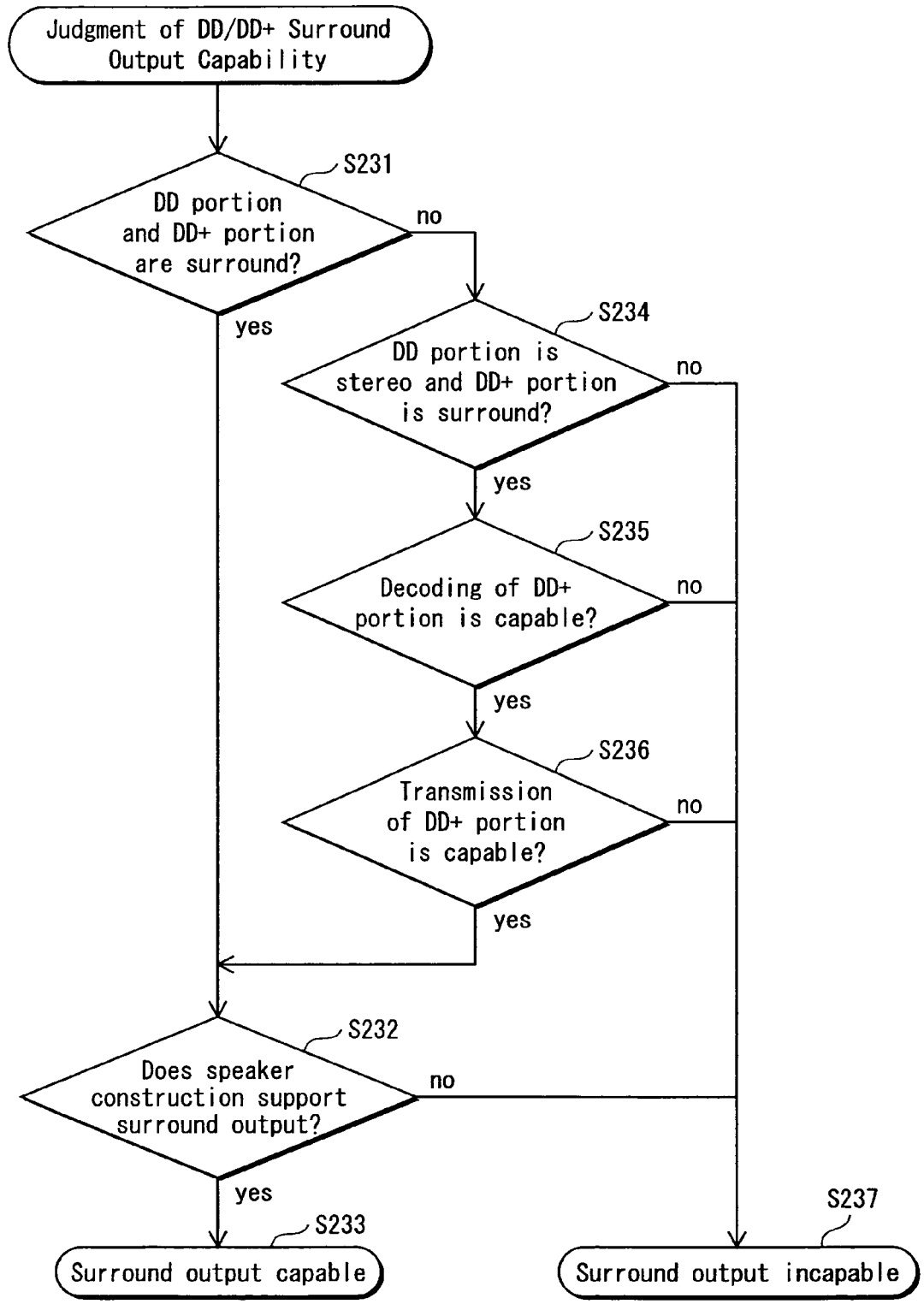
FIG. 40 is a flowchart showing the procedure for judging whether or not the reproduction apparatus has the surround output capability for the DD/DD+.

FIG. 40 is a flowchart showing the procedure for judging whether or not the reproduction apparatus has the surround output capability for the DD/DD+. This flowchart starts with a judgment on whether or not it is true that the DD portion of the DD/DD+ is surround and (i) the combination of the DD portion and the DD+ portion of the DD/DD+ or (ii) the DD+ portion replacing the DD portion is surround (step S231). If the judgment result of step S231 is positive (Yes), it is judged whether or not the speaker construction supports the surround output (step S232). If it is judged that the speaker construction supports the surround output, it is judged that the surround output is capable (step S233).

If the judgment result of step S231 is negative (No), that is to say, if the DD portion of the DD/DD+ is stereo, it is judged whether or not it is true that the DD portion of the DD/DD+ is stereo and (i) the combination of the DD portion and the DD+ portion of the DD/DD+ or (ii) the DD+ portion replacing the DD portion is surround (step S234). If the judgment result of step S234 is positive (Yes), it is judged whether or not the decoder can decode the DD+ portion of the DD/DD+ (step S235). If the judgment result of step S235 is positive (Yes), it is judged whether or not the transmission path can transmit the DD+ portion of the DD/DD+ (step S236). If results of all these judgments in steps S234-S236 are positive (Yes), it is judged whether or not the speaker construction supports the surround output (step S232). If it is judged that the speaker construction supports the surround output, it is judged that the surround output is capable (step S233). If any results of these judgments are negative (No), which include the cases where the decoder can decode only the DD portion of the DD/DD+ and the transmission path can transmit only the DD portion of the DD/DD+, it is judged that the surround output is incapable (step S237).

It should be noted here that in the case of DD/DD+, the extended data may be a difference from the basic data or may be independent and replace the basic data. In the latter case, the DD portion of the DD/DD+ may be a surround audio stream and the DD+ portion replacing the DD portion may be a stereo audio stream.

If the decoder can decode only the DD portion of the DD/DD+ ("No" in step S235), or if the transmission path can transmit only the DD portion of the DD/DD+ ("No" in step S236), it is judged that the surround output is incapable (step S237).

If the decoder can decode the DD+ portion of the DD/DD+ as well ("Yes" in step S235), and if the transmission path can transmit the DD+ portion of the DD/DD+ as well ("Yes" in step S236), either of the surround output and the stereo output is available. If the surround output is given a priority, the audio stream is treated as a surround audio stream. If the speaker construction supports the surround output ("Yes" in step S232), it is judged that the surround output is capable (step S233). If the surround output is not given a priority, the extended data is output as a stereo audio stream, and it is judged that the surround output is incapable (step S237).

Figure 41:
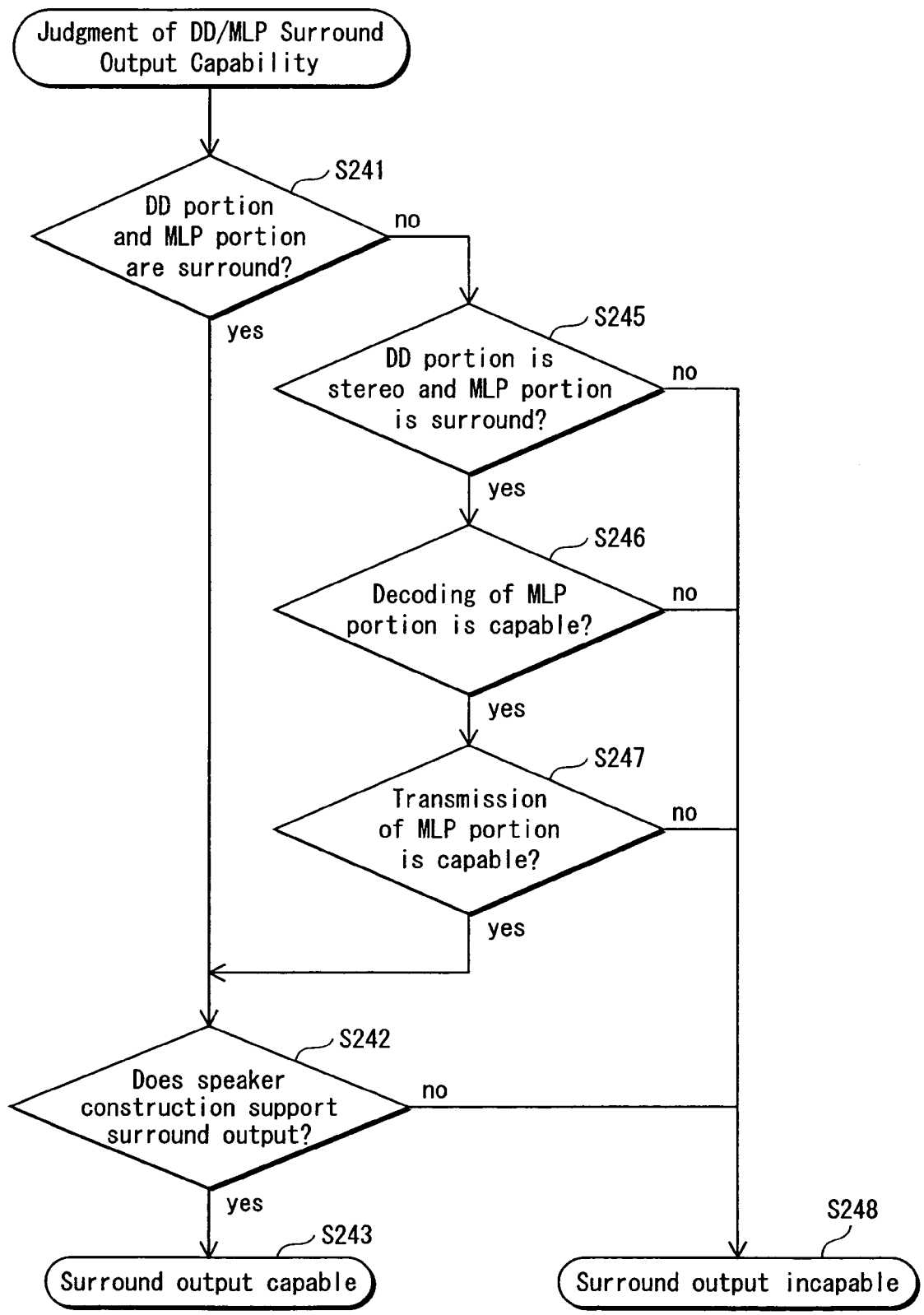
FIG. 41 is a flowchart showing the procedure for judging whether or not the reproduction apparatus has the surround output capability for the DD/MLP.

FIG. 41 is a flowchart showing the procedure for judging whether or not the reproduction apparatus has the surround output capability for the DD/MLP. This flowchart starts with a judgment on whether or not it is true that the DD portion of the DD/MLP is surround and (i) the combination of the DD portion and the MLP portion of the DD/MLP or (ii) the MLP portion replacing the DD portion is surround (step S241). If the judgment result of step S241 is positive (Yes), it is judged whether or not the speaker construction supports the surround output (step S242). If it is judged that the speaker construction supports the surround output, it is judged that the surround output is capable (step S243).

If the judgment result of step S241 is negative (No), that is to say, if the DD portion of the DD/MLP is stereo, it is judged whether or not it is true that the DD portion of the DD/MLP is stereo and (i) the combination of the DD portion and the MLP portion of the DD/MLP or (ii) the MLP portion replacing the DD portion is surround (step S245). If the judgment result of step S245 is positive (Yes), it is judged whether or not the decoder can decode the MLP portion of the DD/MLP (step S246). If the judgment result of step S246 is positive (Yes), it is judged whether or not the transmission path can transmit the MLP portion of the DD/MLP (step S247). If results of all these judgments in steps S245-S247 are positive (Yes), it is judged whether or not the speaker construction supports the surround output (step S242). If it is judged that the speaker construction supports the surround output, it is judged that the surround output is capable (step S243).

If any results of these judgments are negative (No), which include the cases where the decoder can decode only the DD portion of the DD/MLP ("No" in step S246) and the transmission path can transmit only the DD portion of the DD/MLP ("No" in step S247), it is judged that the surround output is incapable (step S248).

If the DD portion of the DD/MLP is stereo and (i) the combination of the DD portion and the MLP portion of the DD/MLP or (ii) the MLP portion replacing the DD portion is also stereo ("No" in step S245), it is judged that the surround output is incapable (step S248).

It should be noted here that in the case of DD/MLP, the extended data may be a difference from the basic data or may be independent and replace the basic data. In the latter case, if the DD portion is surround, the control may go to steps S246 and S247, and even if it is judged in step S246 that the decoder can decode only the DD portion of the DD/MLP ("No" in step S246), or it is judged in step S247 that the transmission path can transmit only the DD portion of the DD/MLP ("No" in step S247), the control may go to step S242, and if it is judged that the speaker construction supports the surround output ("Yes" in step S242), it is judged that the surround output is capable (step S243).

If the decoder can decode the MLP portion of the DD/MLP as well ("Yes" in step S246), and if the transmission path can transmit the MLP portion of the DD/MLP as well ("Yes" in step S247), either of the surround output and the stereo output is available. If the surround output is given a priority, the audio stream is treated as a surround audio stream. If the speaker construction supports the surround output ("Yes" in step S242), it is judged that the surround output is capable (step S243). If the surround output is not given a priority, the extended data is output as a stereo audio stream, and it is judged that the surround output is incapable (step S248).

This completes the explanation of the Procedure executing unit 42. From now on, the PSR setting unit 43 in the second embodiment will be explained.

The PSR setting unit 43 display a set-up menu, and via the set-up menu, receives information of the decoding capability of a device to which the reproduction apparatus 300 is connected, information of the transmission path capability of a transmission path between the reproduction apparatus 300 and the device, and information of the speaker construction of the home theater system that includes the reproduction apparatus 300. The PSR setting unit 43 determines the parameters 1 and 2 to be set for each encoding method, from the received information of the decoding capability, the transmission path capability, and the speaker construction. The settings of the parameters 1-2 are shown in FIG. 28, FIG. 30, and FIG. 32. The parameters 1 and 2 determined for each encoding method are set in PSR15.

As described above, according to the present embodiment, the material used for the judgment on whether or not the conditions (a) and (c) are satisfied is stored in PSR15 in an optimized manner. With this construction, it is possible for a system, in which the reproduction apparatus performs a digital output or the receiver side performs the decoding, to judge appropriately whether or not the conditions (a) and (c) are satisfied. This enables an optimum Primary audio stream to be transmitted when the reproduction apparatus is used in the system.

Third Embodiment

The third embodiment provides a method of optimizing the definition of the parameters further than the second embodiment.

The optimization is realized by indicating the following with respect to each of the basic data and the extended data, for each encoding method:

0) whether there is no decoding capability ("incapable");

1) whether there is decoding capability ("Stereo capable"); and 2) whether there are decoding capability and surround output capability ("Surround capable").

Figure 42:
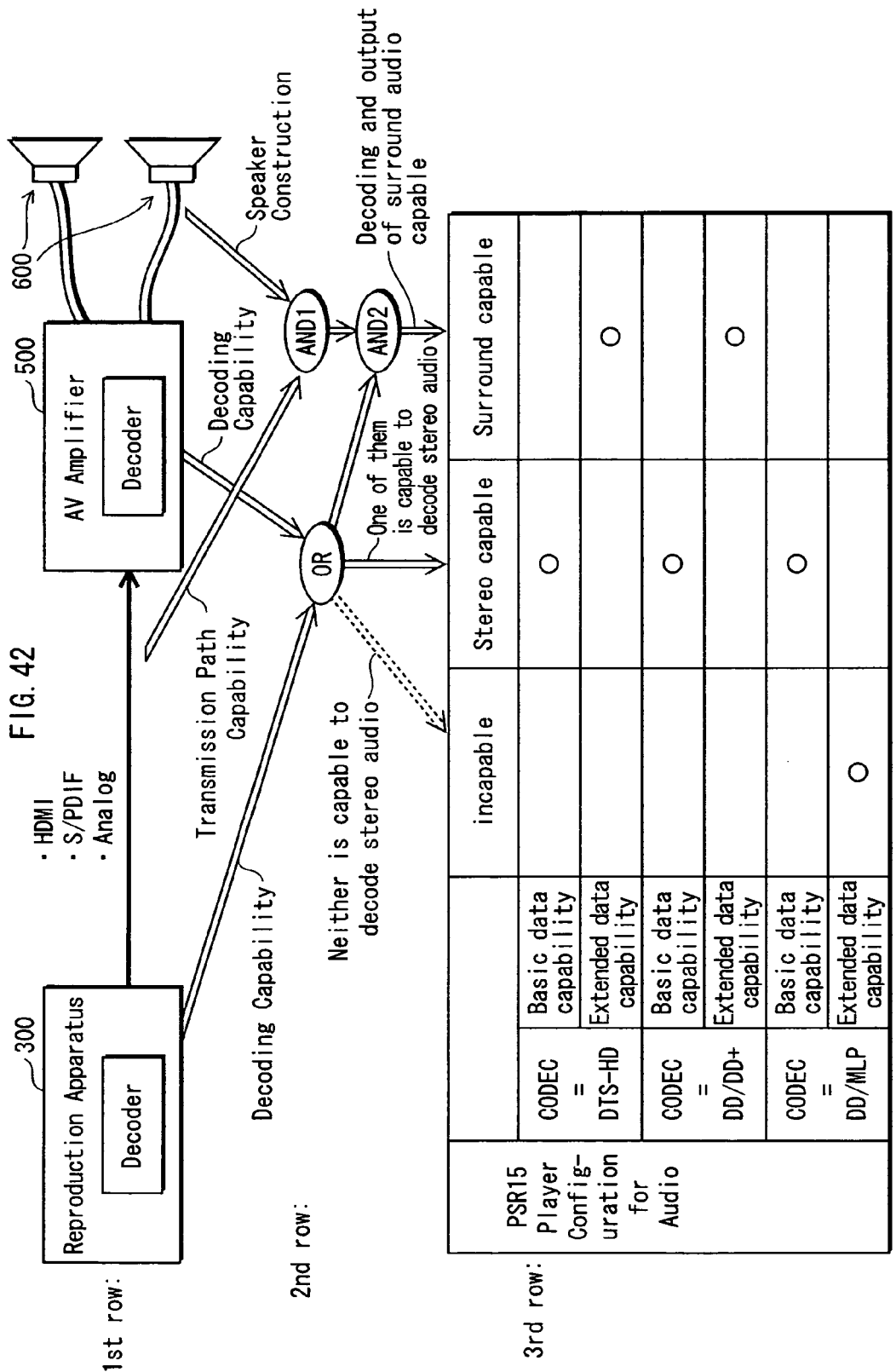
FIG. 42 shows a setting of capabilities for each of the basic data and the extended data of DTS-HD, DD/DD+, and DD/MLP.

FIG. 42 shows a setting of capabilities for each of the basic data and the extended data of DTS-HD, DD/DD+, and DD/MLP. The $1^{st}$ row in FIG. 42 shows the reproduction apparatus 300, the AV amplifier 500, and the speakers 600. The $3^{rd}$ row shows, in the format of a table, the capabilities set in PSR15 for each of the basic data and the extended data of each encoding method. The rows in the table respectively represent the capabilities with respect to each of the basic data and the extended data of each of DTS-HD, DD/DD+, and DD/MLP. The columns in the table respectively represent the levels into which the capability is categorized: there is no decoding capability ("incapable"); there is decoding capability up to stereo ("Stereo capable"); and there is decoding capability up to surround ("Surround capable").

The sign "○" that appears in the table shown in the third row indicates to which level the capability is set, for each of the basic data and the extended data of each encoding method. In this example shown in FIG. 42, the capability of the basic data of the DTS-HD is set to "Stereo capable", the capability of the extended data of the DTS-HD is set to "Surround capable", the capability of the basic data of the DD/DD+ is set to "Stereo capable", the capability of the extended data of the DD/DD+ is set to "Surround capable", the capability of the basic data of the DD/MLP is set to "Stereo capable", and the capability of the extended data of the DD/MLP is set to "incapable". In this way, PSR15 of the third embodiment separately and specifically shows how the capability of each of the basic data and the extended data of each encoding method is set to one of the levels: "Stereo capable"; "Surround capable"; and "incapable".

The $2^{nd}$ row between the $1^{st}$ row and the $3^{rd}$ row indicates the characteristics of the reproduction apparatus 300, the AV amplifier 500, and the speakers 600 that determine the capabilities of each of the basic data and the extended data of each encoding method shown in the 3rd row.

As shown in the 2nd row of FIG. 32, the capabilities of each of the basic data and the extended data of each encoding method are determined from (i) a logical addition ("OR" in FIG. 42) of the characteristics of the decoder of the reproduction apparatus 300 and the characteristics of the decoder of the AV amplifier 500, (ii) a logical multiplication ("AND1" in FIG. 42) of the characteristics of the transmission path between the reproduction apparatus 300 and the AV amplifier 500 with the construction of the speakers 600, and (iii) a logical multiplication ("AND2" in FIG. 42) of the logical addition and the logical multiplication ("AND1"). When either the characteristics of the decoder of the reproduction apparatus 300 or the characteristics of the decoder of the AV amplifier 500 are "capable to decode stereo audio", the capability of the basic data and the extended data of each encoding method is "Stereo capable".

When either the characteristics of the decoder of the reproduction apparatus 300 or the characteristics of the decoder of the AV amplifier 500 are "capable to decode surround audio", and when both the characteristics of the transmission path between the reproduction apparatus 300 and the AV amplifier 500 and the construction of the speakers 600 are "capable to output surround audio", the capability of the basic data and the extended data of each encoding method is "Surround capable". When both the characteristics of the decoder of the reproduction apparatus 300 and the characteristics of the decoder of the AV amplifier 500 are "incapable to decode stereo audio", the capability of the basic data and the extended data of each encoding method is "incapable".

FIG. 43 shows PSR15 that has been set to indicate the capabilities for each of the basic data and the extended data of each encoding method.

In the PSR15, bits from "b0" to "b3" indicate whether the reproduction apparatus has the capability to decode and reproduce the LPCM audio streams. When the bit values of the four bits are "0001", it indicates that the reproduction apparatus has the capability to reproduce LPCM audio streams of 48/96 kHz having the stereo attribute. When the bit values of the four bits are "0010", it indicates that the reproduction apparatus has the capability to reproduce LPCM audio streams of 48/96 kHz having the surround attribute. When the bit values of the four bits are "0101", it indicates that the reproduction apparatus has the capability to reproduce LPCM audio streams of any frequency having the stereo attribute. When the bit values of the four bits are "0110", it indicates that the reproduction apparatus has the capability to reproduce LPCM audio streams of any frequency having the surround attribute.

In the PSR15, bits from "b4" to "b7" indicate whether the reproduction apparatus has the capability to decode and reproduce the DD/DD+ audio streams. When the bit values of the lower two bits of the four bits are "01", it indicates that the reproduction apparatus has the capability to reproduce the basic data (Independent substream) of DD/DD+ audio streams if the basic data has the stereo attribute. When the bit values of the lower two bits of the four bits are "10", it indicates that the reproduction apparatus has the capability to reproduce the basic data (Independent substream) of DD/DD+ audio streams if the basic data has the surround attribute.

When the bit values of the upper two bits of the four bits are "01", it indicates that the reproduction apparatus has the capability to reproduce the extended data (Dependent substream) of DD/DD+ audio streams if the extended data has the stereo attribute. When the bit values of the upper two bits of the four bits are "10", it indicates that the reproduction apparatus has the capability to reproduce the extended data (Dependent substream) of DD/DD+ audio streams if the extended data has the surround attribute.

When the bit values of the upper two bits of the four bits are "00", it indicates that the reproduction apparatus does not have the capability to reproduce it.

In the PSR15, bits from "b8" to "b11" indicate whether the reproduction apparatus has the capability to decode and reproduce the DTS-HD audio streams. When the bit values of the lower two bits of the four bits are "01", it indicates that the reproduction apparatus has the capability to reproduce the basic data (Core substream) of DTS-HD audio streams if the basic data has the stereo attribute. When the bit values of the lower two bits of the four bits are "10", it indicates that the reproduction apparatus has the capability to reproduce the basic data (Core substream) of DTS-HD audio streams if the basic data has the surround attribute.

When the bit values of the upper two bits of the four bits are "01", it indicates that the reproduction apparatus has the capability to reproduce the extended data (Extension substream) of DTS-HD audio streams if the basic data has the stereo attribute. When the bit values of the upper two bits of the four bits are "10", it indicates that the reproduction apparatus has the capability to reproduce the extended data (Extension substream) of DTS-HD audio streams if the basic data has the surround attribute.

When the bit values of the upper two bits of the four bits are "00", it indicates that the reproduction apparatus does not have the capability to reproduce Extension substream.

In the PSR15, bits from "b12" to "b15" indicate whether the reproduction apparatus has the capability to decode and reproduce the DD/MLP audio streams. When the bit values of the lower two bits of the four bits are "01", it indicates that the reproduction apparatus has the capability to reproduce the basic data (AC-3) of DD/MLP audio streams if the basic data has the stereo attribute. When the bit values of the lower two bits of the four bits are "10", it indicates that the reproduction apparatus has the capability to reproduce the basic data (AC-3) of DD/MLP audio streams if the basic data has the surround attribute.

When the bit values of the upper two bits of the four bits are "01", it indicates that the reproduction apparatus has the capability to reproduce the extended data (MLP audio) of DD/MLP audio streams if the basic data has the stereo attribute. When the bit values of the upper two bits of the four bits are "10", it indicates that the reproduction apparatus has the capability to reproduce the extended data (MLP audio) of DD/MLP audio streams if the basic data has the surround attribute.

When the bit values of the upper two bits of the four bits are "00", it indicates that the reproduction apparatus does not have the capability to reproduce it.

Up to now, PSR15 in the present embodiment has been described. From now on, the procedure of the Procedure executing unit 42 in the present embodiment will be described. In the present embodiment, since PSR15 is defined as shown in FIG. 43, the judgments on whether the conditions (a) and (c) are satisfied are performed as follows.

First, how the Procedure executing unit 42 makes the judgment on whether the condition (a) is satisfied will be explained. The Procedure executing unit 42 refers to the PSR15 to detect capabilities that corresponds to the encoding method of a target Primary audio stream. If the capability of the basic data or the extended data of the encoding method is "Stereo capable" or "Surround capable", the Procedure executing unit 42 judges that the reproduction apparatus has the capability to decode the target Primary audio stream and that the condition (a) is satisfied. If the capabilities of both the basic data and the extended data of the encoding method are "incapable", the Procedure executing unit 42 judges that the reproduction apparatus does not have the capability to decode the target Primary audio stream and that the condition (a) is not satisfied. Up to now, the judgment on the condition (a) has been described.

Next, how the Procedure executing unit 42 makes the judgment on whether the condition (c) is satisfied will be explained. The Procedure executing unit 42 refers to the PSR23 to detect one among the DD/DD+ capability, DTS-HD capability, and DD/MLP capability that corresponds to the encoding method of a target Primary audio stream. The Procedure executing unit 42 judges whether or not the condition (c) is satisfied by checking whether the bits assigned to the extended data (Dependent substream, Extension substream, and MLP audio) are set to a predetermined value.

Figure 44:
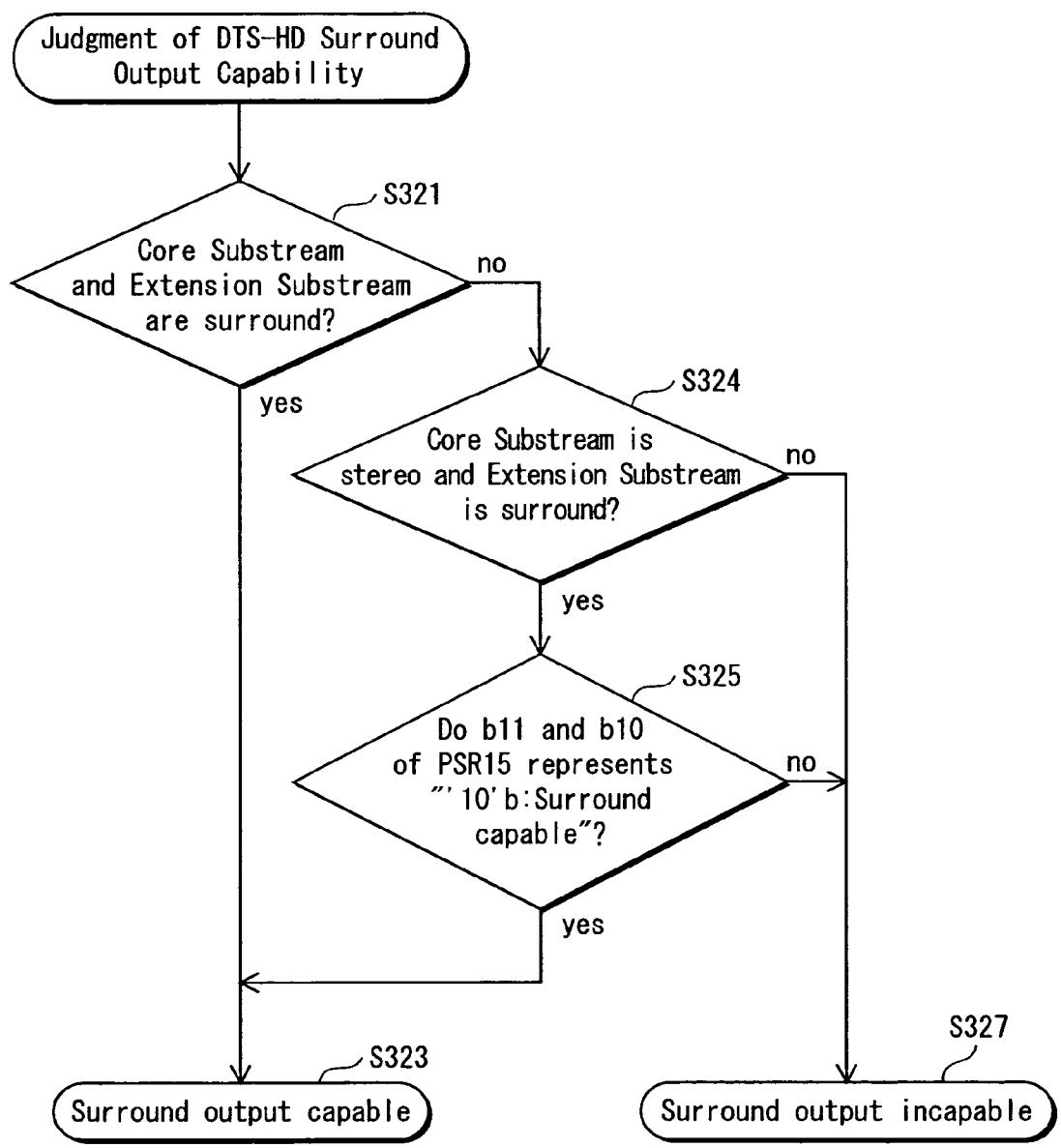
FIG. 44 is a flowchart showing the procedure to determine whether or not the reproduction apparatus has a capability to output surround audio of the DTS-HD.

FIG. 44 is a flowchart showing the procedure to determine whether or not the reproduction apparatus has a capability to output surround audio of the DTS-HD. In this flowchart, first, it is judged whether or not Core Substream and Extension Substream are surround (step S321). If it is judged that both are surround, it is judged that the reproduction apparatus has the capability to output surround audio of the DTS-HD (step S323).

If a result of the judgment in step S321 is negative ("No"), it is judged whether or not Core Substream is stereo and Extension Substream is surround (step S324). If a result of the judgment in step S324 is negative ("No"), that is to say, if a combination of Core Substream and Extension Substream is stereo, it is judged that the reproduction apparatus does not have the capability to output surround audio of the DTS-HD (step S327). If a result of the judgment in step S324 is positive ("Yes"), that is to say, if a combination of Core Substream and Extension Substream is surround, it is judged whether or not bit values of b11 and b10 of PSR15 are "10" that indicates "Surround capable" (step S325).

If a result of judgment in step S324 or step S325 is negative ("No"), it is judged that the reproduction apparatus does not have the capability to output surround audio of the DTS-HD (step S327). If results of judgments in steps S324 and S325 are both positive ("Yes"), it is judged that the reproduction apparatus has the capability to output surround audio of the DTS-HD (step S323).

Figure 45:
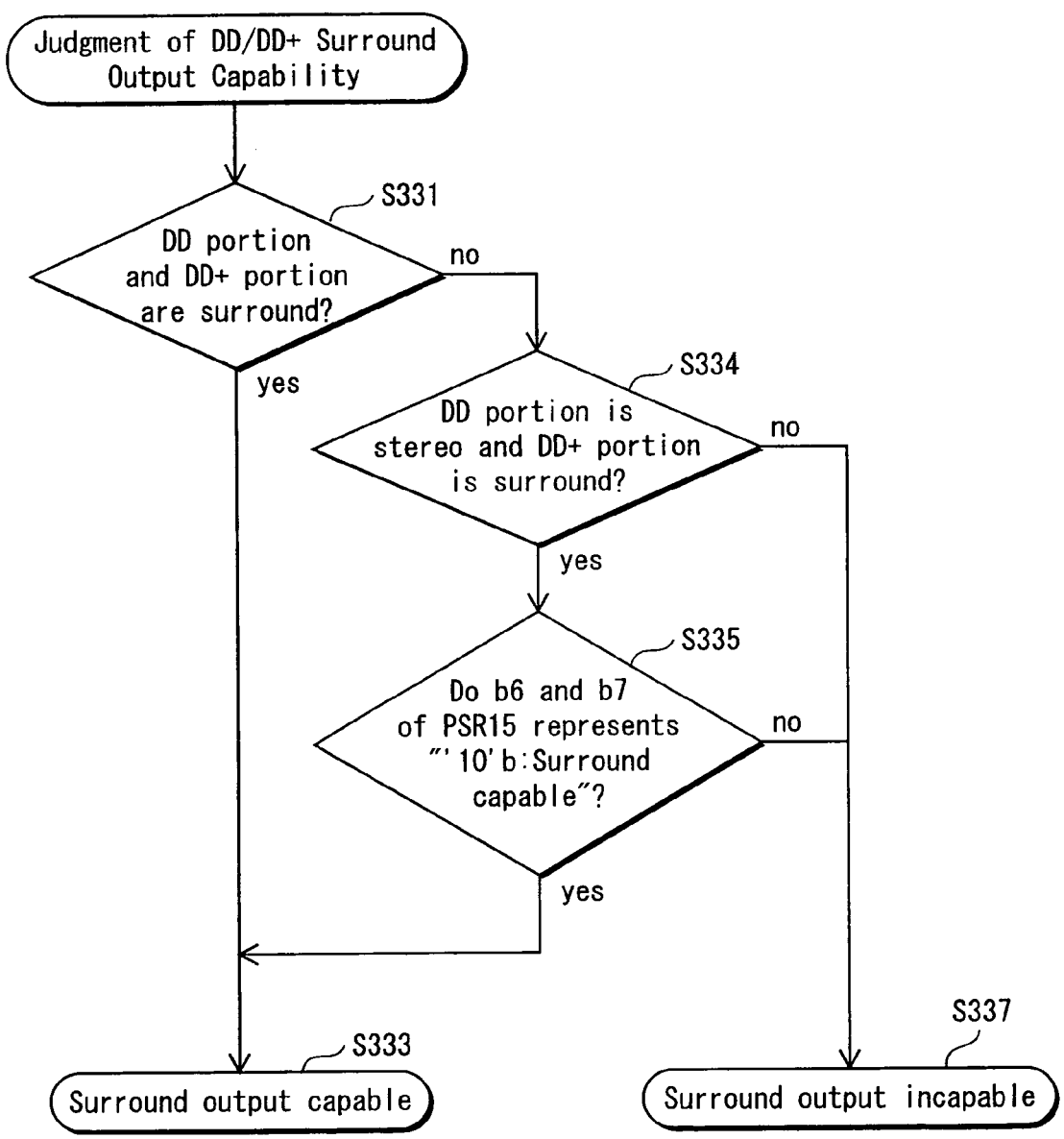
FIG. 45 is a flowchart showing the procedure to determine whether or not the reproduction apparatus has a capability to output surround audio of the DD/DD+.

FIG. 45 is a flowchart showing the procedure to determine whether or not the reproduction apparatus has a capability to output surround audio of the DD/DD+. In this flowchart, first, it is judged whether or not the DD portion of the DD/DD+ is surround and (i) the combination of the DD portion and the DD+ portion of the DD/DD+ or (ii) the DD+ portion replacing the DD portion is surround (step S331). If the judgment result of step S331 is positive (Yes), it is judged that the reproduction apparatus has the capability to output surround audio of the DD/DD+ (step S333).

If the judgment result of step S331 is negative (No), that is to say, if the DD portion of the DD/DD+ is stereo, it is judged whether or not it is true that the DD portion of the DD/DD+ is stereo and (i) the combination of the DD portion and the DD+ portion of the DD/DD+ or (ii) the DD+ portion replacing the DD portion is surround (step S334). If the judgment result of step S334 is positive (Yes), it is judged whether or not bit values of b6 and b7 of PSR15 are "10" that indicates "Surround capable" (step S335).

If results of all these judgments in steps S334-S335 are positive (Yes), it is judged that the reproduction apparatus has the capability to output surround audio of the DD/DD+ (step S333). If the decoder can decode only the DD portion of the DD/DD+ or the transmission path can transmit only the DD portion of the DD/DD+, it is judged that the target audio stream is stereo and surround output is incapable (step S337).

Figure 46:
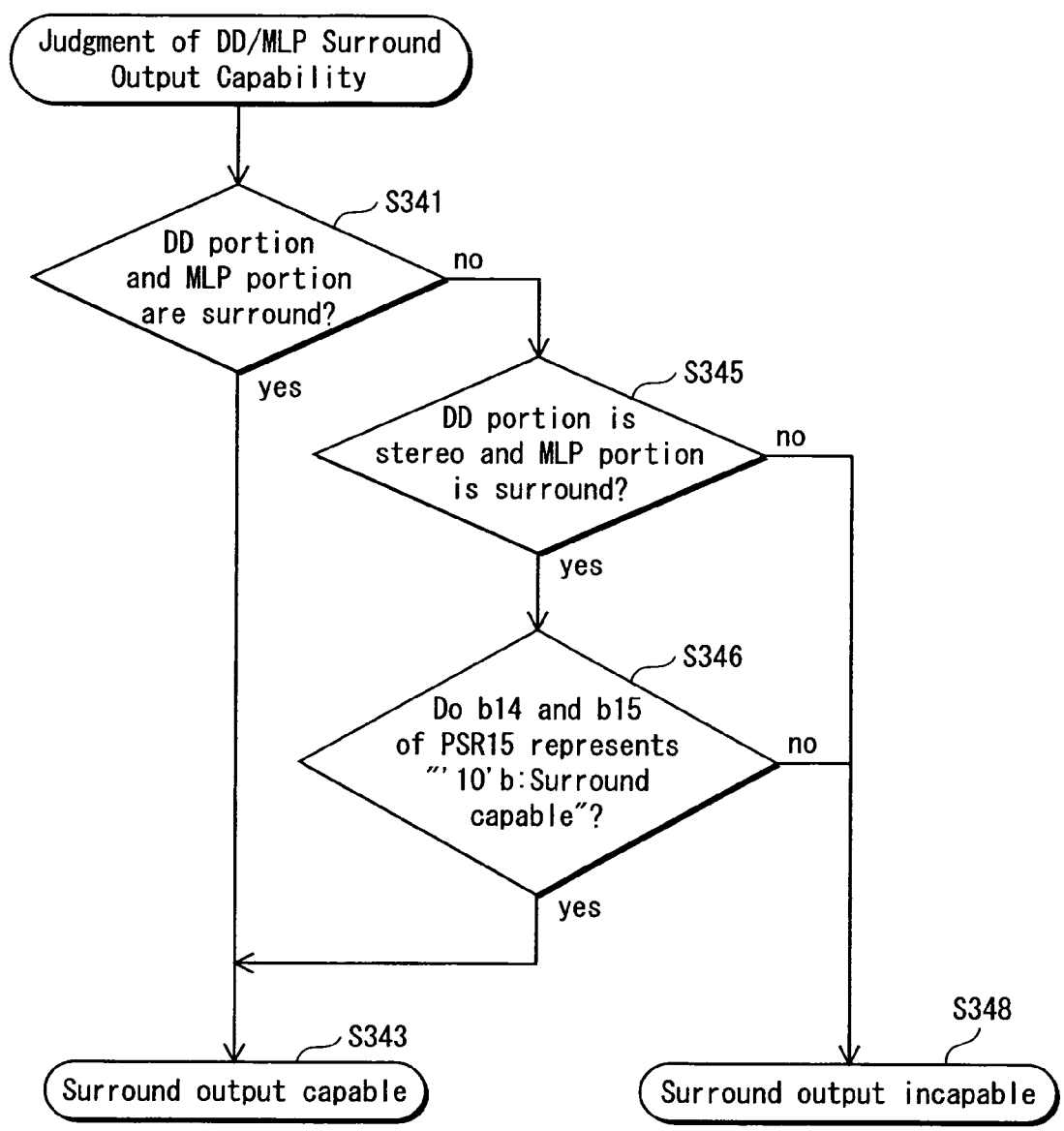
FIG. 46 is a flowchart showing the procedure to determine whether or not the reproduction apparatus has a capability to output surround audio of the DD/MLP.

FIG. 46 is a flowchart showing the procedure to determine whether or not the reproduction apparatus has a capability to output surround audio of the DD/MLP. In this flowchart, first, it is judged whether or not the DD portion of the DD/MLP is surround and (i) the combination of the DD portion and the MLP portion of the DD/MLP or (ii) the MLP portion replacing the DD portion is surround (step S341). If the judgment result of step S341 is positive (Yes), it is judged that the reproduction apparatus has the capability to output surround audio of the DD/MLP (step S343).

If the judgment result of step S341 is negative (No), that is to say, if the DD portion of the DD/MLP is stereo, it is judged whether or not it is true that the DD portion of the DD/MLP is stereo and (i) the combination of the DD portion and the MLP portion of the DD/MLP or (ii) the MLP portion replacing the DD portion is surround (step S345). If the judgment result of step S345 is positive (Yes), it is judged whether or not bit values of b14 and b15 of PSR15 are "10" that indicates "Surround capable" (step S346). If results of all these judgments in steps S345-S346 are positive (Yes), it is judged that the reproduction apparatus has the capability to output surround audio of the DD/MLP (step S343). If any results of these judgments in steps S345-S346 are negative (No), it is judged that surround output is incapable (step S348).

This completes the explanation of the Procedure executing unit 42 in the present embodiment. From now on, the PSR setting unit 43 in the third embodiment will be explained.

The PSR setting unit 43 display a set-up menu, and via the set-up menu, receives information of the decoding capability of the reproduction apparatus 300, the decoding capability of a device to which the reproduction apparatus 300 is connected, the transmission path capability of a transmission path between the reproduction apparatus 300 and the device, and the speaker construction of the home theater system that includes the reproduction apparatus 300. The PSR setting unit 43 determines the capabilities to be set for each encoding method, from the received information of the decoding capability, the transmission path capability, and the speaker construction.

If the user who operates via the set-up menu is an engineer in a maker of the reproduction apparatus 300, the engineer inputs the decoding capabilities of the reproduction apparatus 300 for each encoding method into the set-up menu. Based on the input capabilities, the PSR setting unit 43 sets the capabilities for each of the basic data and the extended data of each encoding method.

If the user who operates via the set-up menu is an end user, the user inputs, into the set-up menu, the decoding capability of a device to which the reproduction apparatus 300 is connected, the transmission path capability of a transmission path between the reproduction apparatus 300 and the device, and the speaker construction of the home theater system that includes the reproduction apparatus 300. Based on the input capabilities, the PSR setting unit 43 updates the settings of the capabilities for each of the basic data and the extended data of each encoding method set by the engineer of the maker.

When a reproduction apparatus is installed in a system, parameters for each of the basic data and the extended data are determined based on the system environment and are set in PSR15.

As described above, according to the present embodiment, when it is judged whether or not a Primary audio stream having an extended format satisfy the conditions (a) and (c), the judgment on the condition (a) can be made by judging whether or not it is capable to decode the basic data, and the judgment on the condition (c) can be made by judging whether or not it is capable to decode the extended data and whether or not it is capable to output the surround audio. Accordingly, by changing the contents of condition (c) judgment procedure, it is possible to add Primary audio streams having extended formats to the targets of the Primary audio stream selection procedure. That is to say, by adding such a slight change to a Primary audio stream selection procedure targeting only the DTS and AC-3, a Primary audio stream selection procedure that targets Primary audio streams having extended formats as well can be made to be implemented in the reproduction apparatus.

Fourth Embodiment

The fourth embodiment relates to a dynamic change of PSR15. According to the description so far, parameters are statically set in PSR15 based on the status of the decoder installed in the reproduction apparatus 300 or the status of the transmission path connected to the reproduction apparatus 300, and it is supposed that PSR15 is not changed while a stream is reproduced. This is because it is presumed that the capabilities of the decoder or the transmission path are independent and always in the same status.

In the case of HDMI, however, the capability of the transmission path changes depending on the attribute of the video. For example, when HD video of 20×1080/59.94 Hz is being transmitted, LPCM of 192 kHz/8 ch can be transmitted. On the contrary, when SD video of 720×480/29.97 Hz is being transmitted, only LPCM of up to 48 kHz/8 ch or 192 kHz/2 ch can be transmitted. As understood from this, if the transmission capability or decoder capability is expected to change depending on a certain status, it is necessary to dynamically change the values of PSR15 according to the change of the capabilities.

In the case of HDMI, when a connection is established or when the video attribute changes, the reproduction apparatus 300 can perform a communication with the receiver and can be notified of the decoding capability of the receiver. This enables the reproduction apparatus 300 to recognize the transmission capability of the HDMI audio and dynamically change the values of PSR15 to conform to the video.

Also in the case of HDMI, when the audio band falls short due to transmission of SD video, it is possible to raise the band by multiplying the transmission speed by "n". In the above-described example, if the transmission speed is multiplied by "4", it becomes possible to transmit LPCM of 192 kHz/8 ch, becoming possible to use the same band as the HD. The reproduction apparatus 300 may adjust the transmission speed of the HDMI so as not to dynamically update the values of PSR15.

<Supplementary Notes>

Up to now, the best mode for carrying out the invention, as far as known to the applicant at this time of filing the present application, has been described. However, further improvements or modifications can be made on the present invention in terms of the following technical topics. It should be noted here that whether or not to adopt the embodiments described above or to make improvements or modifications is optional and depends on the implementer of the invention.

<Details of Judgments>

When the DTS-HD is used as the encoding method, the Procedure executing unit 42 may judge that the reproduction is incapable if only Core substream can be decoded or transmitted. Also, the Procedure executing unit 42 may judge that the reproduction is incapable if only the DD portion of the DD/DD+ or the DD/MLP can be decoded or transmitted.

<Judgment on Surround Output Capability>

It may also be judged in step S181 of FIG. 36 whether or not downsampling or downmixing is required to perform the output, and if it is judged so, it may be judged that the surround output is incapable.

<Decoding Capability for LPCM>

When it may become necessary to downsample or downmix the LPCM due to the limitation of the band of the transmission path, it is preferable that the reproduction apparatus 300 judges that decoding the LPCM is capable only if the reproduction apparatus 300 is capable to downsample or downmix as well as being capable to decode the LPCM.

<Speaker Construction>

In the first embodiment, a distinction is made between stereo and surround. However, if in the future, it has become necessary to make distinctions among a larger number of speaker construction patterns, the speaker construction patterns may be identified by specifying the number of channels that can be output, the speaker arrangement pattern and the like. Also, there is a technology that can provide a surround audio effect with only two speakers by allowing coefficients such as Head-Related Transfer Function (HRTF) to act on the audio streams so that the acoustic fields are virtually localized. When this technology is available, the system parameter may be set to "surround" even if only two speakers are available.

<STN_table>

In the present embodiment, it is presumed that the streams registered with the STN_table are present. Accordingly, there is no step that checks whether or not a stream referred to by the PlayItem information is present. In a virtual file system that is constructed by combining the BD-ROM and the local storage 200, the PlayItem refers to a stream. However, in the actuality, the reference-target stream may not have been downloaded or may not be present. Therefore, a step, in which streams that are referred to from the STN_table or the like are actually present in the BD-ROM or the local storage 200, may be set with the same priority as the step for making judgment on the condition (a).

<Realization of Control Procedure>

Both the control procedures explained in the above-described embodiments using the flowcharts and the control procedures of the functional components explained in the above-described embodiments satisfy the requirements for the "program invention" since the above-mentioned control procedures are realized concretely using the hardware resources and are the creation of a technical idea utilizing natural laws.

Production of Program of Present Invention

The program of the present invention is an object program that can execute on a computer. The object program is composed of one or more program codes that cause the computer to execute each step in the flowchart or each procedure of the functional components. There are various types of program codes such as the native code of the processor, and JAVA™ byte code. There are also various forms of realizing the steps of the program codes. For example, when each step can be realized by using an external function, the call statements for calling the external functions are used as the program codes. Program codes that realize one step may belong to different object programs. In the RISC processor in which the types of instructions are limited, each step of flowcharts may be realized by combining arithmetic operation instructions, logical operation instructions, branch instructions and the like.

The program of the present invention can be produced as follows. First, the software developer writes, using a programming language, a source program that achieves each flowchart and functional component. In this writing, the software developer uses the class structure, variables, array variables, calls to external functions, and so on, which conform to the sentence structure of the programming language he/she uses.

The written source program is sent to the compiler as files. The compiler translates the source program and generates an object program.

The translation performed by the compiler includes processes such as the sentence structure analysis, optimization, resource allocation, and code generation. In the sentence structure analysis, the characters and phrases, sentence structure, and meaning of the source program are analyzed and the source program is converted into an intermediate program. In the optimization, the intermediate program is subjected to such processes as the basic block setting, control flow analysis, and data flow analysis. In the resource allocation, to adapt to the instruction sets of the target processor, the variables in the intermediate program are allocated to the register or memory of the target processor. In the code generation, each intermediate instruction in the intermediate program is converted into a program code, and an object program is obtained.

After the object program is generated, the programmer activates a linker. The linker allocates the memory spaces to the object programs and the related library programs, and links them together to generate a load module. The generated load module is based on the presumption that it is read by the computer and causes the computer to execute the procedures indicated in the flowcharts and the procedures of the functional components. The program of the present invention can be produced in this way.

Use of Program of Present Invention

The program of the present invention can be used as follows.

(i) Used as Embedded Program

When the program of the present invention is used as an embedded program, the load module as the program is written into an instruction ROM, together with the Basic Input/Output System (BIOS) program and various pieces of middleware (operation systems). The program of the present invention is used as the control program of the reproduction apparatus 300 as the instruction ROM is embedded in the control unit and is executed by the CPU.

(ii) Used as Application

When the reproduction apparatus 300 is a hard-disk-embedded model, the Basic Input/Output System (BIOS) program is embedded in an instruction ROM, and various pieces of middleware (operation systems) are preinstalled in the hard disk. Also, a boot ROM for activating the system from the hard disk is provided in the reproduction apparatus 300.

In this case, only the load module is supplied to the reproduction apparatus 300 via a transportable recording medium and/or a network, and is installed in the hard disk as one application. This enables the reproduction apparatus 300 to perform the bootstrapping by the boot ROM to activate an operation system, and then causes the CPU to execute the installed load module as one application so that the program of the present application can be used.

As described above, when the reproduction apparatus 300 is a hard-disk-embedded model, the program of the present invention can be used as one application. Accordingly, it is possible to transfer, lend, or supply, via a network, the program of the present invention separately.

<Controller 22>

Components such as the controller 22 described above in the embodiments can be realized as one system LSI.

The system LSI is obtained by implementing a bear chip on a high-density substrate and packaging them. The system LSI is also obtained by implementing a plurality of bear chips on a high-density substrate and packaging them, so that the plurality of bear chips have an outer appearance of one LSI (such a system LSI is called a multi-chip module).

The system LSI has a QFP (Quad Flat Package) type and a PGA (Pin Grid Array) type. In the QFP-type system LSI, pins are attached to the four sides of the package. In the PGA-type system LSI, a lot of pins are attached to the entire bottom.

These pins function as an interface with other circuits. The system LSI, which is connected with other circuits through such pins as an interface, plays a role as the core of the reproduction apparatus 300.

The bear chip packaged in the system LSI includes a front-end unit, a back-end unit, and a digital processing unit. The front-end unit digitizes analog signals. The back-end unit converts digital data obtained through digital processes into the analog format and outputs the analog data.

The internal-structure components shown in the above-described embodiments are implemented in the digital processing unit.

As described above in "Used as Embedded Program", the load module as the program, the Basic Input/Output System (BIOS) program and various pieces of middleware (operation systems) are written into an instruction ROM. The major improvement of the embodiments is achieved by the load module as the program. It is therefore possible to produce a system LSI of the present invention by packaging the instruction ROM, in which the load module as the program is stored, as the bear chip.

In regards with a specific implementation method, it is preferable to use the SoC implementation or the SiP implementation. The SoC (System on Chip) implementation is a technology for printing a plurality of circuits onto a chip. The SiP (System in Package) implementation is a technology for packaging a plurality of circuits by resin or the like. Through these processes, a system LSI of the present invention can be produced based on the internal structure of the reproduction apparatus 300 described in each embodiment above.

It should be noted here that although the term LSI is used here, it may be called IC, LSI, super LSI, ultra LSI or the like, depending on the level of integration.

Further, part or all of the components of each reproduction apparatus may be achieved as one chip. The integrated circuit is not limited to the SoC implementation or the SiP implementation, but may be achieved by a dedicated circuit or a general purpose processor. It is also possible to achieve the integrated circuit by using the FPGA (Field Programmable Gate Array) that can be re-programmed after it is manufactured, or a reconfigurable processor that can reconfigure the connection and settings of the circuit cells inside the LSI. Furthermore, a technology for an integrated circuit that replaces the LSI may appear in the near future as the semiconductor technology improves or branches into another technologies. In that case, the new technology may be incorporated into the integration of the functional blocks constituting the present invention as described above. Such possible technologies include biotechnology.

INDUSTRIAL APPLICABILITY

The recording medium and reproduction apparatus of the present invention can be mass-produced based on the internal structures of them shown in the embodiments above. As such, the recording medium and reproduction apparatus of the present invention has the industrial applicability.

The invention claimed is:

1. A reproduction apparatus for selecting an audio stream from a plurality of audio streams written in a stream number table, and reproducing the selected audio stream together with a video stream, the reproduction apparatus comprising:
a selecting unit operable to make a judgment on which among a plurality of predetermined conditions are satisfied by each of the plurality of audio streams written in entries of the stream number table, the entries corresponding one-to-one to the plurality of audio streams, and to select an audio stream to be reproduced among the plurality of audio streams, in accordance with each combination of predetermined conditions satisfied by each audio stream; and
a reproducing unit operable to reproduce the selected audio stream, wherein
one of the plurality of predetermined conditions is that basic data of an audio frame of an audio stream to be selected has a stereo attribute, extended data of the audio frame of the audio stream to be selected has a surround attribute, and a surround output of the extended data of the audio frame of the audio stream to be selected can be processed,
if an audio frame of a target audio stream is composed of basic data and extended data, the selecting unit judges whether or not the predetermined condition is satisfied by detecting whether or not a channel attribute of the extended data is surround and the extended data is capable to be processed, and
when there is at least one audio stream satisfying the predetermined condition among the plurality of audio streams written in the entries of the stream number table, the selecting unit selects the audio stream satisfying the predetermined condition as the audio stream to be reproduced among the plurality of audio streams.

2. The reproduction apparatus of claim 1, further comprising:
a status register that stores a first flag group, which corresponds to basic data of a plurality of encoding methods, and a second flag group which corresponds to extended data of the plurality of encoding methods, wherein
the first flag group is composed of a plurality of flags that indicate, for each of the plurality of encoding methods, whether or not the reproduction apparatus has a capability to process the basic data,
the second flag group is composed of a plurality of flags that indicate, for each of the plurality of encoding methods, whether or not the reproduction apparatus has a capability to process the extended data, and
the detection of whether or not the extended data is capable to be processed is accomplished by checking whether or not a value set in a flag, which belongs to the first flag group and corresponds to the target audio stream, is a predetermined value.

3. The reproduction apparatus of claim 2, wherein
the capability to process the extended data is categorized into three levels referred to as a first level, a second level, and a third level, wherein at the first level, it is capable to decode the extended data and output a result of the decoding as a surround output; at the second level, it is capable to decode the extended data and output a result of the decoding as a stereo output; and at the third level, nether a surround output nor a stereo output is available, and
the predetermined value is a value indicating the first level.

4. The reproduction apparatus of claim 1, wherein
the detection of whether or not the extended data is capable to be processed is accomplished by checking whether or not either the reproduction apparatus or a device connected to the reproduction apparatus has a capability to decode the extended data.

5. The reproduction apparatus of claim 1, wherein
the detection of whether or not the extended data is capable to be processed is accomplished by checking whether or not it is capable to transmit either the extended data that has been compressed or non-compressed digital data that has been obtained by decoding the extended data, to a connected device.

6. The reproduction apparatus of claim 1, wherein
the detection of whether or not the extended data is capable to be processed is accomplished by checking whether or not a speaker of a connected device supports surround audio.

7. The reproduction apparatus of claim 1, wherein an encoding method of the target audio stream is DD/DD+, and the basic data of the audio frame is an independent substream and the extended data of the audio frame is a dependent substream.

8. The reproduction apparatus of claim 1, wherein an encoding method of the target audio stream is DTS-HD, and the basic data of the audio frame is a core substream and the extended data of the audio frame is an extension substream.

9. The reproduction apparatus of claim 1, wherein an encoding method of the target audio stream is DD/MLP, and the basic data of the audio frame is DD(AC-3) data and the extended data of the audio frame is an MLP audio.

10. The reproduction apparatus of claim 1, wherein:
encoding methods of the target audio stream include DD/DD+, DTS-HD, DD/MLP;
the basic data of the DD/DD+ is an independent substream and the extended data of the DD/DD+, of the audio frame is a dependent substream;
the basic data of the DTS-HD is a core substream and the extended data of the DTS-HD is an extension substream; and
the basic data of the DD/MLP is DD(AC-3) data and the extended data of the DD/MLP is an MLP audio.

11. A non-transitory computer readable medium storing a program that causes a computer to execute the steps of:
making a judgment on which among a plurality of predetermined conditions are satisfied by each of a plurality of audio streams written in entries of a stream number table, the entries corresponding one-to-one to the plurality of audio streams, and selecting an audio stream to be reproduced among the plurality of audio streams, in accordance with each combination of predetermined conditions satisfied by each audio stream; and
reproducing the selected audio stream, wherein
one of the plurality of predetermined conditions is that basic data of an audio frame of an audio stream to be selected has a stereo attribute, extended data of the audio frame of the audio stream to be selected has a surround attribute, and a surround output of the extended data of the audio frame of the audio stream to be selected can be processed,
if an audio frame of a target audio stream is composed of basic data and extended data, the audio stream selecting step judges whether or not the predetermined condition is satisfied by detecting whether or not a channel attribute of the extended data is surround and the extended data is capable to be processed, and when there is at least one audio stream satisfying the predetermined condition among the plurality of audio streams written in the entries of the stream number table, the selecting of the audio stream to be reproduced further includes selecting the audio stream satisfying the predetermined condition as the audio stream to be reproduced among the plurality of audio streams.

12. A reproduction method for selecting an audio stream from a plurality of audio streams written in a stream number table, and reproducing the selected audio stream together with a video stream, the method comprising:

making a judgment on which among a plurality of predetermined conditions are satisfied by each of the plurality of audio streams written in entries of the stream number table, the entries corresponding one-to-one to the plurality of audio streams, and selecting an audio stream to be reproduced among the plurality of audio streams, in accordance with each combination of predetermined conditions satisfied by each audio stream; and reproducing the selected audio stream, wherein one of the plurality of predetermined conditions is that basic data of an audio frame of an audio stream to be selected has a stereo attribute, extended data of the audio frame of the audio stream to be selected has a surround attribute, and a surround output of the extended data of the audio frame of the audio stream to be selected can be processed, if an audio frame of a target audio stream is composed of basic data and extended data, the audio stream selecting step judges whether or not the predetermined condition is satisfied by detecting whether or not a channel attribute of the extended data is surround and the extended data is capable to be processed, and when there is at least one audio stream satisfying the predetermined condition among the plurality of audio streams written in the entries of the stream number table, the selecting of the audio stream to be reproduced further includes selecting the audio stream satisfying the predetermined condition as the audio stream to be reproduced among the plurality of audio streams.

* * * * *